US011665679B2

(12) United States Patent
Tao

(10) Patent No.: US 11,665,679 B2
(45) Date of Patent: May 30, 2023

(54) WIRELESS COMMUNICATION METHOD AND DEVICE

(71) Applicant: Alibaba Group Holding Limited, Grand Cayman (KY)

(72) Inventor: Zhen Tao, Hangzhou (CN)

(73) Assignee: Alibaba Group Holding Limited

( * ) Notice: Subject to any disclaimer, the term of this patent is extended or adjusted under 35 U.S.C. 154(b) by 197 days.

(21) Appl. No.: 16/799,603

(22) Filed: Feb. 24, 2020

(65) Prior Publication Data
US 2020/0196313 A1    Jun. 18, 2020

Related U.S. Application Data

(63) Continuation of application No. PCT/CN2018/100747, filed on Aug. 16, 2018.

(30) Foreign Application Priority Data

Aug. 25, 2017 (CN) .......................... 201710742086.9

(51) Int. Cl.
H04W 72/04       (2009.01)
H04W 72/0453    (2023.01)
(52) U.S. Cl.
CPC ............................... *H04W 72/0453* (2013.01)
(58) Field of Classification Search
None
See application file for complete search history.

(56) References Cited

U.S. PATENT DOCUMENTS 9,647,718 B2    5/2017 Seller
9,800,288 B2    10/2017 Seller et al.
(Continued)

FOREIGN PATENT DOCUMENTS

CN    101237675 A    8/2008
CN    102036276 A    4/2011
(Continued)

OTHER PUBLICATIONS

Translation of International Search Report dated Oct. 17, 2018, from corresponding CN PCT Application No. PCT/CN2018/100747, 2 pages.
(Continued)

*Primary Examiner* — Saba Tsegaye
(74) *Attorney, Agent, or Firm* — Lee & Hayes, P.C.

(57) ABSTRACT

The frequency band of an uplink channel of the first node is identical to the frequency band of a downlink channel of the second node. The frequency band of the uplink channel of the first node is different from the frequency band of a downlink channel of the first node. Uplink data from the terminal is received through the uplink channel of the first node; when the terminal is an intra-frequency terminal, downlink data is transmitted to the terminal through the downlink channel of the second node; and when the terminal is an inter-frequency terminal, downlink data is transmitted to the terminal through the downlink channel of the first node. The wireless communication method is compatible with intra-frequency terminals and inter-frequency terminals, and the inter-frequency terminal transmits uplink data through the first node and receive downlink data through the second node, thus implementing duplex communication and improving communication efficiency.

20 Claims, 20 Drawing Sheets

(56) References Cited

U.S. PATENT DOCUMENTS

| | | | |
|---|---|---|---|
| 10,505,666 B2 | 12/2019 | Teboulle et al. | |
| 2014/0071862 A1* | 3/2014 | Ji | H04L 5/001 370/280 |
| 2014/0133477 A1* | 5/2014 | Siomina | H04W 56/001 370/350 |
| 2016/0192376 A1* | 6/2016 | Lee | H04W 72/0406 370/252 |
| 2017/0142632 A1* | 5/2017 | Panchal | H04W 36/0058 |
| 2017/0230961 A1 | 8/2017 | Park et al. | |
| 2017/0273079 A1 | 9/2017 | Park et al. | |
| 2018/0054231 A1 | 2/2018 | Malach | |
| 2019/0132774 A1 | 5/2019 | Jang et al. | |
| 2019/0132836 A1 | 5/2019 | Li et al. | |
| 2019/0349848 A1 | 11/2019 | Bali | |
| 2019/0386790 A1 | 12/2019 | Hawinkel et al. | |
| 2020/0374726 A1* | 11/2020 | Harada | H04L 1/0026 |

FOREIGN PATENT DOCUMENTS

| | | |
|---|---|---|
| CN | 103546976 A | 1/2014 |
| CN | 104247491 A | 12/2014 |
| CN | 104735731 A | 6/2015 |
| CN | 105659687 A | 6/2016 |
| WO | WO2009113930 A1 | 9/2009 |
| WO | WO2016206461 A1 | 12/2016 |

OTHER PUBLICATIONS

Translation of Written Opinion dated Oct. 17, 2618, from corresponding CN PCT Application No. PCT/CN2018/100747, 3 pages.
Translation of CN Office Action dated Dec. 21, 2022, from corresponding CN Application No. 201710742086.9, 8 pages.

* cited by examiner

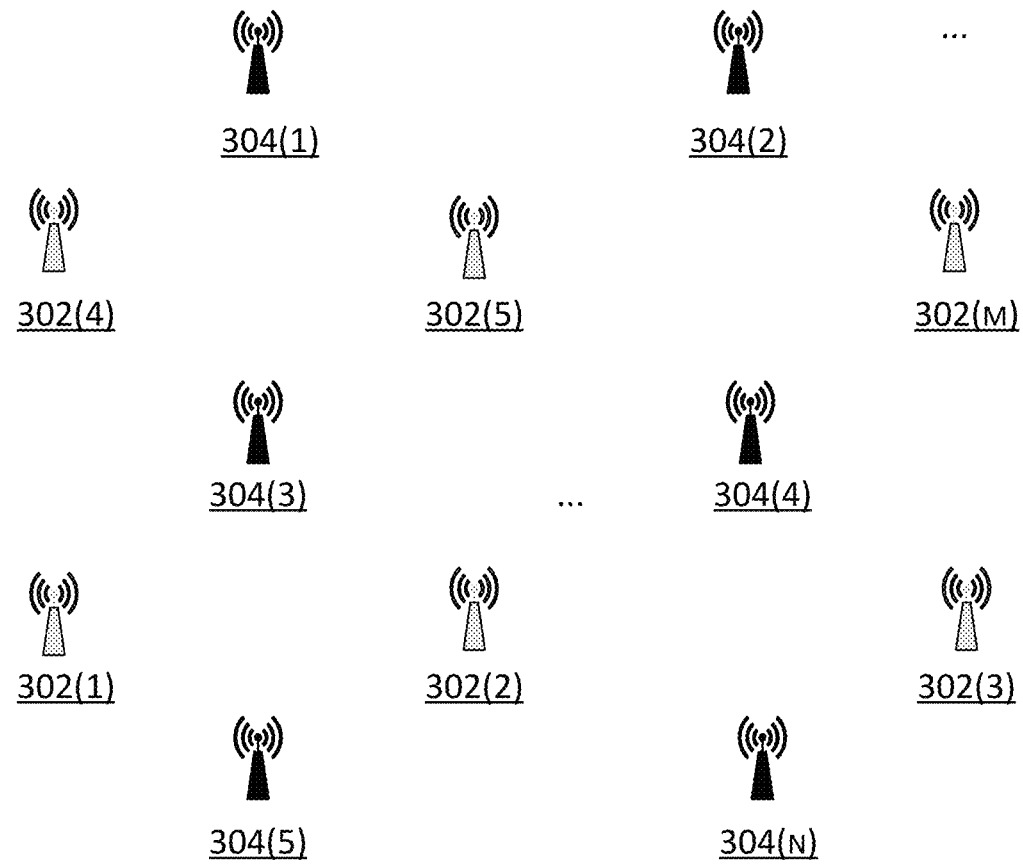
 First node
 Second node
FIG. 3

WHEN PRESET TRIGGER EVENT IS DETECTED OR PRESET TIME IS REACHED, TERMINAL TRANSMITS UPLINK DATA TO FIRST NODE THROUGH UPLINK CHANNEL OF FIRST NODE
S702

WHEN TERMINAL IS INTRA-FREQUENCY TERMINAL, RECEIVE DOWNLINK DATA FROM DOWNLINK CHANNEL OF SECOND NODE
S704

FIG. 7

THE SERVER RECEIVES UPLINK DATA OF FIRST GATEWAY, WHEREIN UPLINK DATA IS DATA TRANSMITTED BY SENSING TERMINAL THROUGH UPLINK CHANNEL AT FIRST FREQUENCY BAND
S802

THE SERVER GENERATES DOWNLINK DATA ACCORDING TO UPLINK DATA
S804

WHEN SENSING TERMINAL IS INTRA-FREQUENCY SENSING TERMINAL, SERVER TRANSMITS DOWNLINK DATA TO SECOND GATEWAY, WHEREIN SECOND GATEWAY IS CONFIGURED TO TRANSMIT DOWNLINK DATA TO INTRA-FREQUENCY SENSING TERMINAL THROUGH DOWNLINK CHANNEL AT FIRST FREQUENCY BAND
S806

WHEN SENSING TERMINAL IS INTER-FREQUENCY SENSING TERMINAL, SERVER TRANSMITS DOWNLINK DATA TO FIRST GATEWAY, WHEREIN FIRST GATEWAY IS CONFIGURED TO TRANSMIT DOWNLINK DATA TO INTER-FREQUENCY SENSING TERMINAL THROUGH DOWNLINK CHANNEL AT SECOND FREQUENCY BAND
S808

FIG. 8

```
┌─────────────────────────────────────────────────────────┐
│  WHEN PRESET TRIGGER EVENT IS DETECTED OR PRESET TIME   │
│  IS REACHED, SENSING TERMINAL TRANSMITS UPLINK DATA TO  │
│  FIRST GATEWAY THROUGH UPLINK CHANNEL AT FIRST          │
│  FREQUENCY BAND; AND FIRST GATEWAY TRANSMITS UPLINK     │
│  DATA TO SERVER                                          │
│                        S902                              │
└─────────────────────────────────────────────────────────┘
                            │
                            ▼
┌─────────────────────────────────────────────────────────┐
│  WHEN SENSING TERMINAL IS INTRA-FREQUENCY SENSING       │
│  TERMINAL, RECEIVE DOWNLINK DATA OF SECOND GATEWAY      │
│  FROM DOWNLINK CHANNEL OF WHICH FREQUENCY BAND IS       │
│  FIRST FREQUENCY BAND OF SECOND GATEWAY, WHEREIN        │
│  DOWNLINK DATA IS DATA TRANSMITTED BY SERVER TO         │
│  SECOND GATEWAY                                          │
│                        S904                              │
└─────────────────────────────────────────────────────────┘
                            │
                            ▼
┌─────────────────────────────────────────────────────────┐
│  WHEN SENSING TERMINAL IS INTER-FREQUENCY SENSING       │
│  TERMINAL, RECEIVE DOWNLINK DATA OF FIRST GATEWAY FROM  │
│  DOWNLINK CHANNEL OF WHICH FREQUENCY BAND IS SECOND     │
│  FREQUENCY BAND OF FIRST GATEWAY, WHEREIN DOWNLINK      │
│  DATA IS DATA TRANSMITTED BY SERVER TO FIRST GATEWAY    │
│                        S906                              │
└─────────────────────────────────────────────────────────┘
```

FIG. 9

THE SERVER RECEIVES UPLINK DATA OF FIRST GATEWAY, WHEREIN UPLINK DATA IS DATA TRANSMITTED BY INTRA-FREQUENCY SENSING TERMINAL THROUGH UPLINK CHANNEL AT FIRST FREQUENCY BAND
s1002

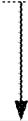

THE SERVER GENERATES DOWNLINK DATA ACCORDING TO UPLINK DATA
s1004

THE SERVER TRANSMITS DOWNLINK DATA TO SECOND GATEWAY, WHEREIN SECOND GATEWAY IS CONFIGURED TO TRANSMIT DOWNLINK DATA TO INTRA-FREQUENCY SENSING TERMINAL THROUGH DOWNLINK CHANNEL AT FIRST FREQUENCY BAND
s1006

FIG. 10

WHEN PRESET TRIGGER EVENT IS DETECTED OR PRESET TIME IS REACHED, INTRA-FREQUENCY SENSING TERMINAL TRANSMITS UPLINK DATA TO FIRST GATEWAY THROUGH UPLINK CHANNEL AT FIRST FREQUENCY BAND; AND FIRST GATEWAY TRANSMITS UPLINK DATA TO SERVER
S1102

RECEIVE REQUEST FOR ESTABLISHING DOWNLINK CHANNEL OF WHICH FREQUENCY BAND IS FIRST FREQUENCY BAND FROM SECOND GATEWAY
S1104

ESTABLISH DOWNLINK CHANNEL OF WHICH FREQUENCY BAND IS FIRST FREQUENCY BAND WITH SECOND GATEWAY
S1106

RECEIVE DOWNLINK DATA THROUGH DOWNLINK CHANNEL OF WHICH FREQUENCY BAND IS FIRST FREQUENCY BAND
S1108

FIG. 11

WIRELESS COMMUNICATION METHOD AND DEVICE

CROSS REFERENCE TO RELATED PATENT APPLICATIONS

This application claims priority to and is a continuation of PCT Patent Application No. PCT/CN2018/100747, filed on 16 Aug. 2018 and entitled "WIRELESS COMMUNICATION METHOD AND DEVICE," which claims priority to Chinese Patent Application No. 201710742086.9, filed on 25 Aug. 2017 and entitled "WIRELESS COMMUNICATION METHOD AND DEVICE," which are incorporated herein by reference in their entirety.

TECHNICAL FIELD

The present disclosure relates to the field of communication technologies, and, more particularly, to wireless communication methods and devices.

BACKGROUND

With the development of the Internet of Things (IoT) technologies, the IoT has become more widely used. The IoT is a combination of sensor networks and the Internet. Sensor networks are used for data collection and short-distance data transmission, and the Internet is used for long-distance data transmission and data services.

At present, the low-power wide area IoT is mainly a star network, and sensors in the IoT communicate with the gateway through a wireless module. A LoRa (long range) wireless module is a wireless communication module based on spread spectrum modulation technology. Featured with long transmission distance, low transmission power consumption and strong anti-interference, LoRa wireless module has been widely used in sensor networks of the IoT, especially in the environment monitoring, industrial control, smart home and other fields.

The LoRa wireless module and the LoRa gateway form a LoRa network, and the LoRa wireless module is connected to an Internet server through the LoRa gateway. At present, the LoRa network is generally deployed as an intra-frequency network or an inter-frequency network. In the intra-frequency network, the LoRa gateway and the LoRa wireless module can only perform simple communication, resulting in low network efficiency and small capacity. The inter-frequency LoRa wireless module cannot access the intra-frequency network. The Inter-frequency network requires a wide wireless spectrum and cannot meet the needs of most IoT apparatus with narrow bandwidths. In addition, if the LoRa network deploys an intra-frequency network and an inter-frequency network at the same time, it needs more wireless spectrum resources and a doubled number of LoRa gateways, increasing the cost. Moreover, the LoRa gateway and the LoRa wireless module in the inter-frequency network cannot perform duplex communication.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

In view of the above problems, example embodiments of the present disclosure are provided in order to provide wireless communication methods and devices to overcome the above problems or at least partially solve the above problems.

In order to solve the above problems, example embodiments of the present disclosure disclose a wireless communication method applied to a wireless network. The wireless network includes a terminal, a first node, and a second node, the frequency band of an uplink channel of the first node is identical to the frequency band of a downlink channel of the second node, and the frequency band of the uplink channel of the first node is different from the frequency band of a downlink channel of the first node. The method includes:

receiving uplink data from the terminal through the uplink channel of the first node;

when the terminal is an intra-frequency terminal, transmitting downlink data to the terminal through the downlink channel of the second node; and when the terminal is an inter-frequency terminal, transmitting downlink data to the terminal through the downlink channel of the first node.

For example, the downlink data is data generated by the first node according to the uplink data.

For example, the wireless network further includes an application terminal, and the downlink data is data generated by the application terminal according to uplink data received from the first node.

For example, the intra-frequency terminal is a device that uses different frequency bands or frequency bands that are not adjacent for downlink and uplink in full duplex mode.

For example, the inter-frequency terminal is a device that uses same frequency band or adjacent frequency bands for downlink and uplink in full duplex mode.

For example, whether the terminal is an intra-frequency terminal or an inter-frequency terminal is determined by the following steps:

obtaining type information of the terminal from the uplink data or according to a terminal identifier reported by the terminal;

when the type information indicates an intra-frequency terminal, determining that the terminal is an intra-frequency terminal; or when the type information indicates an inter-frequency terminal, determining that the terminal is an inter-frequency terminal.

For example, the uplink and downlink channels of the first node and the second node are configured as follows:

obtaining a communication frequency band of the wireless network;

dividing the communication frequency band into a plurality of sub-bands;

determining at least one first frequency band from the plurality of sub-bands, wherein the at least one first frequency band is a frequency band used by the first node to receive uplink data of the inter-frequency terminal;

determining at least one second frequency band from the plurality of sub-bands, wherein the at least one second frequency band is a frequency band used by the first node to receive uplink data of the intra-frequency terminal and used by the second node to transmit downlink data to the intra-frequency terminal;

determining at least one third frequency band from the plurality of sub-bands, wherein the at least one third frequency band is a frequency band used by the second node to receive uplink data of the inter-frequency terminal;

determining at least one fourth frequency band from the plurality of sub-bands, wherein the at least one fourth frequency band is a frequency band used by the second node to receive uplink data of the intra-frequency terminal and used by the first node to transmit downlink data to the intra-frequency terminal; and respectively dividing the at least one first frequency band, the at least one second frequency band, the at least one third frequency band, and the at least one fourth frequency band into a plurality of channels according to a preset channel division rule.

For example, the first frequency band and the second frequency band are partially overlapped or completely overlapped, and the third frequency band and the fourth frequency band are partially overlapped or completely overlapped.

For example, the step of transmitting downlink data to the terminal through the downlink channel of the second node includes:

determining a second node having a communication distance covering the intra-frequency terminal;

transmitting the downlink data to the second node; and transmitting, by the second node, downlink data to the terminal through a downlink channel.

In order to solve the above problems, example embodiments of the present disclosure disclose a wireless communication method applied to a wireless network. The wireless network includes a terminal, a first node, and a second node, the frequency band of an uplink channel of the first node is identical to the frequency band of a downlink channel of the second node, and the frequency band of the uplink channel of the first node is different from the frequency band of a downlink channel of the first node. The method includes:

when a preset trigger event is detected or a preset time is reached, transmitting, by the terminal, uplink data to the first node through the uplink channel of the first node;

when the terminal is an intra-frequency terminal, receiving downlink data from the downlink channel of the second node; and when the terminal is an inter-frequency terminal, receiving downlink data from the downlink channel of the first node.

For example, the downlink data is data generated by the first node according to the uplink data.

For example, the wireless network further includes an application terminal, and the downlink data is data generated by the application terminal according to uplink data received from the first node.

For example, when the terminal is an intra-frequency terminal, the step of receiving downlink data from the downlink channel of the second node includes:

receiving a request for establishing a downlink channel from the second node;

establishing a downlink channel with the second node; and receiving the downlink data through the downlink channel of the second node.

For example, the uplink and downlink channels of the first node and the second node are configured as follows:

obtaining a communication frequency band of the wireless network;

dividing the communication frequency band into a plurality of sub-bands;

determining at least one first frequency band from the plurality of sub-bands, wherein the at least one first frequency band is a frequency band used by the first node to receive uplink data of the inter-frequency terminal;

determining at least one second frequency band from the plurality of sub-bands, wherein the at least one second frequency band is a frequency band used by the first node to receive uplink data of the intra-frequency terminal and used by the second node to transmit downlink data to the intra-frequency terminal;

determining at least one third frequency band from the plurality of sub-bands, wherein the at least one third frequency band is a frequency band used by the second node to receive uplink data of the inter-frequency terminal;

determining at least one fourth frequency band from the plurality of sub-bands, wherein the at least one fourth frequency band is a frequency band used by the second node to receive uplink data of the intra-frequency terminal and used by the first node to transmit downlink data to the intra-frequency terminal; and respectively dividing the at least one first frequency band, the at least one second frequency band, the at least one third frequency band, and the at least one fourth frequency band into a plurality of channels according to a preset channel division rule.

For example, the first frequency band and the second frequency band are partially overlapped or completely overlapped, and the third frequency band and the fourth frequency band are partially overlapped or completely overlapped.

In order to solve the above problems, the example embodiments of the present disclosure disclose a wireless communication method applied to a wireless network. The wireless network includes a terminal, a first node, and a second node, the frequency band of an uplink channel of the first node is identical to the frequency band of a downlink channel of the second node, and the frequency band of the uplink channel of the first node is different from the frequency band of a downlink channel of the first node. The method includes:

receiving uplink data from the terminal through the uplink channel of the first node; and when the terminal is an intra-frequency terminal, transmitting downlink data to the terminal through the downlink channel of the second node.

In order to solve the above problems, example embodiments of the present disclosure disclose a wireless communication method applied to a wireless network. The wireless network includes a terminal, a first node, and a second node, the frequency band of an uplink channel of the first node is identical to the frequency band of a downlink channel of the second node, and the frequency band of the uplink channel of the first node is different from the frequency band of a downlink channel of the first node. The method includes:

when a preset trigger event is detected or a preset time is reached, transmitting, by the terminal, uplink data to the first node through the uplink channel of the first node; and when the terminal is an intra-frequency terminal, receiving downlink data from the downlink channel of the second node.

In order to solve the above problems, example embodiments of the present disclosure disclose a wireless communication method applied to a wireless network. The wireless network includes a sensing terminal, and a first gateway and a second gateway that are connected with a server, the frequency band of an uplink channel of the first gateway is a first frequency band, the frequency band of a downlink channel of the first gateway is a second frequency band, and the frequency band of a downlink channel of the second gateway is a first frequency band. The method includes:

receiving uplink data of the first gateway by the server, wherein the uplink data is data transmitted by the sensing terminal through an uplink channel at the first frequency band;

generating downlink data by the server according to the uplink data; and when the sensing terminal is an intra-frequency sensing terminal, transmitting the downlink data to the second gateway by the server, wherein the second gateway is configured to transmit the downlink data to the intra-frequency sensing terminal through a downlink channel at the first frequency band; or when the sensing terminal is an inter-frequency sensing terminal, transmitting the downlink data to the first gateway by the server, wherein the first gateway is configured to transmit the downlink data to the inter-frequency sensing terminal through a downlink channel at the second frequency band.

For example, the wireless network further includes an application terminal, wherein the application terminal is connected with the server, and then the downlink data further includes data generated by the application terminal according to uplink data in the server.

For example, whether the sensing terminal is an intra-frequency sensing terminal or an inter-frequency sensing terminal is determined by the following steps:

obtaining type information of the sensing terminal from the uplink data or according to a terminal identifier reported by the sensing terminal; and when the type information indicates an intra-frequency sensing terminal, determining that the sensing terminal is an intra-frequency sensing terminal; or when the type information indicates an inter-frequency sensing terminal, determining that the sensing terminal is an inter-frequency sensing terminal.

For example, the uplink and downlink channels of the first gateway and the second gateway are configured as follows:

obtaining a communication frequency band of the wireless network;

dividing the communication frequency band into a plurality of sub-bands;

determining at least one first frequency band from the plurality of sub-bands, wherein the at least one first frequency band is a frequency band used by the first gateway to receive uplink data of the inter-frequency sensing terminal;

determining at least one second frequency band from the plurality of sub-bands, wherein the at least one second frequency band is a frequency band used by the first gateway to receive uplink data of the intra-frequency sensing terminal and used by the second gateway to transmit downlink data to the intra-frequency sensing terminal;

determining at least one third frequency band from the plurality of sub-bands, wherein the at least one third frequency band is a frequency band used by the second gateway to receive uplink data of the inter-frequency sensing terminal;

determining at least one fourth frequency band from the plurality of sub-bands, wherein the at least one fourth frequency band is a frequency band used by the second gateway to receive uplink data of the intra-frequency sensing terminal and used by the first gateway to transmit downlink data to the intra-frequency sensing terminal; and respectively dividing the at least one first frequency band, the at least one second frequency band, the at least one third frequency band, and the at least one fourth frequency band into a plurality of channels according to a preset channel division rule.

For example, the first frequency band and the second frequency band are partially overlapped or completely overlapped, and the third frequency band and the fourth frequency band are partially overlapped or completely overlapped.

For example, when the sensing terminal is an intra-frequency sensing terminal, the step of transmitting the downlink data to the second gateway by the server includes:

determining a second gateway having a communication distance covering the intra-frequency sensing terminal; and transmitting the downlink data to the second gateway, wherein the second gateway is configured to transmit the downlink data to the intra-frequency sensing terminal through a downlink channel of which the frequency band is the first frequency band.

In order to solve the above problems, example embodiments of the present disclosure disclose a wireless communication method applied to a wireless network. The wireless network includes a sensing terminal, and a first gateway and a second gateway that are connected with a server, the frequency band of an uplink channel of the first gateway is a first frequency band, the frequency band of a downlink channel of the first gateway is a second frequency band, and the frequency band of a downlink channel of the second gateway is a first frequency band. The method includes:

when a preset trigger event is detected or a preset time is reached, transmitting, by the sensing terminal, uplink data to the first gateway through an uplink channel at the first frequency band; and transmitting the uplink data to the server by the first gateway; and when the sensing terminal is an intra-frequency sensing terminal, receiving downlink data of the second gateway from a downlink channel of which the frequency band is the first frequency band of the second gateway, wherein the downlink data is data transmitted by the server to the second gateway; or when the sensing terminal is an inter-frequency sensing terminal, receiving downlink data of the first gateway from a downlink channel of which the frequency band is the second frequency band of the first gateway, wherein the downlink data is data transmitted by the server to the first gateway.

For example, the wireless network further includes an application terminal, wherein the application terminal is connected with the server, and then the downlink data is data generated by the server according to the uplink data, or the downlink data is data generated by the application terminal according to uplink data in the server.

For example, when the sensing terminal is an intra-frequency sensing terminal, the step of receiving downlink data of the second gateway from a downlink channel of which the frequency band is the first frequency band of the second gateway includes:

receiving a request for establishing a downlink channel of which the frequency band is the first frequency band from the second gateway;

establishing a downlink channel of which the frequency band is the first frequency band with the second gateway; and receiving the downlink data through the downlink channel of which the frequency band is the first frequency band.

For example, the uplink and downlink channels of the first gateway and the second gateway are configured as follows:

obtaining a communication frequency band of the wireless network;

dividing the communication frequency band into a plurality of sub-bands;

determining at least one first frequency band from the plurality of sub-bands, wherein the at least one first frequency band is a frequency band used by the first gateway to receive uplink data of the inter-frequency sensing terminal;

determining at least one second frequency band from the plurality of sub-bands, wherein the at least one second frequency band is a frequency band used by the first gateway to receive uplink data of the intra-frequency sensing terminal and used by the second gateway to transmit downlink data to the intra-frequency sensing terminal;

determining at least one third frequency band from the plurality of sub-bands, wherein the at least one third frequency band is a frequency band used by the second gateway to receive uplink data of the inter-frequency sensing terminal;

determining at least one fourth frequency band from the plurality of sub-bands, wherein the at least one fourth frequency band is a frequency band used by the second gateway to receive uplink data of the intra-frequency sensing terminal and used by the first gateway to transmit downlink data to the intra-frequency sensing terminal; and respectively dividing the at least one first frequency band, the at least one second frequency band, the at least one third frequency band, and the at least one fourth frequency band into a plurality of channels according to a preset channel division rule.

For example, the first frequency band and the second frequency band are partially overlapped or completely overlapped, and the third frequency band and the fourth frequency band are partially overlapped or completely overlapped.

In order to solve the above problems, example embodiments of the present disclosure disclose a wireless communication method applied to a wireless network. The wireless network includes an intra-frequency sensing terminal, a first gateway and a second gateway that are connected with a server, and an application terminal, the frequency band of an uplink channel of the first gateway is a first frequency band, and the frequency band of a downlink channel of the second gateway is a first frequency band. The method includes:

receiving uplink data of the first gateway by the server, wherein the uplink data is data transmitted by the intra-frequency sensing terminal through an uplink channel at the first frequency band;

generating downlink data by the server according to the uplink data; and transmitting the downlink data to the second gateway by the server, wherein the second gateway is configured to transmit the downlink data to the intra-frequency sensing terminal through a downlink channel at the first frequency band.

For example, the wireless network further includes an application terminal, wherein the application terminal is connected with the server, and then the downlink data further includes data generated by the application terminal according to uplink data in the server.

For example, the uplink and downlink channels of the first gateway and the second gateway are configured as follows:

obtaining a communication frequency band of the wireless network;

dividing the communication frequency band into a plurality of sub-bands;

determining at least one first frequency band from the plurality of sub-bands, wherein the at least one first frequency band is a frequency band used by the first gateway to receive uplink data of the inter-frequency sensing terminal;

determining at least one second frequency band from the plurality of sub-bands, wherein the at least one second frequency band is a frequency band used by the first gateway to receive uplink data of the intra-frequency sensing terminal and used by the second gateway to transmit downlink data to the intra-frequency sensing terminal;

determining at least one third frequency band from the plurality of sub-bands, wherein the at least one third frequency band is a frequency band used by the second gateway to receive uplink data of the inter-frequency sensing terminal;

determining at least one fourth frequency band from the plurality of sub-bands, wherein the at least one fourth frequency band is a frequency band used by the second gateway to receive uplink data of the intra-frequency sensing terminal and used by the first gateway to transmit downlink data to the intra-frequency sensing terminal; and respectively dividing the at least one first frequency band, the at least one second frequency band, the at least one third frequency band, and the at least one fourth frequency band into a plurality of channels according to a preset channel division rule.

For example, the first frequency band and the second frequency band are partially overlapped or completely overlapped, and the third frequency band and the fourth frequency band are partially overlapped or completely overlapped.

For example, the step of transmitting the downlink data to the second gateway by the server includes:

determining a second gateway having a communication distance covering the intra-frequency sensing terminal; and transmitting the downlink data to the second gateway, wherein the second gateway is configured to transmit the downlink data to the intra-frequency sensing terminal through a downlink channel of which the frequency band is the first frequency band.

In order to solve the above problems, example embodiments of the present disclosure disclose a wireless communication method applied to a wireless network. The wireless network includes an intra-frequency sensing terminal, and a first gateway and a second gateway that are connected with a server, the frequency band of an uplink channel of the first gateway is a first frequency band, and the frequency band of a downlink channel of the second gateway is a first frequency band. The method includes:

when a preset trigger event is detected or a preset time is reached, transmitting, by the intra-frequency sensing terminal, uplink data to the first gateway through an uplink channel at the first frequency band; and transmitting the uplink data to the server by the first gateway;

receiving a request for establishing a downlink channel of which the frequency band is the first frequency band from the second gateway;

establishing a downlink channel of which the frequency band is the first frequency band with the second gateway; and receiving the downlink data through the downlink channel of which the frequency band is the first frequency band.

For example, the wireless network further includes an application terminal, wherein the application terminal is connected with the server, and then the downlink data is data generated by the server according to the uplink data, or the downlink data is data generated by the application terminal according to uplink data in the server.

For example, the uplink and downlink channels of the first gateway and the second gateway are configured as follows:

obtaining a communication frequency band of the wireless network;

dividing the communication frequency band into a plurality of sub-bands;

determining at least one first frequency band from the plurality of sub-bands, wherein the at least one first frequency band is a frequency band used by the first gateway to receive uplink data of the inter-frequency sensing terminal;

determining at least one second frequency band from the plurality of sub-bands, wherein the at least one second frequency band is a frequency band used by the first gateway to receive uplink data of the intra-frequency sensing terminal and used by the second gateway to transmit downlink data to the intra-frequency sensing terminal;

determining at least one third frequency band from the plurality of sub-bands, wherein the at least one third frequency band is a frequency band used by the second gateway to receive uplink data of the inter-frequency sensing terminal;

determining at least one fourth frequency band from the plurality of sub-bands, wherein the at least one fourth frequency band is a frequency band used by the second gateway to receive uplink data of the intra-frequency sensing terminal and used by the first gateway to transmit downlink data to the intra-frequency sensing terminal; and respectively dividing the at least one first frequency band, the at least one second frequency band, the at least one third frequency band, and the at least one fourth frequency band into a plurality of channels according to a preset channel division rule.

For example, the first frequency band and the second frequency band are partially overlapped or completely overlapped, and the third frequency band and the fourth frequency band are partially overlapped or completely overlapped.

In order to solve the above problems, example embodiments of the present disclosure disclose a wireless communication device applied to a wireless network. The wireless network includes a terminal, a first node, and a second node, the frequency band of an uplink channel of the first node is identical to the frequency band of a downlink channel of the second node, and the frequency band of the uplink channel of the first node is different from the frequency band of a downlink channel of the first node. The device includes:

a first uplink data receiving module, configured to receive uplink data from the terminal through the uplink channel of the first node;

a first downlink data transmitting module, configured to transmit downlink data to the terminal through the downlink channel of the second node when the terminal is an intra-frequency terminal; and a second downlink data transmitting module, configured to transmit downlink data to the terminal through the downlink channel of the first node when the terminal is an inter-frequency terminal.

For example, the downlink data is data generated by the first node according to the uplink data.

For example, the wireless network further includes an application terminal, and the downlink data is data generated by the application terminal according to uplink data received from the first node.

For example, the device further includes:

a first type information obtaining module, configured to obtain type information of the terminal from the uplink data or according to a terminal identifier reported by the terminal;

a first type determining module, configured to determine that the terminal is an intra-frequency terminal when the type information indicates an intra-frequency terminal; and a second type determining module, configured to determine that the terminal is an inter-frequency terminal when the type information indicates an inter-frequency terminal.

For example, the device further includes a node configuration module, wherein the node configuration module includes:

a communication frequency band obtaining submodule, configured to obtain a communication frequency band of the wireless network;

a frequency band dividing submodule, configured to divide the communication frequency band into a plurality of sub-bands;

a first frequency band determining submodule, configured to determine at least one first frequency band from the plurality of sub-bands, wherein the at least one first frequency band is a frequency band used by the first node to receive uplink data of the inter-frequency terminal;

a second frequency band determining submodule, configured to determine at least one second frequency band from the plurality of sub-bands, wherein the at least one second frequency band is a frequency band used by the first node to receive uplink data of the intra-frequency terminal and used by the second node to transmit downlink data to the intra-frequency terminal;

a third frequency band determining submodule, configured to determine at least one third frequency band from the plurality of sub-bands, wherein the at least one third frequency band is a frequency band used by the second node to receive uplink data of the inter-frequency terminal;

a fourth frequency band determining submodule, configured to determine at least one fourth frequency band from the plurality of sub-bands, wherein the at least one fourth frequency band is a frequency band used by the second node to receive uplink data of the intra-frequency terminal and used by the first node to transmit downlink data to the intra-frequency terminal; and a channel dividing submodule, configured to respectively divide the at least one first frequency band, the at least one second frequency band, the at least one third frequency band, and the at least one fourth frequency band into a plurality of channels according to a preset channel division rule.

For example, the first frequency band and the second frequency band are partially overlapped or completely overlapped, and the third frequency band and the fourth frequency band are partially overlapped or completely overlapped.

For example, the first downlink data transmitting module includes:

a second node determining submodule, configured to determine a second node having a communication distance covering the intra-frequency terminal;

a first downlink data transmitting submodule, configured to transmit the downlink data to the second node; and a second downlink data transmitting submodule, configured for the second node to transmit downlink data to the terminal through a downlink channel.

In order to solve the above problems, example embodiments of the present disclosure disclose a wireless communication device applied to a wireless network. The wireless network includes a terminal, a first node, and a second node, the frequency band of an uplink channel of the first node is identical to the frequency band of a downlink channel of the second node, and the frequency band of the uplink channel of the first node is different from the frequency band of a downlink channel of the first node. The device includes:

a first uplink data transmitting module, configured for the terminal to transmit uplink data to the first node through the uplink channel of the first node when a preset trigger event is detected or a preset time is reached;

a first downlink data receiving module, configured to receive downlink data from the downlink channel of the second node when the terminal is an intra-frequency terminal; and a second downlink data receiving module, configured to receive downlink data from the downlink channel of the first node when the terminal is an inter-frequency terminal.

For example, the downlink data is data generated by the first node according to the uplink data.

For example, the wireless network further includes an application terminal, and the downlink data is data generated by the application terminal according to uplink data received from the first node.

For example, the first downlink data receiving module includes:

a first downlink channel establishment request receiving submodule, configured to receive a request for establishing a downlink channel from the second node;

a first downlink channel establishing submodule, configured to establish a downlink channel with the second node; and a first downlink data receiving submodule, configured to receive the downlink data through the downlink channel of the second node.

For example, the device further includes a node configuration module, wherein the node configuration module includes:

a communication frequency band obtaining submodule, configured to obtain a communication frequency band of the wireless network;

a frequency band dividing submodule, configured to divide the communication frequency band into a plurality of sub-bands;

a first frequency band determining submodule, configured to determine at least one first frequency band from the plurality of sub-bands, wherein the at least one first frequency band is a frequency band used by the first node to receive uplink data of the inter-frequency terminal;

a second frequency band determining submodule, configured to determine at least one second frequency band from the plurality of sub-bands, wherein the at least one second frequency band is a frequency band used by the first node to receive uplink data of the intra-frequency terminal and used by the second node to transmit downlink data to the intra-frequency terminal;

a third frequency band determining submodule, configured to determine at least one third frequency band from the plurality of sub-bands, wherein the at least one third frequency band is a frequency band used by the second node to receive uplink data of the inter-frequency terminal;

a fourth frequency band determining submodule, configured to determine at least one fourth frequency band from the plurality of sub-bands, wherein the at least one fourth frequency band is a frequency band used by the second node to receive uplink data of the intra-frequency terminal and used by the first node to transmit downlink data to the intra-frequency terminal; and a channel dividing submodule, configured to respectively divide the at least one first frequency band, the at least one second frequency band, the at least one third frequency band, and the at least one fourth frequency band into a plurality of channels according to a preset channel division rule.

For example, the first frequency band and the second frequency band are partially overlapped or completely overlapped, and the third frequency band and the fourth frequency band are partially overlapped or completely overlapped.

In order to solve the above problems, example embodiments of the present disclosure disclose a wireless communication device applied to a wireless network. The wireless network includes a terminal, a first node, and a second node, the frequency band of an uplink channel of the first node is identical to the frequency band of a downlink channel of the second node, and the frequency band of the uplink channel of the first node is different from the frequency band of a downlink channel of the first node. The device includes:

a first uplink data receiving module, configured to receive uplink data from the terminal through the uplink channel of the first node; and a first downlink data transmitting module, configured to transmit downlink data to the terminal through the downlink channel of the second node when the terminal is an intra-frequency terminal.

In order to solve the above problems, example embodiments of the present disclosure disclose a wireless communication device applied to a wireless network. The wireless network includes a terminal, a first node, and a second node, the frequency band of an uplink channel of the first node is identical to the frequency band of a downlink channel of the second node, and the frequency band of the uplink channel of the first node is different from the frequency band of a downlink channel of the first node. The device includes:

a first uplink data transmitting module, configured for the terminal to transmit uplink data to the first node through the uplink channel of the first node when a preset trigger event is detected or a preset time is reached; and a first downlink data receiving module, configured to receive downlink data from the downlink channel of the second node when the terminal is an intra-frequency terminal.

In order to solve the above problems, example embodiments of the present disclosure disclose a wireless communication device applied to a wireless network. The wireless network includes a sensing terminal, and a first gateway and a second gateway that are connected with a server, the frequency band of an uplink channel of the first gateway is a first frequency band, the frequency band of a downlink channel of the first gateway is a second frequency band, and the frequency band of a downlink channel of the second gateway is a first frequency band. The device includes:

a second uplink data receiving module, configured to receive uplink data of the first gateway, wherein the uplink data is data transmitted by the sensing terminal through an uplink channel at the first frequency band;

a first downlink data generating module, configured to generate the downlink data according to the uplink data;

a third downlink data transmitting module, configured for the server to transmit the downlink data to the second gateway when the sensing terminal is an intra-frequency sensing terminal, wherein the second gateway is configured to transmit the downlink data to the intra-frequency sensing terminal through a downlink channel at the first frequency band; and a fourth downlink data transmitting module, configured for the server to transmit the downlink data to the first gateway when the sensing terminal is an inter-frequency sensing terminal, wherein the first gateway is configured to transmit the downlink data to the inter-frequency sensing terminal through a downlink channel at the second frequency band.

For example, the wireless network further includes an application terminal, wherein the application terminal is connected with the server, and then the downlink data further includes data generated by the application terminal according to uplink data in the server.

For example, the device further includes:

a second type information obtaining module, configured to obtain type information of the sensing terminal from the uplink data or according to a terminal identifier reported by the sensing terminal;

a third type determining module, configured to determine that the sensing terminal is an intra-frequency sensing terminal when the type information indicates an intra-frequency sensing terminal; and a fourth type determining module, configured to determine that the sensing terminal is an inter-frequency sensing terminal when the type information indicates an inter-frequency sensing terminal.

For example, the device further includes a gateway configuration module, wherein the gateway configuration module includes:

a communication frequency band obtaining submodule, configured to obtain a communication frequency band of the wireless network;

a frequency band dividing submodule, configured to divide the communication frequency band into a plurality of sub-bands;

a first frequency band determining submodule, configured to determine at least one first frequency band from the plurality of sub-bands, wherein the at least one first frequency band is a frequency band used by the first gateway to receive uplink data of the inter-frequency sensing terminal;

a second frequency band determining submodule, configured to determine at least one second frequency band from the plurality of sub-bands, wherein the at least one second frequency band is a frequency band used by the first gateway to receive uplink data of the intra-frequency sensing terminal and used by the second gateway to transmit downlink data to the intra-frequency sensing terminal;

a third frequency band determining submodule, configured to determine at least one third frequency band from the plurality of sub-bands, wherein the at least one third frequency band is a frequency band used by the second gateway to receive uplink data of the inter-frequency sensing terminal;

a fourth frequency band determining submodule, configured to determine at least one fourth frequency band from the plurality of sub-bands, wherein the at least one fourth frequency band is a frequency band used by the second gateway to receive uplink data of the intra-frequency sensing terminal and used by the first gateway to transmit downlink data to the intra-frequency sensing terminal; and a channel dividing submodule, configured to respectively divide the at least one first frequency band, the at least one second frequency band, the at least one third frequency band, and the at least one fourth frequency band into a plurality of channels according to a preset channel division rule.

For example, the first frequency band and the second frequency band are partially overlapped or completely overlapped, and the third frequency band and the fourth frequency band are partially overlapped or completely overlapped.

For example, the first downlink data transmitting module includes:

a second gateway determining submodule, configured to determine a second gateway having a communication distance covering the intra-frequency sensing terminal; and a third downlink data transmitting submodule, configured to transmit the downlink data to the second gateway, wherein the second gateway is configured to transmit the downlink data to the intra-frequency sensing terminal through a downlink channel of which the frequency band is the first frequency band.

In order to solve the above problems, example embodiments of the present disclosure disclose a wireless communication device applied to a wireless network. The wireless network includes a sensing terminal, and a first gateway and a second gateway that are connected with a server, the frequency band of an uplink channel of the first gateway is a first frequency band, the frequency band of a downlink channel of the first gateway is a second frequency band, and the frequency band of a downlink channel of the second gateway is a first frequency band. The device includes:

a second uplink data transmitting module, configured for the sensing terminal to transmit uplink data to the first gateway through an uplink channel at the first frequency band when a preset trigger event is detected or a preset time is reached, and then for the first gateway to transmit the uplink data to the server;

a third downlink data receiving module, configured to receive downlink data of the second gateway from a downlink channel of which the frequency band is the first frequency band of the second gateway when the sensing terminal is an intra-frequency sensing terminal, wherein the downlink data is data transmitted by the server to the second gateway; and a fourth downlink data receiving module, configured to receive downlink data of the first gateway from a downlink channel of which the frequency band is the second frequency band of the first gateway when the sensing terminal is an inter-frequency sensing terminal, wherein the downlink data is data transmitted by the server to the first gateway.

For example, the wireless network further includes an application terminal, wherein the application terminal is connected with the server, and then the downlink data is data generated by the server according to the uplink data, or the downlink data is data generated by the application terminal according to uplink data in the server.

For example, the third downlink data receiving module includes:

a second downlink channel establishment request receiving submodule, configured to receive a request for establishing a downlink channel of which the frequency band is the first frequency band from the second gateway;

a second downlink channel establishing submodule, configured to establish a downlink channel of which the frequency band is the first frequency band with the second gateway; and a second downlink data receiving submodule, configured to receive the downlink data through the downlink channel of which the frequency band is the first frequency band.

For example, the device further includes a gateway configuration module, wherein the gateway configuration module includes:

a communication frequency band obtaining submodule, configured to obtain a communication frequency band of the wireless network;

a frequency band dividing submodule, configured to divide the communication frequency band into a plurality of sub-bands;

a first frequency band determining submodule, configured to determine at least one first frequency band from the plurality of sub-bands, wherein the at least one first frequency band is a frequency band used by the first gateway to receive uplink data of the inter-frequency sensing terminal;

a second frequency band determining submodule, configured to determine at least one second frequency band from the plurality of sub-bands, wherein the at least one second frequency band is a frequency band used by the first gateway to receive uplink data of the intra-frequency sensing terminal and used by the second gateway to transmit downlink data to the intra-frequency sensing terminal;

a third frequency band determining submodule, configured to determine at least one third frequency band from the plurality of sub-bands, wherein the at least one third frequency band is a frequency band used by the second gateway to receive uplink data of the inter-frequency sensing terminal;

a fourth frequency band determining submodule, configured to determine at least one fourth frequency band from the plurality of sub-bands, wherein the at least one fourth frequency band is a frequency band used by the second gateway to receive uplink data of the intra-frequency sensing terminal and used by the first gateway to transmit downlink data to the intra-frequency sensing terminal; and a channel dividing submodule, configured to respectively divide the at least one first frequency band, the at least one second frequency band, the at least one third frequency band, and the at least one fourth frequency band into a plurality of channels according to a preset channel division rule.

For example, the first frequency band and the second frequency band are partially overlapped or completely overlapped, and the third frequency band and the fourth frequency band are partially overlapped or completely overlapped.

In order to solve the above problems, example embodiments of the present disclosure disclose a wireless communication device applied to a wireless network. The wireless network includes an intra-frequency sensing terminal, and a first gateway and a second gateway that are connected with a server, the frequency band of an uplink channel of the first gateway is a first frequency band, and the frequency band of a downlink channel of the second gateway is a first frequency band. The device includes:

a third uplink data receiving module, configured to receive uplink data of the first gateway, wherein the uplink data is data transmitted by the intra-frequency sensing terminal through an uplink channel at the first frequency band;

a second downlink data generating module, configured to generate downlink data according to the uplink data; and a fifth downlink data transmitting module, configured to transmit the downlink data to the second gateway, wherein the second gateway is configured to transmit the downlink data to the intra-frequency sensing terminal through a downlink channel at the first frequency band.

For example, the wireless network further includes an application terminal, wherein the application terminal is connected with the server, and then the downlink data further includes data generated by the application terminal according to uplink data in the server.

For example, the device further includes a gateway configuration module, wherein the gateway configuration module includes:

a communication frequency band obtaining submodule, configured to obtain a communication frequency band of the wireless network;

a frequency band dividing submodule, configured to divide the communication frequency band into a plurality of sub-bands;

a first frequency band determining submodule, configured to determine at least one first frequency band from the plurality of sub-bands, wherein the at least one first frequency band is a frequency band used by the first gateway to receive uplink data of the inter-frequency sensing terminal;

a second frequency band determining submodule, configured to determine at least one second frequency band from the plurality of sub-bands, wherein the at least one second frequency band is a frequency band used by the first gateway to receive uplink data of the intra-frequency sensing terminal and used by the second gateway to transmit downlink data to the intra-frequency sensing terminal;

a third frequency band determining submodule, configured to determine at least one third frequency band from the plurality of sub-bands, wherein the at least one third frequency band is a frequency band used by the second gateway to receive uplink data of the inter-frequency sensing terminal;

a fourth frequency band determining submodule, configured to determine at least one fourth frequency band from the plurality of sub-bands, wherein the at least one fourth frequency band is a frequency band used by the second gateway to receive uplink data of the intra-frequency sensing terminal and used by the first gateway to transmit downlink data to the intra-frequency sensing terminal; and a channel dividing submodule, configured to respectively divide the at least one first frequency band, the at least one second frequency band, the at least one third frequency band, and the at least one fourth frequency band into a plurality of channels according to a preset channel division rule.

For example, the first frequency band and the second frequency band are partially overlapped or completely overlapped, and the third frequency band and the fourth frequency band are partially overlapped or completely overlapped.

For example, the fifth downlink data transmitting module includes:

a second gateway determining submodule, configured to determine a second gateway having a communication distance covering the intra-frequency sensing terminal; and a third downlink data transmitting submodule, configured to transmit the downlink data to the second gateway, wherein the second gateway is configured to transmit the downlink data to the intra-frequency sensing terminal through a downlink channel of which the frequency band is the first frequency band.

In order to solve the above problems, example embodiments of the present disclosure disclose a wireless communication device applied to a wireless network. The wireless network includes an intra-frequency sensing terminal, a first gateway and a second gateway that are connected with a server, and an application terminal, the frequency band of an uplink channel of the first gateway is a first frequency band, and the frequency band of a downlink channel of the second gateway is a first frequency band. The device includes:

a third uplink data transmitting module, configured for the intra-frequency sensing terminal to transmit uplink data to the first gateway through an uplink channel at the first frequency band when a preset trigger event is detected or a preset time is reached, and then for the first gateway to transmit the uplink data to the server;

a downlink channel establishment request receiving module, configured to receive a request for establishing a downlink channel of which the frequency band is the first frequency band from the second gateway;

a downlink channel establishing module, configured to establish a downlink channel of which the frequency band is the first frequency band with the second gateway; and a fifth downlink data receiving module, configured to receive the downlink data through the downlink channel of which the frequency band is the first frequency band.

For example, the wireless network further includes an application terminal, wherein the application terminal is connected with the server, and then the downlink data is data generated by the server according to the uplink data, or the downlink data is data generated by the application terminal according to uplink data in the server.

For example, the device further includes a gateway configuration module, wherein the gateway configuration module includes:

a communication frequency band obtaining submodule, configured to obtain a communication frequency band of the wireless network;

a frequency band dividing submodule, configured to divide the communication frequency band into a plurality of sub-bands;

a first frequency band determining submodule, configured to determine at least one first frequency band from the plurality of sub-bands, wherein the at least one first frequency band is a frequency band used by the first gateway to receive uplink data of the inter-frequency sensing terminal;

a second frequency band determining submodule, configured to determine at least one second frequency band from the plurality of sub-bands, wherein the at least one second frequency band is a frequency band used by the first gateway to receive uplink data of the intra-frequency sensing terminal and used by the second gateway to transmit downlink data to the intra-frequency sensing terminal;

a third frequency band determining submodule, configured to determine at least one third frequency band from the plurality of sub-bands, wherein the at least one third frequency band is a frequency band used by the second gateway to receive uplink data of the inter-frequency sensing terminal;

a fourth frequency band determining submodule, configured to determine at least one fourth frequency band from the plurality of sub-bands, wherein the at least one fourth frequency band is a frequency band used by the second gateway to receive uplink data of the intra-frequency sensing terminal and used by the first gateway to transmit downlink data to the intra-frequency sensing terminal; and a channel dividing submodule, configured to respectively divide the at least one first frequency band, the at least one second frequency band, the at least one third frequency band, and the at least one fourth frequency band into a plurality of channels according to a preset channel division rule.

For example, the first frequency band and the second frequency band are partially overlapped or completely overlapped, and the third frequency band and the fourth frequency band are partially overlapped or completely overlapped.

Example embodiments of the present disclosure provide a wireless communication system, including a terminal communication device and a node communication device, wherein the terminal communication device includes a terminal, and the node communication device includes a first node and a second node, wherein the frequency band of an uplink channel of the first node is identical to the frequency band of a downlink channel of the second node, and the frequency band of the uplink channel of the first node is different from the frequency band of a downlink channel of the first node, The node communication device includes:

a first uplink data receiving module, configured to receive uplink data from the terminal through the uplink channel of the first node;

a first downlink data transmitting module, configured to transmit downlink data to the terminal through the downlink channel of the second node when the terminal is an intra-frequency terminal; and a second downlink data transmitting module, configured to transmit downlink data to the terminal through the downlink channel of the first node when the terminal is an inter-frequency terminal;

The terminal communication device includes:

a first uplink data transmitting module, configured for the terminal to transmit uplink data to the first node through the uplink channel of the first node when a preset trigger event is detected or a preset time is reached;

a first downlink data receiving module, configured to receive downlink data from the downlink channel of the second node when the terminal is an intra-frequency terminal; and a second downlink data receiving module, configured to receive downlink data from the downlink channel of the first node when the terminal is an inter-frequency terminal.

Example embodiments of the present disclosure provide a wireless communication device, including: one or more processors; and one or more machine-readable media having computer-readable instructions stored thereon, which, when executed by the one or more processors, cause a device to execute one or more wireless communication methods of the example embodiments of the present disclosure.

Example embodiments of the present disclosure provide one or more machine-readable media having computer-readable instructions stored thereon, which, when executed by one or more processors, cause a device to execute one or more wireless communication methods of the example embodiments of the present disclosure.

The example embodiments of the present disclosure have at least the following advantages:

In the example embodiments of the present disclosure, a terminal transmits uplink data through an uplink channel of a first node. If the terminal is an intra-frequency terminal, downlink data is received through a downlink channel of a second node; if the terminal is an inter-frequency terminal, downlink data is received through a downlink channel of the first node, wherein the frequency band of the uplink channel of the first node is identical to the frequency band of the downlink channel of the second node, and the frequency band of the uplink channel of the first node and the frequency band of its downlink channel are different. In other words, the wireless communication method of the example embodiments of the present disclosure is compatible with an intra-frequency terminal and an inter-frequency terminal, and the intra-frequency terminal transmits uplink data through the first node and receives downlink data through the second node, thus achieving duplex communication and improving communication efficiency.

BRIEF DESCRIPTION OF THE DRAWINGS

The accompanying drawings described herein are used to enable further understanding of the present disclosure and constitute a part of the present disclosure. The example embodiments of the present disclosure and the description of the example embodiments are used to illustrate the present disclosure, and do not constitute any limitation to the present disclosure. In the drawings:

FIG. 3 is a schematic diagram of gateway deployment in a wireless network according to the present disclosure;

FIG. 7 is a flowchart of steps in Example embodiment 4 of a wireless communication method according to the present disclosure;

FIG. 8 is a flowchart of steps in Example embodiment 5 of a wireless communication method according to the present disclosure;

FIG. 9 is a flowchart of steps in Example embodiment 6 of a wireless communication method according to the present disclosure;

FIG. 10 is a flowchart of steps in Example embodiment 7 of a wireless communication method according to the present disclosure;

FIG. 11 is a flowchart of steps in Example embodiment 8 of a wireless communication method according to the present disclosure;

DETAILED DESCRIPTION

To make the foregoing objectives, features and advantages of the present disclosure clearer and more understandable, the present disclosure will be further described in detail with reference to the accompanying drawings and example embodiments.

Figure 1:
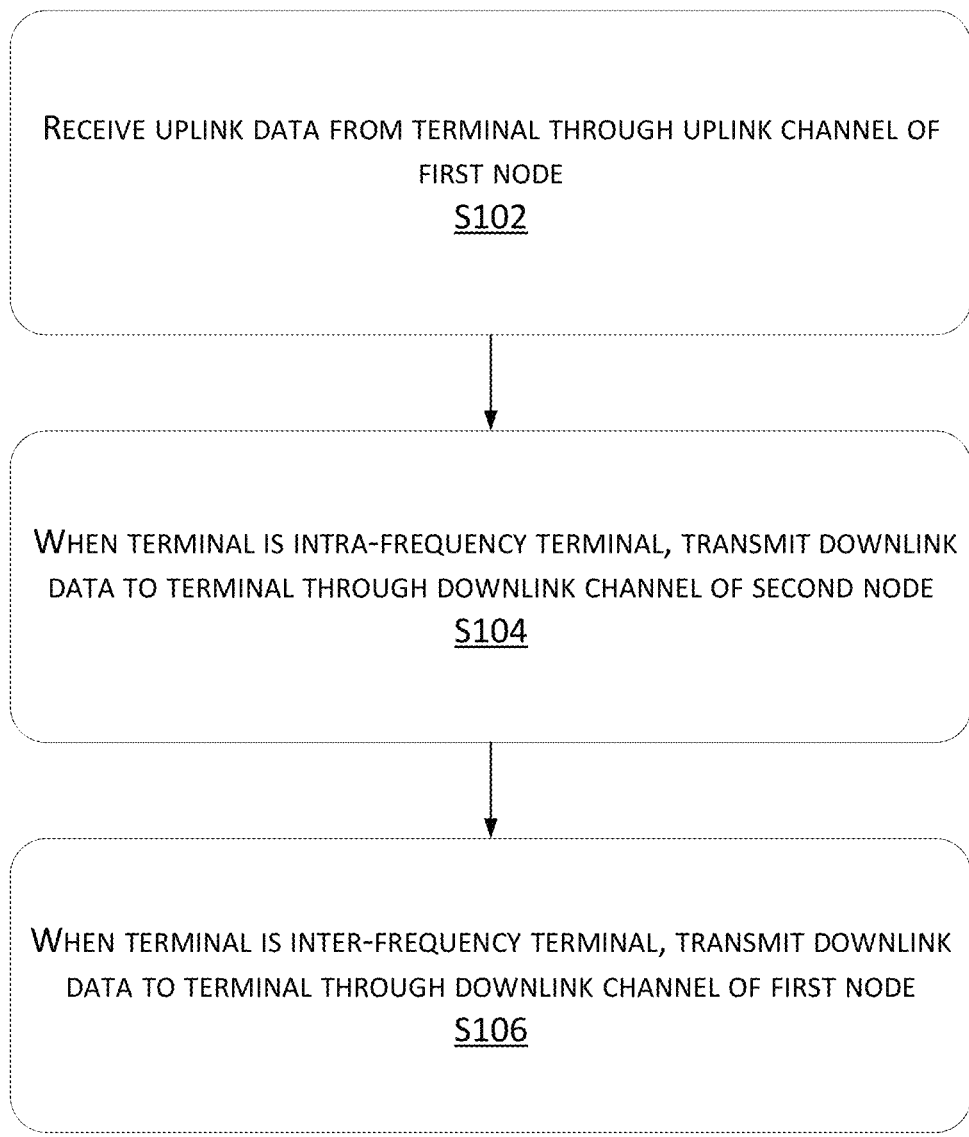
FIG. 1 is a flowchart of steps in Example embodiment 1 of a wireless communication method according to the present disclosure.

Referring to FIG. 1, a flowchart of steps in Example embodiment 1 of a wireless communication method according to the present disclosure is shown. The wireless communication method according to the example embodiment of the present disclosure may be applied to a wireless network. The wireless network includes a terminal, a first node, and a second node, the frequency band of an uplink channel of the first node is identical to the frequency band of a downlink channel of the second node, and the frequency band of the uplink channel of the first node is different from the frequency band of a downlink channel of the first node. The method, for example, may include the following steps.

In step 102, uplink data from the terminal is received through the uplink channel of the first node.

Figure 2:
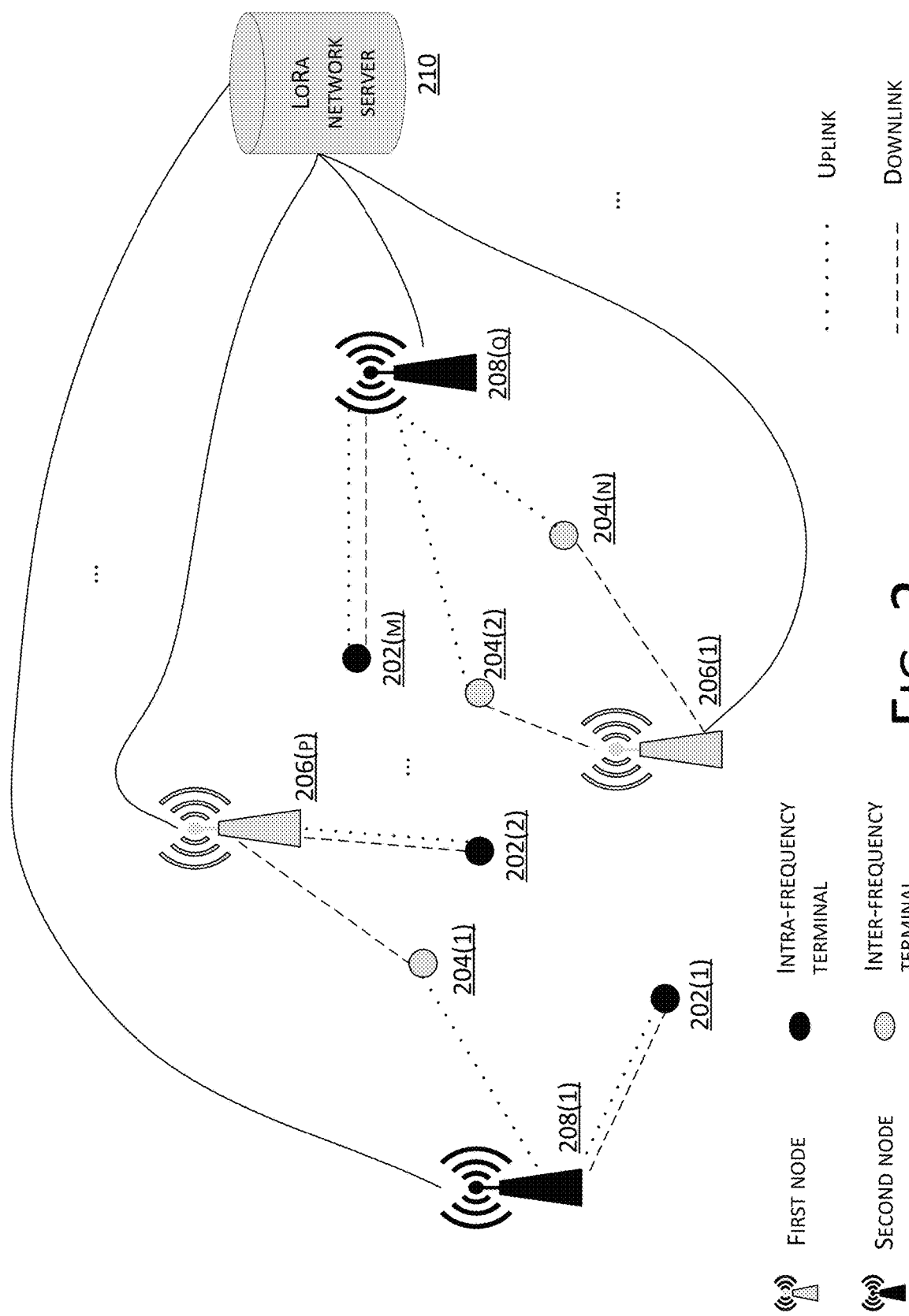
FIG. 2 is a schematic diagram of a wireless network according to the present disclosure.

As shown in FIG. 2, it is a schematic diagram of a wireless network of the present disclosure. The wireless network includes multiple terminals including one or more intra-frequency terminals 202(1), 202(2), . . . , 202(m), where m may be any integer, and one or more inter-frequency terminals 204(1), 204(2), . . . , 204 (n), wherein n may be any integer. The wireless network also includes multiple first nodes 206(1), . . . , 206(p), where p may be any integer, and multiple second nodes 208(1), . . . , 208(q), where q may be any integer. The intra-frequency terminals 202 or the inter-frequency terminals 204 may access a LoRa network server 210 through the first nodes 206 or the second nodes 208.

As shown in FIG. 3, in order for the network layer to connect with multiple terminals, multiple first nodes 302(1), 302(2), 302(3), 302(4), 302(5), . . . , 302(m), where m may be any integer, and multiple second nodes 304(1), 304(2), 304(3), 304(4), 304(5), . . . , 304(n), where n may be any integer, are usually deployed, and uplink and downlink channels are pre-configured for the first nodes 302 and second nodes 304.

In the example embodiments of the present disclosure, when the terminal is connected to a first node, uplink data of the terminal may be received through an uplink channel of the first node.

In the example embodiments of the present disclosure, the first node and the second node may be apparatus such as gateways with a wireless communication function and application servers. After the first node receives the uplink data, downlink data may be generated according to the uplink data. Certainly, the wireless network may further include an application terminal connected to the first node and the second node, and the application terminal may generate downlink data according to the uplink data of the first node and transmit the downlink data to the first node or the second node.

For example, the terminal may be a smart electricity meter, and the smart electricity meter may transmit power consumption in the form of uplink data to the first node. After the first node receives the power consumption, an application module in the first node or an application terminal (billing terminal) connected to the first node captures the power consumption and generates downlink data (electricity bill).

In step 104, when the terminal is an intra-frequency terminal, downlink data is transmitted to the terminal through a downlink channel of the second node.

In the example embodiments of the present disclosure, whether the terminal is an intra-frequency terminal or an inter-frequency terminal may be determined as follows:

In a first sub-step, type information of the terminal is obtained from the uplink data or according to a terminal identifier reported by the terminal; and In a second sub-step, when the type information indicates an intra-frequency terminal, it is determined that the terminal is an intra-frequency terminal; or In a third sub-step, when the type information indicates an inter-frequency terminal, it is determined that the terminal is an inter-frequency terminal.

When the terminal establishes a connection with a first node or a second node, the uplink data may carry the type information of the terminal, or the terminal reports the terminal identifier when registering with the first node or the second node. The terminal identifier may indicate the type of the terminal, and whether the terminal is an intra-frequency terminal or an inter-frequency terminal may be determined according to the type information.

After being obtained, the downlink data needs to be transmitted to the terminal through a downlink channel. If the terminal is an intra-frequency terminal, since the intra-frequency terminal can only communicate through one frequency band, and the frequency band of the uplink channel of the first node has been used as the frequency band through which the intra-frequency terminal transmits the uplink data and cannot be used as the frequency band of the downlink channel, the downlink data may be transmitted to the intra-frequency terminal through the downlink channel of the second node.

In the example embodiments of the present disclosure, in order to connect with multiple terminals, multiple first nodes and multiple second nodes are usually deployed. The first nodes and the second nodes are deployed in a staggered or star configuration, and uplink and downlink channels are pre-configured for the first nodes and the second nodes.

For example, the uplink and downlink channels of the first and second nodes may be configured as follows.

In a first sub-step, a communication frequency band of the wireless network is obtained.

In the example embodiments of the present disclosure, the wireless network has a communication frequency band, and the communication frequency band has a starting frequency point. For example, the communication frequency band is 470.2-509.8 MHz, and the starting frequency point is 470.2 MHz. Certainly, different wireless networks have different communication frequency bands, which may be determined according to a wireless apparatus manufactured by its manufacturer.

In a second sub-step, the communication frequency band is divided into a plurality of sub-bands.

After the communication frequency band is obtained, the intra-frequency frequency band may be divided into multiple sub-bands according to actual needs. For example, the communication frequency band is divided into retention frequency bands as frequency bands for other services, into frequency bands used by the first nodes and the second nodes for uplink data, and into dedicated downlink frequency bands for inter-frequency terminals.

In a third sub-step, at least one first frequency band is determined from the plurality of sub-bands, wherein the at least one first frequency band is a frequency band used by the first node to receive uplink data of the inter-frequency terminal.

In practical applications, the terminal may include an inter-frequency terminal, so it is necessary to set a frequency band for the first node to receive uplink data of the inter-frequency terminal, and for example, set a sub-band as a first frequency band for the first node to receive uplink data of the inter-frequency terminal.

In a fourth sub-step, at least one second frequency band is determined from the plurality of sub-bands, wherein the at least one second frequency band is a frequency band used by the first node to receive uplink data of the intra-frequency terminal and used by the second node to transmit downlink data to the intra-frequency terminal.

In practical applications, the terminal may also include an intra-frequency terminal, so it is necessary to set a frequency band for the first node to receive uplink data of the intra-frequency terminal, and for example, set a sub-band as a second frequency band for the first node to receive uplink data of the inter-frequency terminal, and also as a frequency band for the second node to transmit downlink data to the intra-frequency terminal.

In the example embodiments of the present disclosure, the first frequency band used by the first node to receive uplink data of the inter-frequency terminal and the second frequency band used to receive uplink data of the intra-frequency terminal may be partially overlapped or completely overlapped. For example, the second frequency band may be 471.4-474.6 MHz, and the first frequency band may be 470.6-473.8 MHz, that is, the frequency bands are partially overlapped; certainly, both the first frequency band and the second frequency band may be 471.4-474.6 MHz, that is, the frequency bands are completely overlapped.

In a fifth sub-step, at least one third frequency band is determined from the plurality of sub-bands, wherein the at least one third frequency band is a frequency band used by the second node to receive uplink data of the inter-frequency terminal.

In the example embodiments of the present disclosure, the nodes include a first node and a second node. After setting a frequency band for the first node to receive uplink data of the terminal, it is necessary to set a frequency band for the second node to receive uplink data of the inter-frequency terminal, and for example, set a sub-band as a third frequency band used by the second node to receive uplink data of the inter-frequency terminal.

In a sixth sub-step, at least one fourth frequency band is determined from the plurality of channels, wherein the at least one fourth frequency band is a frequency band used by the second node to receive uplink data of the intra-frequency terminal and used by the first node to transmit downlink data to the intra-frequency terminal.

In practical applications, the terminal may also include an intra-frequency terminal, so it is necessary to set a frequency band for the second node to receive uplink data of the intra-frequency terminal, and for example, set a sub-band as a fourth frequency band for the second node to receive uplink data of the inter-frequency terminal, and also as a frequency band for the first node to transmit downlink data to the intra-frequency terminal.

In the example embodiments of the present disclosure, the third frequency band used by the first node to receive uplink data of the inter-frequency terminal and the fourth frequency band used to receive uplink data of the intra-frequency terminal may be partially overlapped or completely overlapped. For example, the fourth frequency band may be 482.2-485.4 MHz, and the third frequency band may be 481.4-484.6 MHz, that is, the frequency bands are partially overlapped; certainly, both the third frequency band and the fourth frequency band may be 482.2-485.4 MHz, that is, the frequency bands are completely overlapped.

In a seventh sub-step, the at least one first frequency band, the at least one second frequency band, the at least one third frequency band, and the at least one fourth frequency band are respectively divided into a plurality of channels according to a preset channel division rule.

For each frequency band, it can be divided into multiple channels according to a preset bandwidth, the frequency band of each channel is determined, and the multiple channels are numbered according to the size of the frequency bands.

Figure 4:
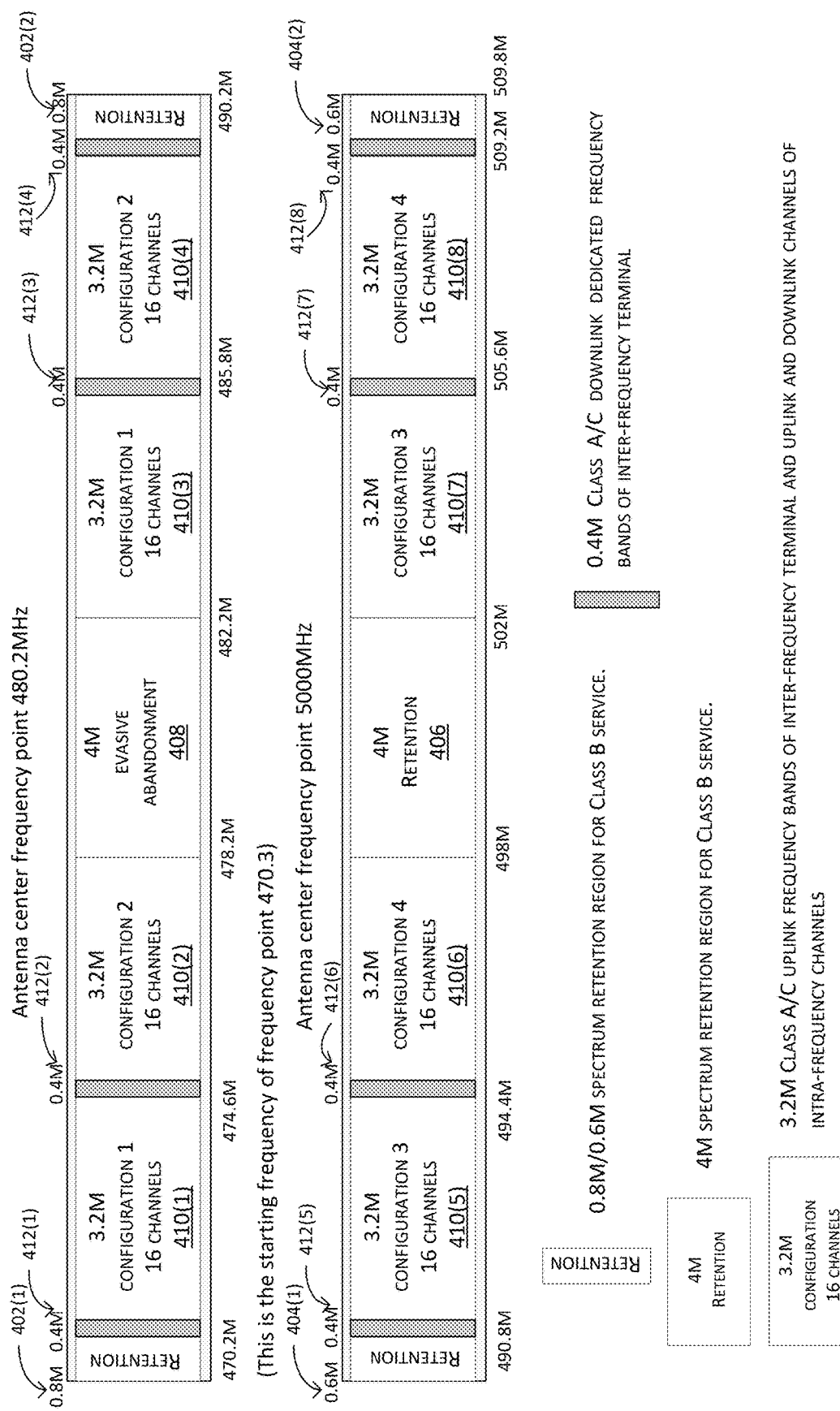
FIG. 4 is a schematic diagram of division of a communication frequency band of a wireless network according to the present disclosure.

The configuration of uplink and downlink channels of the first and second nodes is described below with examples in conjunction with the drawings:

As shown in FIG. 4, it is a schematic diagram of an exemplary division of a wireless communication frequency band.

In FIG. 4, the communication frequency band is 470.2-509.8 MHz. The communication frequency band may be divided into retention frequency bands (including two 0.8 M frequency bands 402(1) and 402(2), two 0.6 M frequency bands 404(1) and 404(2), and one 4 M frequency band 406), one 4 M evasive abandonment frequency band 408, and eight 3.2 M channel frequency bands 410(1), 410(2), 410(3), 410(4), 410(5), 410(6), 410(7), and 410(8), and eight 0.4 M inter-frequency downlink dedicated frequency bands 412(1), 412(2), 412(3), 412(4), 412(5), 412(6), 412(7), and 412(8). The eight 3.2 M channel frequency bands include:

two configuration 1 frequency bands: 471.4-474.6 MHz 410(1) and 482.2-485.4 MHz 410(3);

two configuration 2 frequency bands: 475-478.2 MHz 410(2) and 485.8-489 MHz 410(4);

two configuration 3 frequency bands: 491.2-494.4 MHz 410(5) and 491.2-494.4 MHz 410(7);

two configuration 4 frequency bands: 494.8-498 MHz 410(6) and 505.6-508.8 MHz 410(8);

The eight 0.4 M dedicated downlink frequency bands are: 471-471.4 MHz 412(1), 474.6-475 MHz 412(2), 485.4-485.8 MHz 412(3), 489-489.4 MHz 412(4), 490.8-491.2 MHz (412(5), 505.2-505.6 MHz 412(6), 508.8-509.2 MHz 412(7), and 494.4-494.8 MHz 412(8) respectively.

In FIG. 4, the divided frequency bands may be used for one or two of Class A, Class B, and Class C services.

Class A service refers to bidirectional transmission terminal services: two short-term downlink receiving windows will follow immediately after each uplink transmission of the terminal for Class A service to achieve bidirectional transmission. A transmission time slot is arranged by the terminal when there is a need for transmission, and a certain random delay is added. Class A service operations are the most power-efficient, requiring applications to perform downlink transmission within a very short period of time after the terminal performs uplink transmission, and downlink transmission at any other time must wait for next uplink transmission of the terminal.

Class B service refers to bidirectional transmission terminal services that define receiving time slots: the terminal for Class B service will have more receiving time slots. In addition to random receiving windows for Class A service, the terminal for Class B service will open other receiving windows at a specified time. In order for the terminal to open the receiving windows at a specified time, the terminal needs to receive time-synchronized beacons from the gateway, which allows the server to know that the terminal is listening.

Class C service refers to bidirectional transmission terminal services that maximize receiving time slots: the terminal for Class C service basically always open receiving windows, and only closes the receiving windows for a short time during the transmission. The terminal for Class C service consumes more power than the terminals for Class A service and Class B service, but its delay is also the shortest.

The channel allocation process is described below by taking configuration 1 as an example.

In S1, from the two configuration 1 frequency bands 471.4-474.6 MHz 410(1) and 482.2-485.4 MHz 410(3), a frequency band 471.4-474.6 MHz 410(1) is determined as a first frequency band which is a frequency band used by the first node to receive uplink data of the inter-frequency terminal.

In S2, from the two configuration 1 bands 471.4-474.6 MHz 410(1) and 482.2-485.4 MHz 410(3), a frequency band 471.4-474.6 MHz 410(1) is determined as a second frequency band which is a frequency band used by the first node to receive uplink data of the intra-frequency terminal and used by the second node to transmit downlink data to the intra-frequency terminal.

In S3, from the two configuration 1 frequency bands 471.4-474.6 MHz 410(1) and 482.2-485.4 MHz 410(3), a frequency band 482.2-485.4 410(3) is determined as a third frequency band which is a frequency band used by the second node to receive uplink data of the inter-frequency terminal.

In S4, from the two configuration 1 bands 471.4-474.6 MHz 410(1) and 482.2-485.4 MHz 410(3), a frequency band 482.2-485.4 410(3) is determined as a fourth frequency band which is a frequency band used by the second node to receive uplink data of the intra-frequency terminal and used by the first node to transmit downlink data to the intra-frequency terminal.

Certainly, the first frequency band and the second frequency band may be partially overlapped or completely overlapped, and the third frequency band and the fourth frequency band may be partially overlapped or completely overlapped. For example, when they are completely overlapped, the first frequency band is the second frequency band, and the third frequency band is the fourth frequency band.

In practical applications, from eight 0.4 M inter-frequency downlink dedicated frequency bands, a frequency band 485.4-485.8 MHz 412(3) may further be determined as a frequency band used by the first node to transmit downlink data to the inter-frequency terminal, and a frequency band 471-471.4 MHz 412(1) may further be determined as a frequency band used by the second node to transmit downlink data to the inter-frequency terminal.

Certainly, the frequency band used by the first node to transmit downlink data to the inter-frequency terminal may also be partially overlapped with the frequency band used by the first node to transmit downlink data to the intra-frequency terminal. For example, the frequency band used by the first node to transmit downlink data to the intra-frequency terminal is 482.2-485.4 MHz 412(3), then the frequency band used by the first node to transmit downlink data to the inter-frequency terminal may be 485.4-485.8 MHz 412(3), or 485.0-485.4 MHz, that is, they are partially overlapped.

As an example, the frequency bands used by the first node and the second node to receive or transmit data from/to the inter-frequency terminal and the intra-frequency terminal are as follows.

| Node configuration | Inter-frequency terminal | | Intra-frequency terminal | |
|---|---|---|---|---|
| | Uplink frequency band MHz | Downlink frequency band MHz | Uplink frequency band MHz | Downlink frequency band MHz |
| First node | 471.4-474.6 | 485.4-485.8 | 471.4-474.6 | 482.2-485.4 |
| Second node | 482.2-485.4 | 471-471.4 | 482.2-485.4 | 471.4-474.6 |

As can be seen from the above table, during communication, the intra-frequency terminal may transmit uplink data to the first node through the uplink channel at 471.4-474.6 MHz 410(1) of the first node, and receive downlink data through the downlink channel at 471.4-474.6 MHz 410(1) of the second node. In addition, the first node and the second node can be compatible with the intra-frequency terminal and the inter-frequency terminal at the same time, and duplex communication is essentially implemented during the communication of the intra-frequency terminal, which improves the communication efficiency.

The frequency band values in the frequency band configuration of the first node and the second node in the above table are merely examples. Those skilled in the art may obtain other frequency band configurations according to the above table, which is not limited in the example embodiments of the present disclosure.

In the example embodiments of the present disclosure, after determining the frequency bands, the method further includes the following step:

In S5, each frequency band in the above table is divided into multiple channels, and the channels are numbered.

For example, in the table above, the uplink frequency band of the first node is 471.4-474.6 MHz 410(1), the starting frequency point of the entire communication frequency band is 470.2 MHz, and the channel bandwidth is 0.2 M; according to the equation:

$$f=470.1+0.2 \times n$$

where f refers to a channel frequency point and n refers to a channel number, the uplink frequency band 471.4-474.6 MHz 410(1) of the first node may be divided into 16 channels, respectively 471.4-471.6 MHz, 471.7-471.9 MHz . . . and so on, and the channel numbers are 7-22 respectively. Channel division is similar for other frequency bands, and the channel numbers, used by the intra-frequency terminal and the inter-frequency terminal, in the first node in configuration 1 are obtained as follows.

| | No. | Uplink channel No. | Downlink channel No. of inter-frequency terminal | Downlink channel No. of intra-frequency terminal |
|---|---|---|---|---|
| First node | 1 | 7 | 77 | 7 |
| | 2 | 8 | 77 | 8 |
| | 3 | 9 | 77 | 9 |
| | 4 | 10 | 77 | 10 |
| | 5 | 11 | 77 | 11 |
| | 6 | 12 | 77 | 12 |
| | 7 | 13 | 77 | 13 |
| | 8 | 14 | 77 | 14 |

-continued

| | No. | Uplink channel No. | Downlink channel No. of inter-frequency terminal | Downlink channel No. of intra-frequency terminal |
|---|---|---|---|---|
| First node | 9 | 15 | 78 | 15 |
| | 10 | 16 | 78 | 16 |
| | 11 | 17 | 78 | 17 |
| | 12 | 18 | 78 | 18 |
| | 13 | 19 | 78 | 19 |
| | 14 | 20 | 78 | 20 |
| | 15 | 21 | 78 | 21 |
| | 16 | 22 | 78 | 22 |

Each of the above channels has a frequency point. For example, the frequency point of channel 7 is 471.5 MHz, and the frequency point of channel 8 is 471.7 MHz. Therefore, when the intra-frequency terminal transmits uplink data to the first node through channel 7, i.e., the uplink channel at a frequency point of 471.5 MHz of the first node, it may transmit downlink data to the intra-frequency terminal through channel 7 of the second node, i.e., the downlink channel at a frequency point of 471.5 MHz.

The configuration 1 is only described above as an example. For other configurations, reference may be made to configuration 1, which will not be elaborated here.

It can be known from the above-mentioned channel allocation that after the intra-frequency terminal transmits uplink data to the first node through the uplink channel of the first node, it may receive downlink data through the downlink channel of the second node. For example, step 104 may include the following sub-steps:

Sub-step S31, determining a second node having a communication distance covering the intra-frequency terminal;

Sub-step S32, transmitting the downlink data to the second node; and

Sub-step S33, transmitting, by the second node, downlink data to the terminal through a downlink channel.

In the example embodiments of the present disclosure, the first nodes and the second nodes are staggered, and a second node having a communication distance covering the intra-frequency terminal may be determined according to the deployment situation. For example, a second node near the intra-frequency terminal may be found; the second node scans to find the intra-frequency terminal, and sends a connection establishment request to the intra-frequency terminal; after the connection is successfully established, the second node transmits downlink data to the intra-frequency terminal through the downlink channel.

In step 106, when the terminal is an inter-frequency terminal, the downlink data is transmitted to the terminal through the downlink channel of the first node.

If the terminal is an inter-frequency terminal, i.e., the terminal can perform communication through different frequency bands, downlink data may be transmitted to the terminal through a downlink channel in the first node which has a different frequency band from the uplink channel.

In the example embodiments of the present disclosure, uplink data transmitted by the terminal is received through an uplink channel of a first node. If the terminal is an intra-frequency terminal, downlink data is transmitted to the terminal through a downlink channel of a second node; if the terminal is an inter-frequency terminal, downlink data may be transmitted to the terminal through a downlink channel of the first node, wherein the frequency band of the uplink channel of the first node is identical to the frequency band of the downlink channel of the second node, and the frequency band of the uplink channel of the first node and the frequency band of its downlink channel are different. In other words, the wireless communication method of the example embodiments of the present disclosure can be compatible with an intra-frequency terminal and an inter-frequency terminal, and can achieve duplex communication of the intra-frequency terminal based on the communication with the intra-frequency terminal via the first node and the second node, thus improving the communication efficiency.

Figure 5:
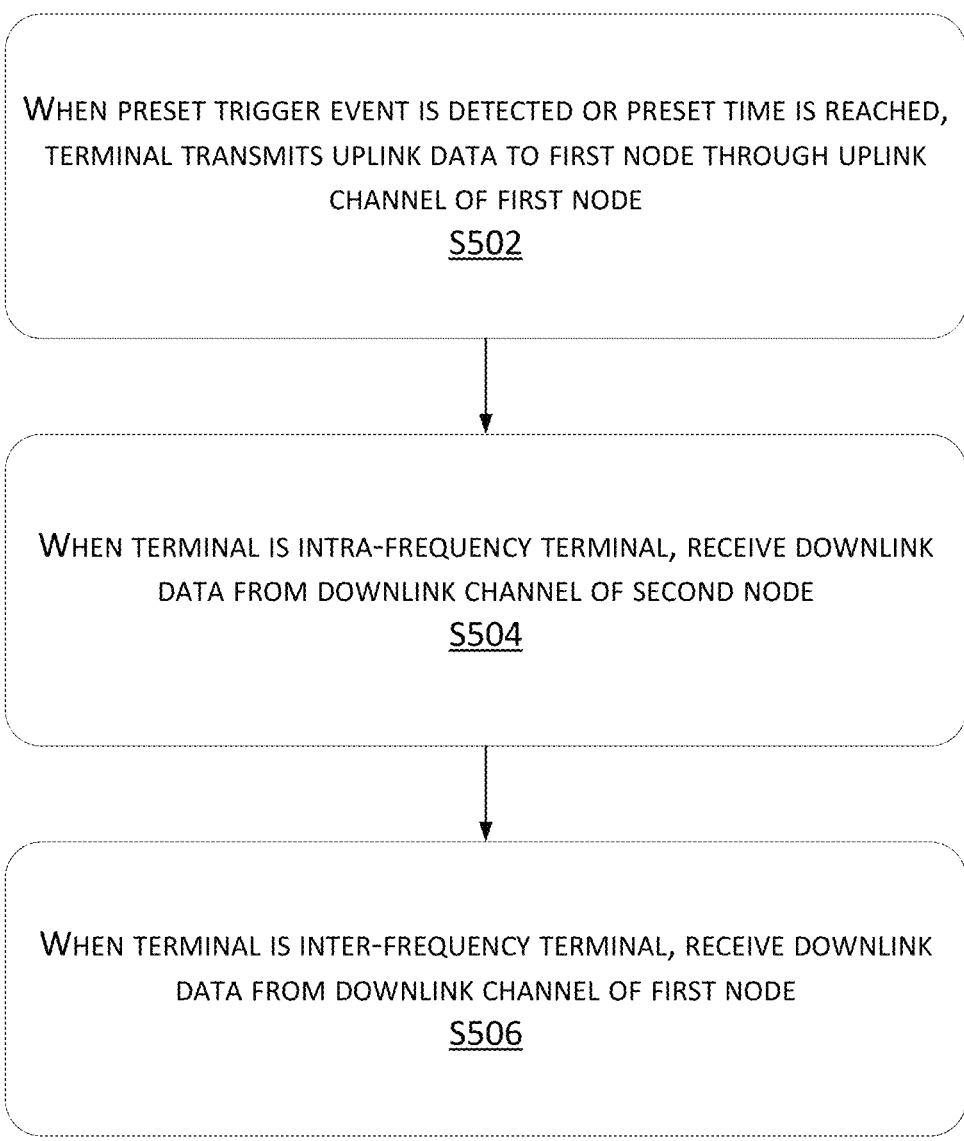
FIG. 5 is a flowchart of steps in Example embodiment 2 of a wireless communication method according to the present disclosure.

Referring to FIG. 5, a flowchart of steps in Example embodiment 2 of a wireless communication method according to the present disclosure is shown. The wireless communication method according to the present disclosure may be applied to a wireless network. The wireless network includes a terminal, a first node, and a second node, the frequency band of an uplink channel of the first node is identical to the frequency band of a downlink channel of the second node, and the frequency band of the uplink channel of the first node is different from the frequency band of a downlink channel of the first node. The method, for example, may include the following steps.

In step 502, when a preset trigger event is detected or a preset time is reached, the terminal transmits uplink data to the first node through the uplink channel of the first node.

In the example embodiments of the present disclosure, the terminal may be a sensor provided with a wireless communication module. In order to save power and prolong the service life of the terminal, the wireless communication module of the terminal is usually in a sleep state, and only when a preset trigger event is detected or a preset time is reached, the connection with a first node is enabled. For example, when a smart electricity meter needs to calculate the electricity bill at the end of the month, the power consumption is transmitted to the first node through the wireless communication module at a specified time every month. For another example, when detecting that a temperature is greater than or less than a preset threshold, a temperature sensor transmits alarm information to the first node through the wireless communication module. For example, the terminal may transmit uplink data to the first node through the uplink channel of the first node.

In step 504, when the terminal is an intra-frequency terminal, downlink data is received from the downlink channel of the second node.

In the example embodiments of the present disclosure, the downlink data may be data generated by the first node according to the uplink data or the wireless network further includes an application terminal; the downlink data may also be data generated by the application terminal according to the uplink data received by the first node, and the application terminal transmits the generated data to the second node.

In order to connect with multiple terminals, multiple first nodes and multiple second nodes are usually deployed, and uplink and downlink channels are pre-configured for the first and second nodes.

For example, the uplink and downlink channels of the first and second nodes may be configured as follows:

obtaining a communication frequency band of the wireless network;

dividing the communication frequency band into a plurality of sub-bands;

determining at least one first frequency band from the plurality of sub-bands, wherein the at least one first frequency band is a frequency band used by the first node to receive uplink data of the inter-frequency terminal;

determining at least one second frequency band from the plurality of sub-bands, wherein the at least one second frequency band is a frequency band used by the first node to receive uplink data of the intra-frequency terminal and used by the second node to transmit downlink data to the intra-frequency terminal;

determining at least one third frequency band from the plurality of sub-bands, wherein the at least one third frequency band is a frequency band used by the second node to receive uplink data of the inter-frequency terminal;

determining at least one fourth frequency band from the plurality of sub-bands, wherein the at least one fourth frequency band is a frequency band used by the second node to receive uplink data of the intra-frequency terminal and used by the first node to transmit downlink data to the intra-frequency terminal; and respectively dividing the at least one first frequency band, the at least one second frequency band, the at least one third frequency band, and the at least one fourth frequency band into a plurality of channels according to a preset channel division rule.

The first frequency band and the second frequency band are partially overlapped or completely overlapped, and the third frequency band and the fourth frequency band are partially overlapped or completely overlapped.

With respect to example configurations of the uplink channels and the downlink channels of the first and second nodes, reference may be made to Example embodiment 1 and it will not be repeated here.

Based on the above node configuration, step 504 may include the following sub-steps:

In a first sub-step of S504, a request for establishing a downlink channel is received from the second node.

In practical applications, the terminal is not always connected to the first node or the second node. When the second node needs to transmit downlink data to the terminal, the second node transmits a downlink channel request to the terminal, and the terminal receives the downlink channel establishment request.

In a second sub-step of S504, a downlink channel is established with the second node.

After the terminal receives the downlink channel establishment request, since the terminal is an intra-frequency terminal, a downlink channel is established with the second node, and the frequency band of the downlink channel is the frequency band of the uplink channel of the first node.

In a third sub-step of S504, the downlink data is received through the downlink channel of the second node.

In practical applications, the downlink data may be data generated according to the uplink data received by the first node, or may be data generated, according to the uplink data received by the first node, by the application terminal connected to the first node and the second node. The data received by the first node may be transmitted to the second node and then transmitted to the intra-frequency terminal through the second node.

In the example embodiments of the present disclosure, the intra-frequency terminal transmits uplink data through the uplink channel of the first node, and receives downlink data of the second node through the downlink channel of the second node, thus achieving duplex communication and improving the communication efficiency.

In step 506, when the terminal is an inter-frequency terminal, downlink data is received from the downlink channel of the first node.

If the terminal is an inter-frequency terminal, i.e., the terminal can perform communication through different frequency bands, downlink data may be received through the downlink channel of the first node connected during the transmission of the uplink data.

In the example embodiments of the present disclosure, a terminal transmits uplink data through an uplink channel of a first node. If the terminal is an intra-frequency terminal, downlink data may be received through a downlink channel of a second node; if the terminal is an inter-frequency terminal, downlink data may be received through a downlink channel of the first node, wherein the frequency band of the uplink channel of the first node is identical to the frequency band of the downlink channel of the second node, and the frequency band of the uplink channel of the first node and the frequency band of its downlink channel are different. In other words, the wireless communication method of the example embodiments of the present disclosure can be compatible with an intra-frequency terminal and an inter-frequency terminal, and the intra-frequency terminal performs communication through the uplink channel of the first node and the downlink channel of the second node, thus achieving duplex communication and improving the communication efficiency.

Figure 6:
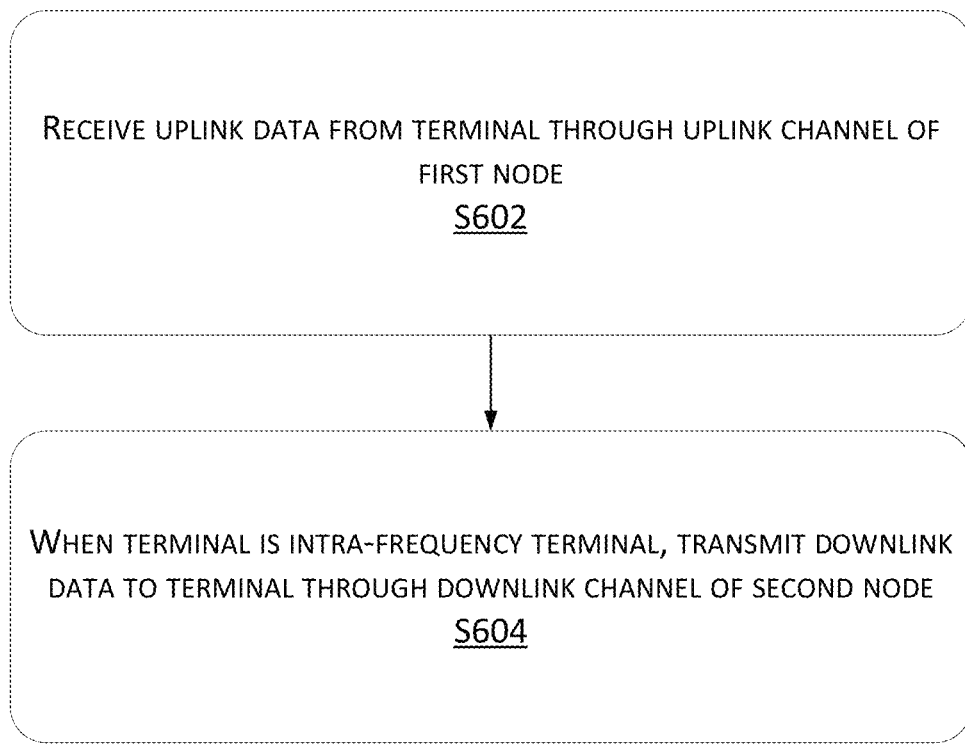
FIG. 6 is a flowchart of steps in Example embodiment 3 of a wireless communication method according to the present disclosure.

Referring to FIG. 6, a flowchart of steps in Example embodiment 3 of a wireless communication method according to the present disclosure is shown. The wireless communication method according to the example embodiment of the present disclosure may be applied to a wireless network. The wireless network includes a terminal, a first node, and a second node, the frequency band of an uplink channel of the first node is identical to the frequency band of a downlink channel of the second node, and the frequency band of the uplink channel of the first node is different from the frequency band of a downlink channel of the first node. The method, for example, may include the following steps.

In step 602, uplink data from the terminal is received through the uplink channel of the first node.

In step 604, when the terminal is an intra-frequency terminal, downlink data is transmitted to the terminal through the downlink channel of the second node.

For details of the steps 602 and 604, reference may be made to Example embodiment 1, and the details are not repeated here.

In the example embodiments of the present disclosure, when the terminal is an intra-frequency terminal, uplink data transmitted by the terminal is received through an uplink channel of a first node, and downlink data is transmitted to the intra-frequency terminal through a downlink channel of a second node. In other words, the wireless communication method of the example embodiments of the present disclosure implements communication with the intra-frequency terminal through the first node and the second node, thus achieving duplex communication of the intra-frequency terminal and improving the communication efficiency.

Referring to FIG. 7, a flowchart of steps in Example embodiment 4 of a wireless communication method according to the present disclosure is shown. The wireless communication method according to the example embodiment of the present disclosure may be applied to a wireless network. The wireless network includes a terminal, a first node, and a second node, the frequency band of an uplink channel of the first node is identical to the frequency band of a downlink channel of the second node, and the frequency band of the uplink channel of the first node is different from the frequency band of a downlink channel of the first node. The method, for example, may include the following steps:

In step 702, when a preset trigger event is detected or a preset time is reached, the terminal transmits uplink data to the first node through the uplink channel of the first node.

In step 704, when the terminal is an intra-frequency terminal, downlink data is received from the downlink channel of the second node.

For details of the steps 702 and 704, reference may be made to Example embodiment 2, and the details are not repeated here.

In the example embodiments of the present disclosure, when the terminal is an intra-frequency terminal, uplink data is transmitted through an uplink channel of a first node, and downlink data is received through a downlink channel of a second node. In other words, according to the wireless communication method of the example embodiments of the present disclosure, the intra-frequency terminal performs communication through the uplink channel of the first node and the downlink channel of the second node, thus achieving duplex communication and improving the communication efficiency.

Referring to FIG. 8, a flowchart of steps in Example embodiment 5 of a wireless communication method according to the present disclosure is shown. The wireless communication method according to the example embodiment of the present disclosure may be applied to a wireless network. The wireless network includes a sensing terminal, and a first gateway and a second gateway that are connected with a server, the frequency band of an uplink channel of the first gateway is a first frequency band, the frequency band of a downlink channel of the first gateway is a second frequency band, and the frequency band of a downlink channel of the second gateway is a first frequency band. The method, for example, includes the following steps:

In step 802, the server receives uplink data of the first gateway, wherein the uplink data is data transmitted by the sensing terminal through an uplink channel at the first frequency band.

In the Internet of Things, three layers of a sensing layer, a network layer, and an application layer can be included. The sensing layer is composed of various sensing terminals, which may include temperature and humidity sensors, QR code tags, RFID tags, reader-writers, cameras, infrared sensing terminals, and GPS sensing terminals. The sensing layer functions as a source for the Internet of Things to identify objects and collect data. A sensing terminal may be provided with a LoRa wireless module through which the collected data is transmitted to the network layer or through which data from the network layer is received. According to the communication method of the LoRa wireless module, the sensing terminal may be an intra-frequency sensing terminal that performs communication at the same frequency band, or an inter-frequency sensing terminal that performs communication at different frequency bands.

The network layer is composed of various networks, including the Internet, the TV network, network management systems, and cloud computing platforms. As the backbone of the entire Internet of Things, the network layer is responsible for transmitting and processing information obtained by the sensing layer.

As shown in FIG. 2, it is a schematic diagram of a wireless network according to an example embodiment of the present disclosure. The wireless network includes a sensing layer and a network layer. In FIG. 2, the first nodes 206 may be first gateways, and the second nodes 208 may be second gateways. The first gateways and the second gateways may be connected to a server such as the LoRa network server 210, and an intra-frequency sensing terminal or an inter-frequency sensing terminal in the sensing layer accesses the network layer through a first gateway and a second gateway to implement data interaction between the network layer and the sensing layer.

The application layer, functioning as an interface between the Internet of Things and users, is combined with industry needs to implement intelligent applications of the Internet of Things. The application layer connects with the server through an application terminal to implement data interaction between the application layer and the network layer.

As shown in FIG. 3, in order for the network layer to connect with multiple sensing terminals, multiple first gateways (first nodes 302) and multiple second gateways (second nodes 304) are usually deployed, and uplink and downlink channels are pre-configured for the first and second gateways.

In the example embodiments of the present disclosure, the server may receive uplink data from a first gateway, and the uplink data is data transmitted by a sensing terminal through an uplink channel of which the frequency band is a first frequency band of the first gateway.

In step 804, the server generates downlink data according to the uplink data.

In the example embodiments of the present disclosure, the server may be an application server. After receiving the uplink data, the server generates downlink data according to the uplink data. Certainly, the server may also be connected to an application terminal. The application terminal may generate a corresponding feedback message or service data according to the uplink data received by the server from the sensing terminal and transmits the feedback message or service data to the server. The server considers the feedback message or service data generated by the application terminal as downlink data transmitted to the sensing terminal.

For example, the sensing terminal may be a smart electricity meter, the smart electricity meter may transmit power consumption in the form of upper-line data to a first gateway, the server receives the power consumption from the first gateway, and the application terminal (a billing terminal) captures the power consumption from the server to generate an electricity bill and transmit the electricity bill to the server, and the server considers the received electricity bill generated by the application terminal as downlink data transmitted to the sensing terminal.

In step 806, when the sensing terminal is an intra-frequency sensing terminal, the server transmits the downlink data to the second gateway, wherein the second gateway is configured to transmit the downlink data to the intra-frequency sensing terminal through a downlink channel at the first frequency band.

In the example embodiments of the present disclosure, whether the sensing terminal is an intra-frequency sensing terminal or an inter-frequency sensing terminal may be determined as follows:

In a first sub-step, type information of the sensing terminal is obtained from the uplink data or according to a terminal identifier reported by the sensing terminal; and In a second sub-step, when the type information indicates an intra-frequency sensing terminal, it is determined that the sensing terminal is an intra-frequency sensing terminal; or In a third sub-step, when the type information indicates an inter-frequency sensing terminal, it is determined that the sensing terminal is an inter-frequency sensing terminal.

When the sensing terminal establishes a connection with a first gateway, the uplink data may carry the type information of the sensing terminal, or the sensing terminal reports the terminal identifier when registering with the first gateway. The terminal identifier may indicate the type of the sensing terminal and whether the sensing terminal is an intra-frequency sensing terminal or an inter-frequency sensing terminal may be determined according to the type information.

After the server receives the downlink data of the application terminal, the downlink data needs to be transmitted to the sensing terminal through a gateway. If the sensing terminal is an intra-frequency sensing terminal, since the intra-frequency sensing terminal can only communicate through one frequency band, and the first frequency band of the first gateway have been used as the frequency band through which the intra-frequency sensing terminal transmits the uplink data and cannot be used as the frequency band of the downlink channel, the downlink data may be transmitted to the intra-frequency sensing terminal through a downlink channel at the first frequency band of the second gateway.

In the example embodiments of the present disclosure, in order to connect with multiple sensing terminals, multiple first gateways and multiple second gateways are usually deployed, and uplink and downlink channels are pre-configured for the first and second gateways.

For example, the uplink and downlink channels of the first and second gateways may be configured as follows:

A communication frequency band of the wireless network is obtained.

The communication frequency band is divided into a plurality of sub-bands.

At least one first frequency band is determined from the plurality of sub-bands, wherein the at least one first frequency band is a frequency band used by the first gateway to receive uplink data of the inter-frequency sensing terminal.

At least one second frequency band is determined from the plurality of sub-bands, wherein the at least one second frequency band is a frequency band used by the first gateway to receive uplink data of the intra-frequency sensing terminal and used by the second gateway to transmit downlink data to the intra-frequency sensing terminal.

At least one third frequency band is determined from the plurality of sub-bands, wherein the at least one third frequency band is a frequency band used by the second gateway to receive uplink data of the inter-frequency sensing terminal.

At least one fourth frequency band is determined from the plurality of sub-bands, wherein the at least one fourth frequency band is a frequency band used by the second gateway to receive uplink data of the intra-frequency sensing terminal and used by the first gateway to transmit downlink data to the intra-frequency sensing terminal.

The at least one first frequency band, the at least one second frequency band, the at least one third frequency band, and the at least one fourth frequency band are respectively divided into a plurality of channels according to a preset channel division rule.

The first frequency band and the second frequency band are partially overlapped or completely overlapped, and the third frequency band and the fourth frequency band are partially overlapped or completely overlapped.

With respect to example configurations of the uplink and downlink channels of the first and second gateways, reference may be made to Example embodiment 1 and it will not be repeated here.

For each frequency band, it can be divided into multiple channels according to a preset bandwidth, the frequency band of each channel is determined, and the multiple channels are numbered according to the size of the frequency bands.

As an example, the frequency bands used by the first gateway and the second gateway to receive or transmit data from/to the inter-frequency sensing terminal and the intra-frequency sensing terminal are as follows.

|  | Inter-frequency sensing terminal | | Intra-frequency sensing terminal | |
| --- | --- | --- | --- | --- |
| Gateway configuration | Uplink band MHz | Downlink band MHz | Uplink band MHz | Downlink band MHz |
| First gateway | 471.4-474.6 | 485.4-485.8 | 471.4-474.6 | 482.2-485.4 |
| Second gateway | 482.2-485.4 | 471-471.4 | 482.2-485.4 | 471.4-474.6 |

As can be seen from the above table, during communication, the intra-frequency sensing terminal may transmit uplink data to the first gateway through the uplink channel at 471.4-474.6 MHz of the first gateway, and receive downlink data through the downlink channel at 471.4-474.6 MHz of the second gateway. In addition, the first gateway and the second gateway can be compatible with the intra-frequency sensing terminal and the inter-frequency sensing terminal at the same time, and duplex communication is essentially implemented during the communication of the intra-frequency sensing terminal, which improves the communication efficiency.

The frequency band values in the frequency band configuration of the first gateway and the second gateway in the above table are merely examples. Those skilled in the art may obtain other frequency band configurations according to the above table, which is not limited in the example embodiments of the present disclosure.

In the example embodiments of the present disclosure, after determining the frequency bands, the method further includes the following step:

Each frequency band in the above table is divided into multiple channels, and the channels are numbered.

For example, in the table above, the uplink frequency band of the first gateway is 471.4-474.6 MHz, the starting frequency point of the entire communication frequency band is 470.2 MHz, and the channel bandwidth is 0.2 M; according to the equation:

$$f = 470.1 + 0.2 \times n$$

where f refers to a channel frequency point and n refers to a channel number, the uplink frequency band 471.4-474.6 MHz of the first gateway may be divided into 16 channels, respectively 471.4-471.6 MHz, 471.7-471.9 MHz . . . and so on, and the channel numbers are 7-22 respectively. Channel division is similar for other frequency bands, and the channel numbers, used by the intra-frequency sensing terminal and the inter-frequency sensing terminal, in the first gateway in configuration 1 are obtained as follows:

| | No. | Uplink channel No. | Downlink channel No. of inter-frequency sensing terminal | Downlink channel No. of intra-frequency sensing terminal |
| --- | --- | --- | --- | --- |
| First gateway | 1 | 7 | 77 | 7 |
| | 2 | 8 | 77 | 8 |
| | 3 | 9 | 77 | 9 |

-continued

| | No. | Uplink channel No. | Downlink channel No. of inter-frequency sensing terminal | Downlink channel No. of intra-frequency sensing terminal |
| --- | --- | --- | --- | --- |
| | 4 | 10 | 77 | 10 |
| | 5 | 11 | 77 | 11 |
| | 6 | 12 | 77 | 12 |
| | 7 | 13 | 77 | 13 |
| | 8 | 14 | 77 | 14 |
| First gateway | 9 | 15 | 78 | 15 |
| | 10 | 16 | 78 | 16 |
| | 11 | 17 | 78 | 17 |
| | 12 | 18 | 78 | 18 |
| | 13 | 19 | 78 | 19 |
| | 14 | 20 | 78 | 20 |
| | 15 | 21 | 78 | 21 |
| | 16 | 22 | 78 | 22 |

Each of the above channels has a frequency point. For example, the frequency point of channel 7 is 471.5 MHz, and the frequency point of channel 8 is 471.7 MHz. Therefore, when the intra-frequency sensing terminal transmits uplink data to the first gateway through channel 7, i.e., the uplink channel at a frequency point of 471.5 MHz of the first gateway, it may transmit downlink data to the intra-frequency sensing terminal through channel 7 of the second gateway, i.e., the downlink channel at a frequency point of 471.5 MHz.

The configuration 1 is only described above as an example. For other configurations, reference may be made to configuration 1, which will not be elaborated here.

It can be known from the above-mentioned channel allocation that after the intra-frequency sensing terminal transmits uplink data to the first gateway through an uplink channel of which the frequency band is the first frequency band of the first gateway, it may receive downlink data through a downlink channel of which the frequency band is the first frequency of the second gateway. For example, step 806 may include the following sub-steps.

In a first sub-step of S806, a second gateway having a communication distance covering the intra-frequency sensing terminal is determined.

In a second sub-step of S806, the downlink data is transmitted to the second gateway, wherein the second gateway is configured to transmit the downlink data to the intra-frequency sensing terminal through a downlink channel of which the frequency band is the first frequency band.

In the present disclosure, the first gateways and the second gateways are staggered, and a second gateway having a communication distance covering the intra-frequency sensing terminal may be determined by the server according to the deployment situation. For example, the server may find a second gateway near the intra-frequency sensing terminal; the second gateway scans to find the intra-frequency sensing terminal, and transmits a connection establishment request to the intra-frequency sensing terminal; after the connection is successfully established, downlink data is transmitted to the second gateway and the second gateway then transmits the downlink data to the intra-frequency sensing terminal through a downlink channel at the first frequency band.

In step 808, when the sensing terminal is an inter-frequency sensing terminal, the server transmits the downlink data to the first gateway, wherein the first gateway is configured to transmit the downlink data to the inter-frequency sensing terminal through the downlink channel at the second frequency band.

If the sensing terminal is an inter-frequency sensing terminal, i.e., the terminal can perform communication through different frequency bands, downlink data may be transmitted to the first gateway, and the first gateway then transmits the downlink data to the inter-frequency sensing terminal through the downlink channel at the second frequency band.

In the example embodiments of the present disclosure, uplink data transmitted by the sensing terminal is received through an uplink channel of which the frequency band is the first frequency band of the first gateway. If the sensing terminal is an intra-frequency sensing terminal, downlink data is transmitted to the sensing terminal through a downlink channel of which the frequency band is the first frequency band of the second gateway; if the sensing terminal is an inter-frequency sensing terminal, downlink data may be transmitted to the sensing terminal through the first gateway. In other words, the wireless communication method of the example embodiments of the present disclosure can be compatible with an intra-frequency terminal and an inter-frequency terminal, and can achieve duplex communication of the intra-frequency sensing terminal based on the communication with the intra-frequency sensing terminal via the first gateway and the second gateway, thus improving the communication efficiency.

Referring to FIG. 9, a flowchart of steps in Example embodiment 6 of a wireless communication method according to the present disclosure is shown. The wireless communication method according to the example embodiment of the present disclosure may be applied to a wireless network. The wireless network includes a sensing terminal, and a first gateway and a second gateway that are connected with a server, the frequency band of an uplink channel of the first gateway is a first frequency band, the frequency band of a downlink channel of the first gateway is a second frequency band, and the frequency band of a downlink channel of the second gateway is a first frequency band. The method, for example, includes the following steps.

In step 902, when a preset trigger event is detected or a preset time is reached, the sensing terminal transmits uplink data to the first gateway through an uplink channel at the first frequency band; and the first gateway transmits the uplink data to the server.

In the example embodiments of the present disclosure, the sensing terminal may be a sensor provided with a wireless communication module. In order to save power and prolong the service life of the sensing terminal, the wireless communication module of the sensing terminal is usually in a sleep state, and only when a preset trigger event is detected or a preset time is reached, the connection with a gateway is enabled. For example, when a smart electricity meter needs to calculate the electricity bill at the end of the month, the power consumption is transmitted to the gateway through the wireless communication module at a specified time every month. For another example, when detecting that a temperature is greater than or less than a preset threshold, a temperature sensor transmits alarm information to the gateway through the wireless communication module. For example, the sensing terminal may transmit uplink data to the first gateway through an uplink channel of which the frequency band is the first frequency band of the first gateway.

In step 904, when the sensing terminal is an intra-frequency sensing terminal, downlink data of the second gateway is received from a downlink channel of which the frequency band is the first frequency band of the second gateway, wherein the downlink data is data transmitted by the server to the second gateway.

In the example embodiments of the present disclosure, in order to connect with multiple sensing terminals, multiple first gateways and multiple second gateways are usually deployed, and uplink and downlink channels are pre-configured for the first and second gateways.

For example, the uplink and downlink channels of the first and second gateways may be configured as follows:

A communication frequency band of the wireless network is obtained;

The communication frequency band is divided into a plurality of sub-bands;

At least one first frequency band is determined from the plurality of sub-bands, wherein the at least one first frequency band is a frequency band used by the first gateway to receive uplink data of the inter-frequency sensing terminal;

At least one second frequency band is determined from the plurality of sub-bands, wherein the at least one second frequency band is a frequency band used by the first gateway to receive uplink data of the intra-frequency sensing terminal and used by the second gateway to transmit downlink data to the intra-frequency sensing terminal;

At least one third frequency band is determined from the plurality of sub-bands, wherein the at least one third frequency band is a frequency band used by the second gateway to receive uplink data of the inter-frequency sensing terminal;

At least one fourth frequency band is determined from the plurality of sub-bands, wherein the at least one fourth frequency band is a frequency band used by the second gateway to receive uplink data of the intra-frequency sensing terminal and used by the first gateway to transmit downlink data to the intra-frequency sensing terminal;

The at least one first frequency band, the at least one second frequency band, the at least one third frequency band, and the at least one fourth frequency band are respectively divided into a plurality of channels according to a preset channel division rule.

In the example embodiments of the present disclosure, the first frequency band and the second frequency band are partially overlapped or completely overlapped, and the third frequency band and the fourth frequency band are partially overlapped or completely overlapped.

With respect to example configurations of the uplink and downlink channels of the first and second gateways, reference may be made to Example embodiment 1 and it will not be repeated here.

Based on the above node configuration, step 904 may include the following sub-steps:

In a first sub-step of S904, a request for establishing a downlink channel of which the frequency band is the first frequency band is received from the second gateway.

In practical applications, the sensing terminal is not always connected to the first gateway or the second gateway. When the second gateway needs to transmit downlink data to the sensing terminal, the second gateway transmits a downlink channel request to the sensing terminal, and the sensing terminal receives the request.

In a second sub-step of S904, a downlink channel of which the frequency band is the first frequency band is established with the second gateway.

After the sensing terminal receives the downlink channel establishment request, since the sensing terminal is an intra-frequency sensing terminal, a downlink channel of which the frequency band is the first frequency band is established with the second gateway.

In a third sub-step of S904, the downlink data is received through a downlink channel at the first frequency band.

In the example embodiments of the present disclosure, the intra-frequency sensing terminal transmits uplink data through an uplink channel of which the frequency band is the first frequency band of the first gateway, and receives downlink data of the second node through a downlink channel of which the frequency band is the first frequency band of the second gateway, thus achieving duplex communication and improving the communication efficiency.

In step 906, when the sensing terminal is an inter-frequency sensing terminal, downlink data of the first gateway is received from a downlink channel of which the frequency band is the second frequency band of the first gateway, wherein the downlink data is data transmitted by the server to the first gateway.

The downlink data may be data generated by the server according to the uplink data. Alternatively, the wireless network further includes an application terminal, wherein the application terminal is connected with the server, and then the downlink data may also be data generated by the application terminal according to uplink data in the server.

If the sensing terminal is an inter-frequency sensing terminal, i.e., the sensing terminal can perform communication through different frequency bands, downlink data may be received through the downlink channel at the second frequency band in the first node connected during the transmission of the uplink data.

In the example embodiments of the present disclosure, the sensing terminal transmits uplink data through an uplink channel of which the frequency band is the first frequency band of the first gateway. If the sensing terminal is an intra-frequency sensing terminal, downlink data is received through a downlink channel of which the frequency band is the first frequency band of the second gateway; and if the sensing terminal is an inter-frequency sensing terminal, downlink data may be received through the first gateway. In other words, the wireless communication method of the example embodiments of the present disclosure can be compatible with an intra-frequency sensing terminal and an inter-frequency sensing terminal, and can achieve duplex communication based on the communication with the intra-frequency sensing terminal via the first gateway and the second gateway, thus improving the communication efficiency.

Referring to FIG. 10, a flowchart of steps in Example embodiment 7 of a wireless communication method according to the present disclosure is shown. The wireless communication method according to the example embodiment of the present disclosure may be applied to a wireless network. The wireless network includes an intra-frequency sensing terminal, and a first gateway and a second gateway that are connected with a server, the frequency band of an uplink channel of the first gateway is a first frequency band, the frequency band of a downlink channel of the first gateway is a second frequency band, and the frequency band of a downlink channel of the second gateway is a first frequency band. The method, for example, includes the following steps.

In step 1002, the server receives uplink data of the first gateway, wherein the uplink data is data transmitted by the intra-frequency sensing terminal through an uplink channel at the first frequency band.

In the example embodiments of the present disclosure, the sensing terminal may be an intra-frequency sensing terminal. The intra-frequency sensing terminal transmits uplink data to the first gateway through the uplink channel at the first frequency in the first gateway, and the server may receive the uplink data from the first gateway.

In step 1004, the server generates downlink data according to the uplink data.

In the example embodiments of the present disclosure, the downlink data may be data generated by the server according to the uplink data. Alternatively, the wireless network further includes an application terminal, wherein the application terminal is connected with the server, and then the downlink data may also be data generated by the application terminal according to uplink data in the server.

In step 1006, the server transmits the downlink data to the second gateway, wherein the second gateway is configured to transmit the downlink data to the intra-frequency sensing terminal through a downlink channel at the first frequency band.

In the example embodiments of the present disclosure, in order to connect with multiple intra-frequency sensing terminals, multiple first gateways and multiple second gateways are usually deployed, and uplink and downlink channels are pre-configured for the first and second gateways.

For example, the uplink and downlink channels of the first and second gateways may be configured as follows:

A communication frequency band of the wireless network is obtained;

The communication frequency band is divided into a plurality of sub-bands;

At least one first frequency band is determined from the plurality of sub-bands, wherein the at least one first frequency band is a frequency band used by the first gateway to receive uplink data of the inter-frequency sensing terminal;

At least one second frequency band is determined from the plurality of sub-bands, wherein the at least one second frequency band is a frequency band used by the first gateway to receive uplink data of the intra-frequency sensing terminal and used by the second gateway to transmit downlink data to the intra-frequency sensing terminal;

At least one third frequency band is determined from the plurality of sub-bands, wherein the at least one third frequency band is a frequency band used by the second gateway to receive uplink data of the inter-frequency sensing terminal;

At least one fourth frequency band is determined from the plurality of sub-bands, wherein the at least one fourth frequency band is a frequency band used by the second gateway to receive uplink data of the intra-frequency sensing terminal and used by the first gateway to transmit downlink data to the intra-frequency sensing terminal;

The at least one first frequency band, the at least one second frequency band, the at least one third frequency band, and the at least one fourth frequency band are respectively divided into a plurality of channels according to a preset channel division rule.

In the example embodiments of the present disclosure, the first frequency band and the second frequency band are partially overlapped or completely overlapped, and the third frequency band and the fourth frequency band are partially overlapped or completely overlapped.

With respect to example configurations of the uplink and downlink channels of the first and second gateways, reference may be made to Example embodiment 1 and it will not be repeated here.

Based on the configuration of uplink and downlink channels for the first and second gateways, step 806 includes the following sub-steps:

determining a second gateway having a communication distance covering the intra-frequency sensing terminal; and transmitting the downlink data to the second gateway, wherein the second gateway is configured to transmit the downlink data to the intra-frequency sensing terminal through a downlink channel of which the frequency band is the first frequency band.

In the present disclosure, the first gateways and the second gateways are staggered, and a second gateway having a communication distance covering the intra-frequency sensing terminal may be determined by the server according to the deployment situation. For example, the server may find a second gateway near the intra-frequency sensing terminal; the second gateway scans to find the intra-frequency sensing terminal, and transmits a connection establishment request to the intra-frequency sensing terminal; after the connection is successfully established, downlink data is transmitted to the second gateway and the second gateway then transmits the downlink data to the intra-frequency sensing terminal through a downlink channel at the first frequency band.

In the example embodiments of the present disclosure, uplink data transmitted by the intra-frequency sensing terminal is received through an uplink channel of which the frequency band is the first frequency band of the first gateway, and downlink data is transmitted to the intra-frequency sensing terminal through a downlink channel of which the frequency band is the first frequency band of the second gateway. In other words, the wireless communication method of the example embodiments of the present disclosure can achieve duplex communication in an intra-frequency network, thus improving the communication efficiency.

Referring to FIG. 11, a flowchart of steps in Example embodiment 8 of a wireless communication method according to the present disclosure is shown. The wireless communication method according to the example embodiment of the present disclosure may be applied to a wireless network. The wireless network includes an intra-frequency sensing terminal, and a first gateway and a second gateway that are connected with a server, the frequency band of an uplink channel of the first gateway is a first frequency band, the frequency band of a downlink channel of the first gateway is a second frequency band, and the frequency band of a downlink channel of the second gateway is a first frequency band. The method, for example, includes the following steps.

In step 1102, when a preset trigger event is detected or a preset time is reached, the intra-frequency sensing terminal transmits uplink data to the first gateway through an uplink channel at the first frequency band; and the first gateway transmits the uplink data to the server.

In the example embodiments of the present disclosure, the intra-frequency sensing terminal may be a sensor provided with a wireless communication module. In order to save power and prolong the service life of the sensing terminal, the wireless communication module of the sensing terminal is usually in a sleep state, and only when a preset trigger event is detected or a preset time is reached, the connection with a gateway is enabled and uplink data is transmitted to the first gateway through an uplink channel at the first frequency band.

In step 1104, a request for establishing a downlink channel of which the frequency band is the first frequency band is received from the second gateway.

In the example embodiments of the present disclosure, in order to connect with multiple sensing terminals, multiple first gateways and multiple second gateways are usually deployed, and uplink and downlink channels are pre-configured for the first and second gateways.

For example, the uplink and downlink channels of the first and second gateways may be configured as follows:

A communication frequency band of the wireless network is obtained;

The communication frequency band is divided into a plurality of sub-bands;

At least one first frequency band is determined from the plurality of sub-bands, wherein the at least one first frequency band is a frequency band used by the first gateway to receive uplink data of the inter-frequency sensing terminal;

At least one second frequency band is determined from the plurality of sub-bands, wherein the at least one second frequency band is a frequency band used by the first gateway to receive uplink data of the intra-frequency sensing terminal and used by the second gateway to transmit downlink data to the intra-frequency sensing terminal;

At least one third frequency band is determined from the plurality of sub-bands, wherein the at least one third frequency band is a frequency band used by the second gateway to receive uplink data of the inter-frequency sensing terminal;

At least one fourth frequency band is determined from the plurality of channels, wherein the at least one fourth frequency band is a frequency band used by the second gateway to receive uplink data of the intra-frequency sensing terminal and used by the first gateway to transmit downlink data to the intra-frequency sensing terminal;

The at least one first frequency band, the at least one second frequency band, the at least one third frequency band, and the at least one fourth frequency band are respectively divided into a plurality of channels according to a preset channel division rule.

In the example embodiments of the present disclosure, the first frequency band and the second frequency band are partially overlapped or completely overlapped, and the third frequency band and the fourth frequency band are partially overlapped or completely overlapped.

With respect to example configurations of the uplink and downlink channels of the first and second gateways, reference may be made to Example embodiment 1 and it will not be repeated here.

In practical applications, the intra-frequency sensing terminal is not always connected to the first gateway or the second gateway. When the second gateway needs to transmit downlink data to the intra-frequency sensing terminal, the second gateway transmits a downlink channel request to the intra-frequency sensing terminal, and the intra-frequency sensing terminal receives the request.

In step 1106, a downlink channel of which the frequency band is the first frequency band is established with the second gateway.

After the intra-frequency sensing terminal receives the downlink channel establishment request, a downlink channel of which the frequency band is the first frequency band is established with the second gateway.

In step 1108, the downlink data is received through the downlink channel of which the frequency band is the first frequency band.

In the example embodiments of the present disclosure, the downlink data may be data generated by the server according to the uplink data. Alternatively, the wireless network further includes an application terminal, wherein the application terminal is connected with the server, and then the downlink data may also be data generated by the application terminal according to uplink data in the server.

In the example embodiments of the present disclosure, the intra-frequency sensing terminal transmits uplink data through an uplink channel of which the frequency band is the first frequency band of the first gateway, and receives downlink data of the second node through a downlink channel of which the frequency band is the first frequency band of the second gateway, thus achieving duplex communication and improving the communication efficiency.

It should be noted that, in view of the method example embodiments, for simplicity of description, they are all expressed as a series of operation combinations, but those skilled in the art should understand that the example embodiments of the present disclosure are not limited by the described operation sequence because some steps can be carried out in other orders or at the same time according to the example embodiments of the present disclosure. Second, those skilled in the art should also understand that the embodiments described in the disclosure are example embodiments, and the involved operations are not necessary for the present disclosure.

Figure 12:
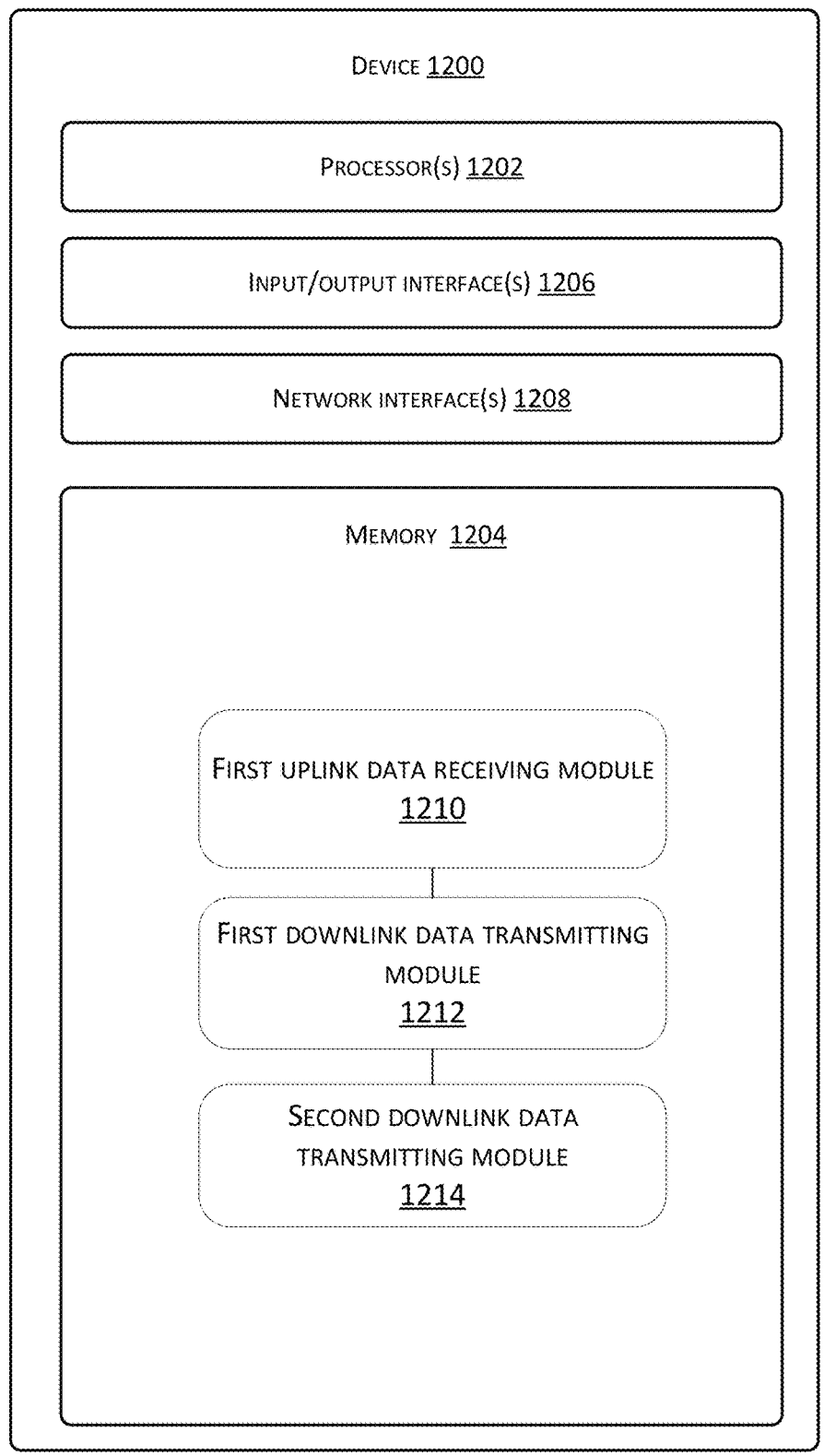
FIG. 12 is a structural block diagram of Example embodiment 1 of a wireless communication device according to the present disclosure.

Referring to FIG. 12, a structural block diagram of Example embodiment 1 of a wireless communication device according to the present disclosure is shown. The device is applied to a wireless network. The wireless network includes a terminal, a first node, and a second node, the frequency band of an uplink channel of the first node is identical to the frequency band of a downlink channel of the second node, and the frequency band of the uplink channel of the first node is different from the frequency band of a downlink channel of the first node.

As shown in FIG. 12, the device 1200 includes one or more processor(s) 1202 or data processing unit(s) and memory 1204. The device 1200 may further include one or more input/output interface(s) 1206 and one or more network interface(s) 1208. The memory 1204 is an example of computer readable medium or media.

The computer readable medium includes non-volatile and volatile media as well as movable and non-movable media, and may store information by means of any method or technology. The information may be a computer readable instruction, a data structure, and a module of a program or other data. A storage medium of a computer includes, for example, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and may be used to store information accessible to the computing device. According to the definition in the present disclosure, the computer readable medium does not include transitory media, such as a modulated data signal and a carrier.

The memory 1204 may store therein a plurality of modules or units including:

a first uplink data receiving module 1210, configured to receive uplink data from the terminal through the uplink channel of the first node;

a first downlink data transmitting module 1212, configured to transmit downlink data to the terminal through the downlink channel of the second node when the terminal is an intra-frequency terminal; and a second downlink data transmitting module 1214, configured to transmit downlink data to the terminal through the downlink channel of the first node when the terminal is an inter-frequency terminal.

For example, the downlink data is data generated by the first node according to the uplink data.

For example, the wireless network further includes an application terminal, and the downlink data is data generated by the application terminal according to uplink data received from the first node.

For example, the device 1200 may further include the following modules (not shown in FIG. 12) stored in the memory 1204:

a first type information obtaining module, configured to obtain type information of the terminal from the uplink data or according to a terminal identifier reported by the terminal;

a first type determining module, configured to determine that the terminal is an intra-frequency terminal when the type information indicates an intra-frequency terminal; and a second type determining module, configured to determine that the terminal is an inter-frequency terminal when the type information indicates an inter-frequency terminal.

For example, the device 1200 may further include a node configuration module (not shown in FIG. 12) stored in the memory 1204, wherein the node configuration module includes:

a communication frequency band obtaining submodule, configured to obtain a communication frequency band of the wireless network;

a frequency band dividing submodule, configured to divide the communication frequency band into a plurality of sub-bands;

a first frequency band determining submodule, configured to determine at least one first frequency band from the plurality of sub-bands, wherein the at least one first frequency band is a frequency band used by the first node to receive uplink data of the inter-frequency terminal;

a second frequency band determining submodule, configured to determine at least one second frequency band from the plurality of sub-bands, wherein the at least one second frequency band is a frequency band used by the first node to receive uplink data of the intra-frequency terminal and used by the second node to transmit downlink data to the intra-frequency terminal;

a third frequency band determining submodule, configured to determine at least one third frequency band from the plurality of sub-bands, wherein the at least one third frequency band is a frequency band used by the second node to receive uplink data of the inter-frequency terminal;

a fourth frequency band determining submodule, configured to determine at least one fourth frequency band from the plurality of sub-bands, wherein the at least one fourth frequency band is a frequency band used by the second node to receive uplink data of the intra-frequency terminal and used by the first node to transmit downlink data to the intra-frequency terminal; and a channel dividing submodule, configured to respectively divide the at least one first frequency band, the at least one second frequency band, the at least one third frequency band, and the at least one fourth frequency band into a plurality of channels according to a preset channel division rule.

For example, the first frequency band and the second frequency band are partially overlapped or completely overlapped, and the third frequency band and the fourth frequency band are partially overlapped or completely overlapped.

For example, the first downlink data transmitting module 1212 includes:

a second node determining submodule, configured to determine a second node having a communication distance covering the intra-frequency terminal;

a first downlink data transmitting submodule, configured to transmit the downlink data to the second node; and a second downlink data transmitting submodule, configured for the second node to transmit downlink data to the terminal through a downlink channel.

Figure 13:
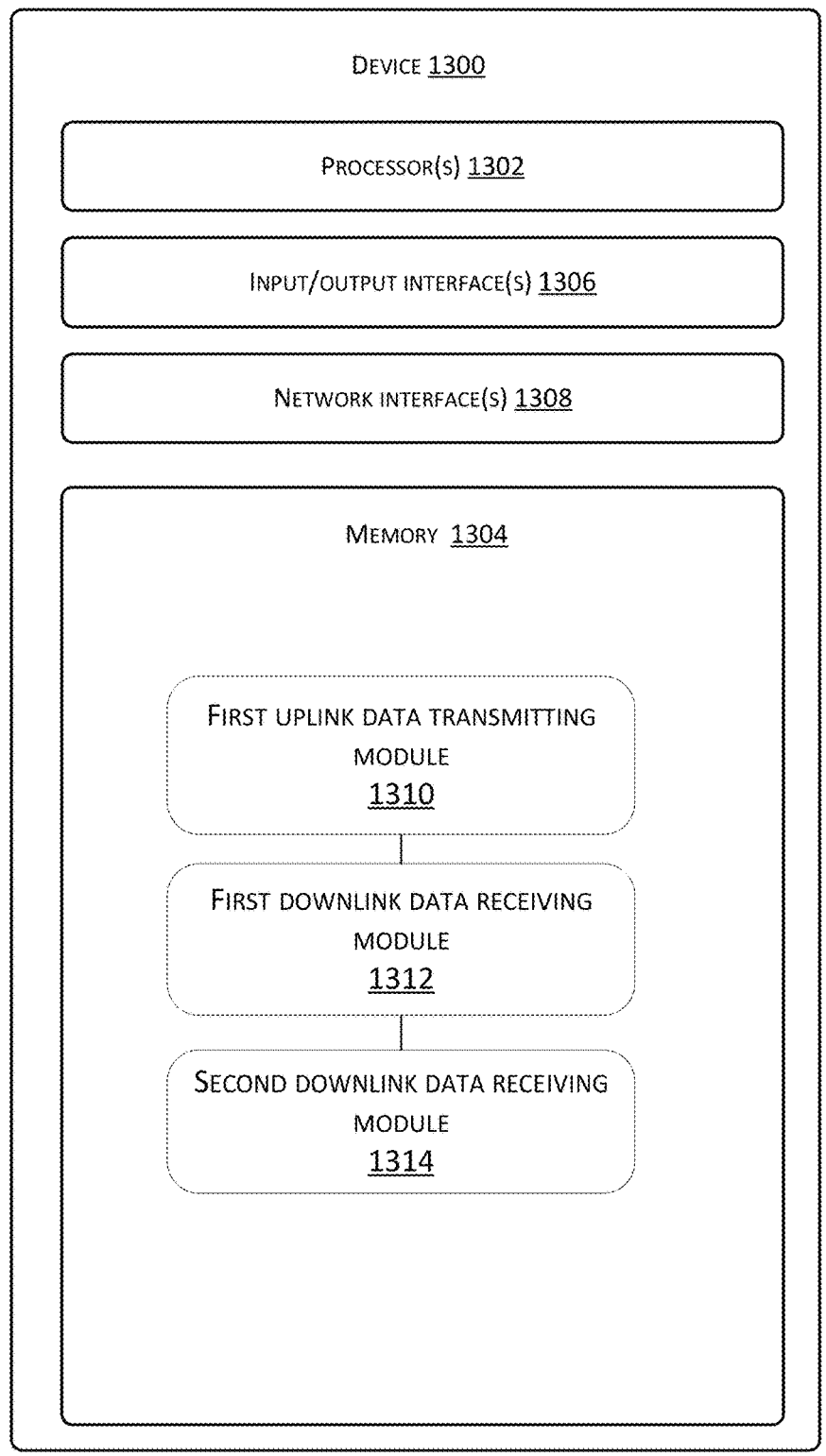
FIG. 13 is a structural block diagram of Example embodiment 2 of a wireless communication device according to the present disclosure.

Referring to FIG. 13, a structural block diagram of Example embodiment 2 of a wireless communication device according to the present disclosure is shown. The device is applied to a wireless network. The wireless network includes a terminal, a first node, and a second node, the frequency band of an uplink channel of the first node is identical to the frequency band of a downlink channel of the second node, and the frequency band of the uplink channel of the first node is different from the frequency band of a downlink channel of the first node.

As shown in FIG. 13, the device 1300 includes one or more processor(s) 1302 or data processing unit(s) and memory 1304. The device 1300 may further include one or more input/output interface(s) 1306 and one or more network interface(s) 1308. The memory 1304 is an example of computer readable medium or media.

The memory 1304 may store therein a plurality of modules or units including:

a first uplink data transmitting module 1310, configured for the terminal to transmit uplink data to the first node through the uplink channel of the first node when a preset trigger event is detected or a preset time is reached;

a first downlink data receiving module 1312, configured to receive downlink data from the downlink channel of the second node when the terminal is an intra-frequency terminal; and a second downlink data receiving module 1314, configured to receive downlink data from the downlink channel of the first node when the terminal is an inter-frequency terminal.

For example, the downlink data is data generated by the first node according to the uplink data.

For example, the wireless network further includes an application terminal, and the downlink data is data generated by the application terminal according to uplink data received from the first node.

For example, the first downlink data receiving module 1312 includes:

a first downlink channel establishment request receiving submodule, configured to receive a request for establishing a downlink channel from the second node;

a first downlink channel establishing submodule, configured to establish a downlink channel with the second node; and a first downlink data receiving submodule, configured to receive the downlink data through the downlink channel of the first node.

For example, the device 1300 may further include a node configuration module (not shown in FIG. 13) stored in the memory 1304, wherein the node configuration module includes:

a communication frequency band obtaining submodule, configured to obtain a communication frequency band of the wireless network;

a frequency band dividing submodule, configured to divide the communication frequency band into a plurality of sub-bands;

a first frequency band determining submodule, configured to determine at least one first frequency band from the plurality of sub-bands, wherein the at least one first frequency band is a frequency band used by the first node to receive uplink data of the inter-frequency terminal;

a second frequency band determining submodule, configured to determine at least one second frequency band from the plurality of sub-bands, wherein the at least one second frequency band is a frequency band used by the first node to receive uplink data of the intra-frequency terminal and used by the second node to transmit downlink data to the intra-frequency terminal;

a third frequency band determining submodule, configured to determine at least one third frequency band from the plurality of sub-bands, wherein the at least one third frequency band is a frequency band used by the second node to receive uplink data of the inter-frequency terminal;

a fourth frequency band determining submodule, configured to determine at least one fourth frequency band from the plurality of sub-bands, wherein the at least one fourth frequency band is a frequency band used by the second node to receive uplink data of the intra-frequency terminal and used by the first node to transmit downlink data to the intra-frequency terminal; and a channel dividing submodule, configured to respectively divide the at least one first frequency band, the at least one second frequency band, the at least one third frequency band, and the at least one fourth frequency band into a plurality of channels according to a preset channel division rule.

For example, the first frequency band and the second frequency band are partially overlapped or completely overlapped, and the third frequency band and the fourth frequency band are partially overlapped or completely overlapped.

Figure 14:
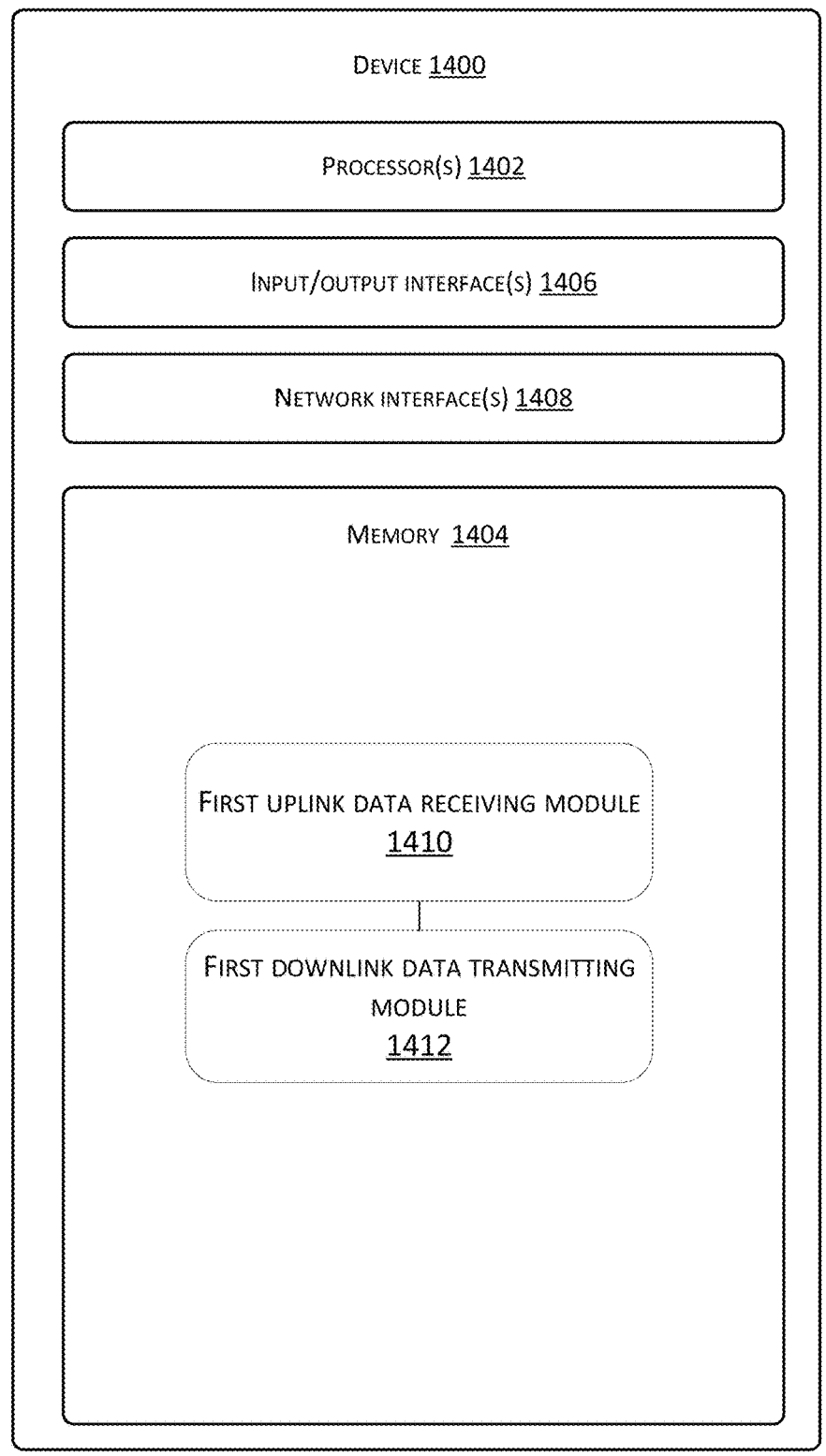
FIG. 14 is a structural block diagram of Example embodiment 3 of a wireless communication device according to the present disclosure.

Referring to FIG. 14, a structural block diagram of Example embodiment 3 of a wireless communication device according to the present disclosure is shown. The device is applied to a wireless network. The wireless network includes a terminal, a first node, and a second node, the frequency band of an uplink channel of the first node is identical to the frequency band of a downlink channel of the second node, and the frequency band of the uplink channel of the first node is different from the frequency band of a downlink channel of the first node.

As shown in FIG. 14, the device 1400 includes one or more processor(s) 1402 or data processing unit(s) and memory 1404. The device 1400 may further include one or more input/output interface(s) 1406 and one or more network interface(s) 1408. The memory 1404 is an example of computer readable medium or media.

The memory 1404 may store therein a plurality of modules or units including:

a first uplink data receiving module 1410, configured to receive uplink data from the terminal through the uplink channel of the first node; and a first downlink data transmitting module 1412, configured to transmit downlink data to the terminal through the downlink channel of the second node when the terminal is an intra-frequency terminal.

Figure 15:
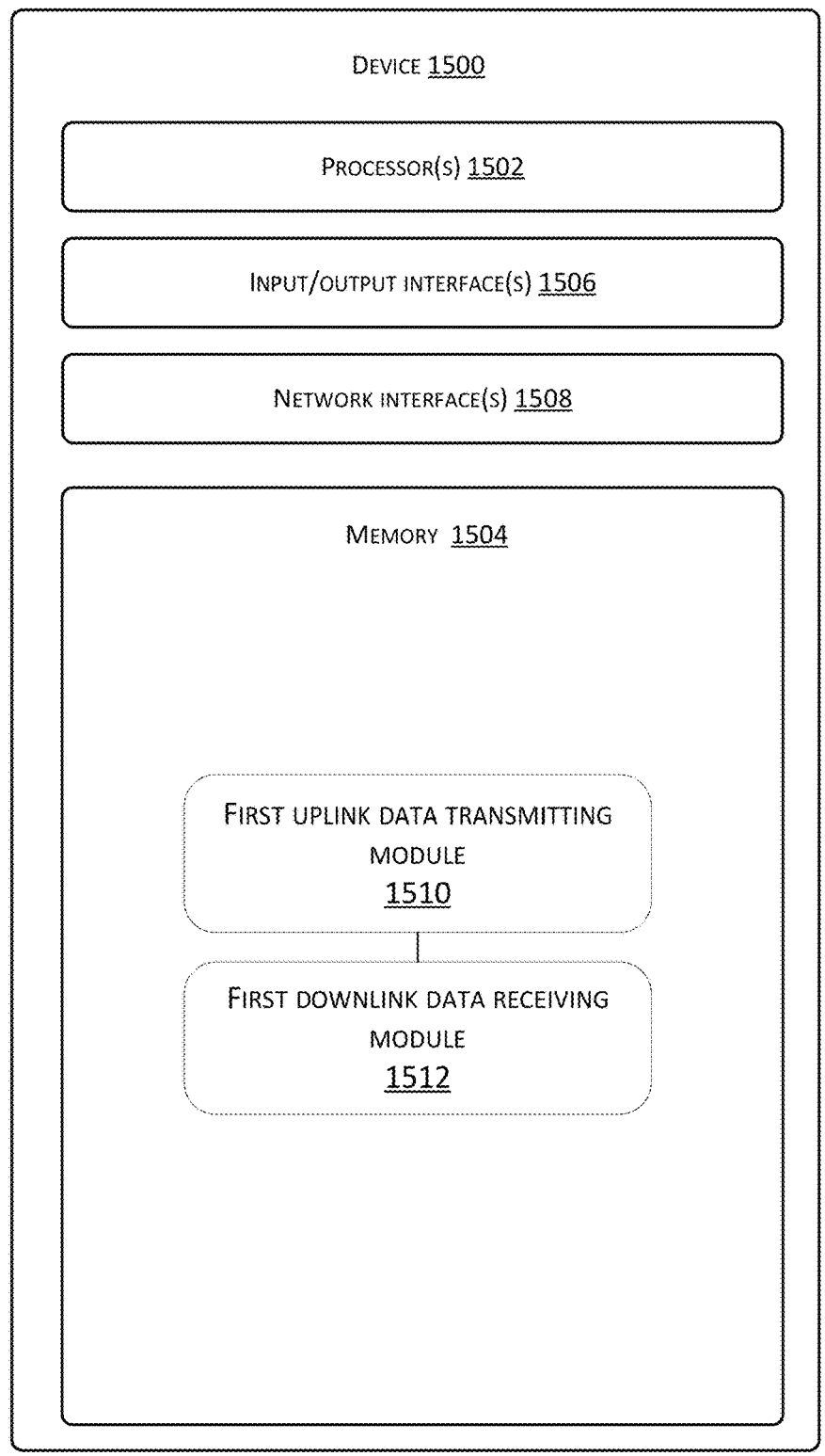
FIG. 15 is a structural block diagram of Example embodiment 4 of a wireless communication device according to the present disclosure.

Referring to FIG. 15, a structural block diagram of Example embodiment 4 of a wireless communication device according to the present disclosure is shown. The device is applied to a wireless network. The wireless network includes a terminal, a first node, and a second node, the frequency band of an uplink channel of the first node is identical to the frequency band of a downlink channel of the second node, and the frequency band of the uplink channel of the first node is different from the frequency band of a downlink channel of the first node.

As shown in FIG. 15, the device 1500 includes one or more processor(s) 1502 or data processing unit(s) and memory 1504. The device 1500 may further include one or more input/output interface(s) 1506 and one or more network interface(s) 1508. The memory 1504 is an example of computer readable medium or media.

The memory 1504 may store therein a plurality of modules or units including:

a first uplink data transmitting module 1510, configured for the terminal to transmit uplink data to the first node through the uplink channel of the first node when a preset trigger event is detected or a preset time is reached; and a first downlink data receiving module 1512, configured to receive downlink data from the downlink channel of the second node when the terminal is an intra-frequency terminal.

Figure 16:
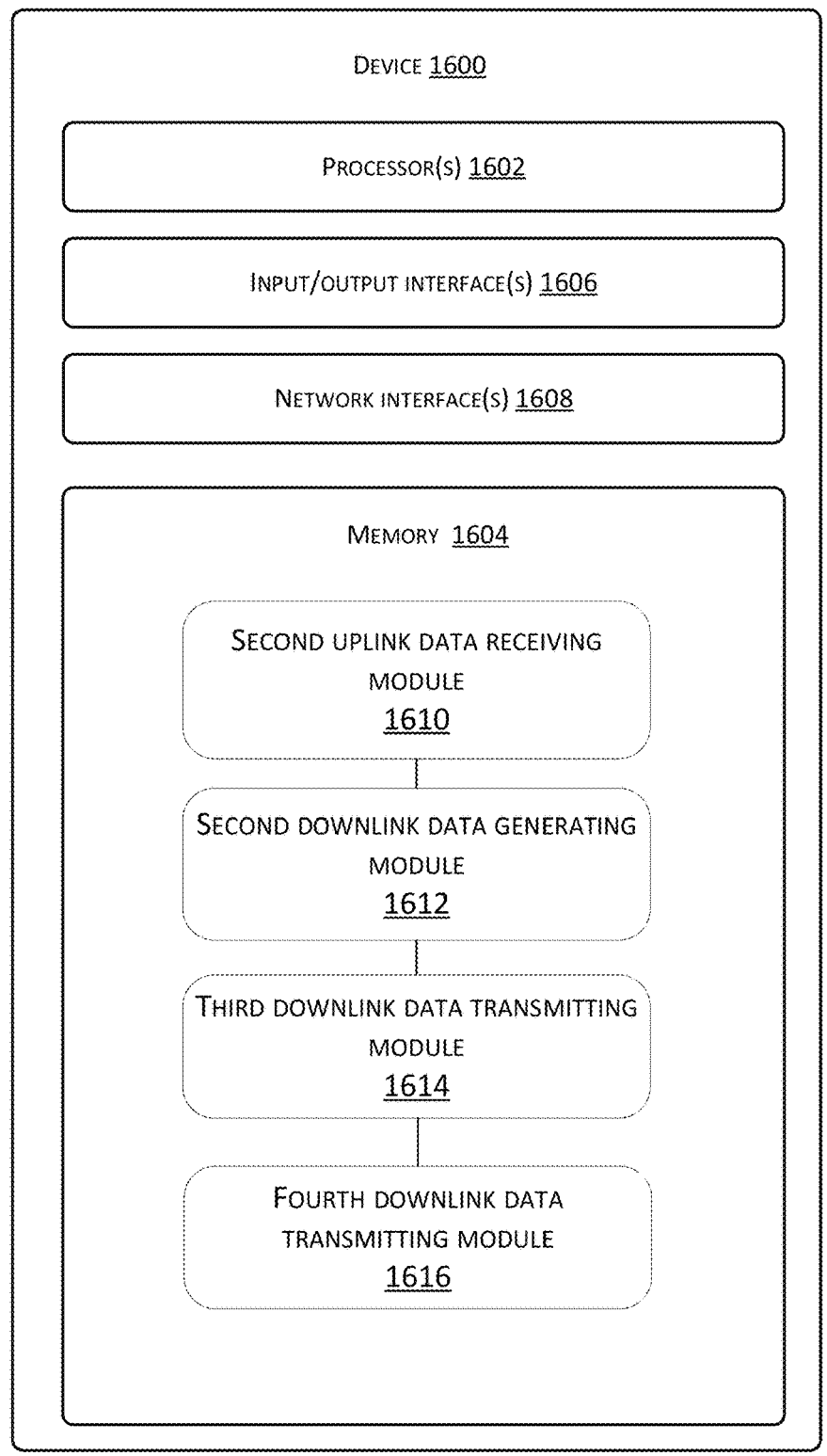
FIG. 16 is a structural block diagram of Example embodiment 5 of a wireless communication device according to the present disclosure.

Referring to FIG. 16, a structural block diagram of Example embodiment 5 of a wireless communication device according to the present disclosure is shown. The device is applied to a wireless network. The wireless network includes a sensing terminal, and a first gateway and a second gateway that are connected with a server, the frequency band of an uplink channel of the first gateway is a first frequency band, the frequency band of a downlink channel of the first gateway is a second frequency band, and the frequency band of a downlink channel of the second gateway is a first frequency band.

As shown in FIG. 16, the device 1600 includes one or more processor(s) 1602 or data processing unit(s) and memory 1604. The device 1600 may further include one or more input/output interface(s) 1606 and one or more network interface(s) 1608. The memory 1604 is an example of computer readable medium or media.

The memory 1604 may store therein a plurality of modules or units including:

a second uplink data receiving module 1610, configured to receive uplink data of the first gateway, wherein the uplink data is data transmitted by the sensing terminal through an uplink channel at the first frequency band;

a second downlink data generating module 1612, configured to generate the downlink data according to the uplink data;

a third downlink data transmitting module 1614, configured for the server to transmit the downlink data to the second gateway when the sensing terminal is an intra-frequency sensing terminal, wherein the second gateway is configured to transmit the downlink data to the intra-frequency sensing terminal through a downlink channel at the first frequency band; and a fourth downlink data transmitting module 1616, configured for the server to transmit the downlink data to the first gateway when the sensing terminal is an inter-frequency sensing terminal, wherein the first gateway is configured to transmit the downlink data to the inter-frequency sensing terminal through a downlink channel at the second frequency band.

For example, the wireless network further includes an application terminal, wherein the application terminal is connected with the server, and then the downlink data further includes data generated by the application terminal according to uplink data in the server.

For example, the device 1600 may further include the following modules (not shown in FIG. 16) stored in the memory 1604:

a second type information obtaining module, configured to obtain type information of the sensing terminal from the uplink data or according to a terminal identifier reported by the sensing terminal;

a third type determining module, configured to determine that the sensing terminal is an intra-frequency sensing terminal when the type information indicates an intra-frequency sensing terminal; and a fourth type determining module, configured to determine that the sensing terminal is an inter-frequency sensing terminal when the type information indicates an inter-frequency sensing terminal.

For example, the device 1600 may further include a gateway configuration module (not shown in FIG. 16) stored in the memory 1604, wherein the gateway configuration module includes:

a communication frequency band obtaining submodule, configured to obtain a communication frequency band of the wireless network;

a frequency band dividing submodule, configured to divide the communication frequency band into a plurality of sub-bands;

a first frequency band determining submodule, configured to determine at least one first frequency band from the plurality of sub-bands, wherein the at least one first frequency band is a frequency band used by the first gateway to receive uplink data of the inter-frequency sensing terminal;

a second frequency band determining submodule, configured to determine at least one second frequency band from the plurality of sub-bands, wherein the at least one second frequency band is a frequency band used by the first gateway to receive uplink data of the intra-frequency sensing terminal and used by the second gateway to transmit downlink data to the intra-frequency sensing terminal;

a third frequency band determining submodule, configured to determine at least one third frequency band from the plurality of sub-bands, wherein the at least one third frequency band is a frequency band used by the second gateway to receive uplink data of the inter-frequency sensing terminal;

a fourth frequency band determining submodule, configured to determine at least one fourth frequency band from the plurality of sub-bands, wherein the at least one fourth frequency band is a frequency band used by the second gateway to receive uplink data of the intra-frequency sensing terminal and used by the first gateway to transmit downlink data to the intra-frequency sensing terminal; and a channel dividing submodule, configured to respectively divide the at least one first frequency band, the at least one second frequency band, the at least one third frequency band, and the at least one fourth frequency band into a plurality of channels according to a preset channel division rule.

For example, the first frequency band and the second frequency band are partially overlapped or completely overlapped, and the third frequency band and the fourth frequency band are partially overlapped or completely overlapped.

For example, the third downlink data transmitting module 1614 includes:

a second gateway determining submodule, configured to determine a second gateway having a communication distance covering the intra-frequency sensing terminal; and a third downlink data transmitting submodule, configured to transmit the downlink data to the second gateway, wherein the second gateway is configured to transmit the downlink data to the intra-frequency sensing terminal through a downlink channel of which the frequency band is the first frequency band.

Figure 17:
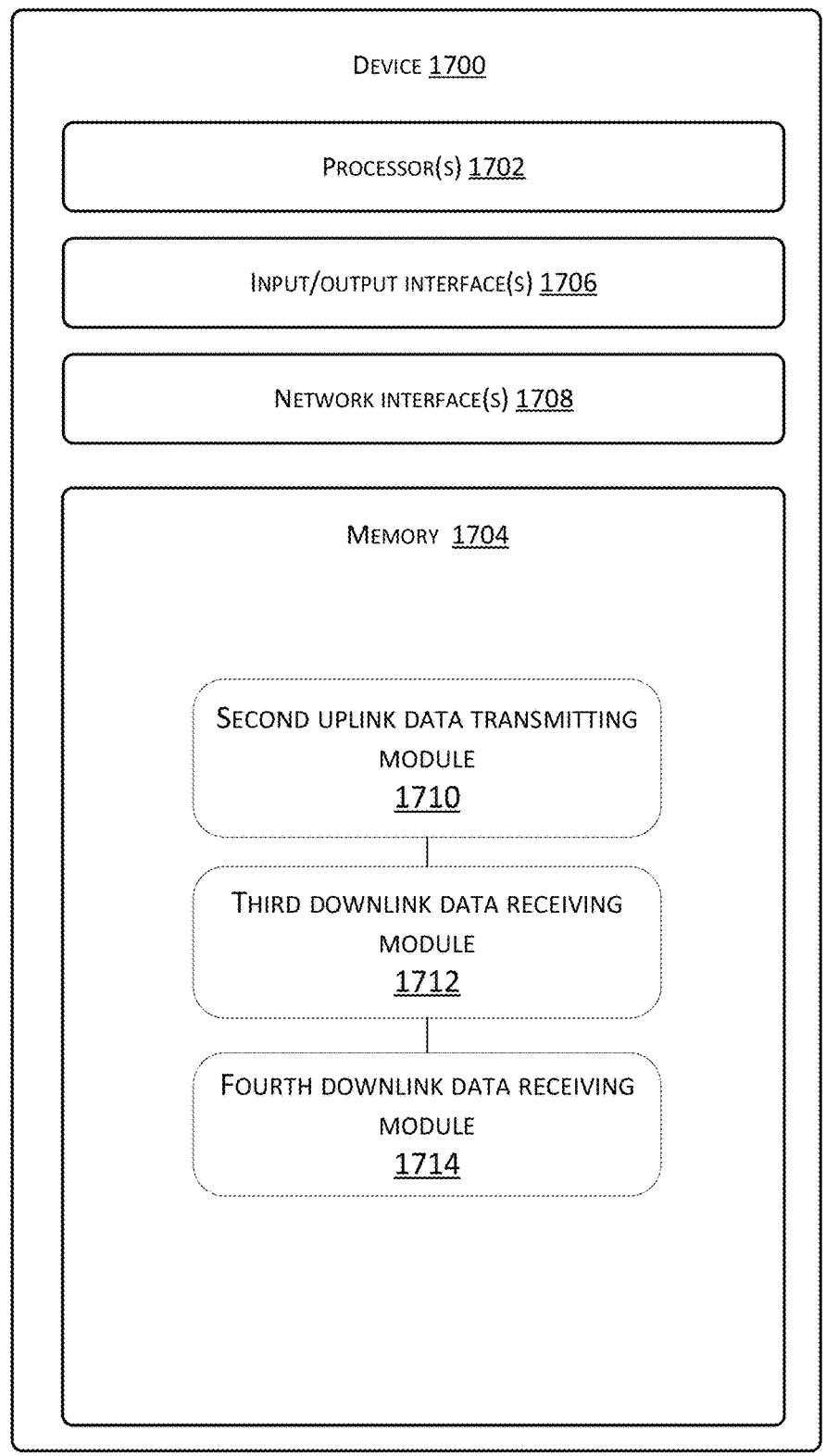
FIG. 17 is a structural block diagram of Example embodiment 6 of a wireless communication device according to the present disclosure.

Referring to FIG. 17, a structural block diagram of Example embodiment 6 of a wireless communication device according to the present disclosure is shown. The device is applied to a wireless network. The wireless network includes a sensing terminal, and a first gateway and a second gateway that are connected with a server, the frequency band of an uplink channel of the first gateway is a first frequency band, the frequency band of a downlink channel of the first gateway is a second frequency band, and the frequency band of a downlink channel of the second gateway is a first frequency band.

As shown in FIG. 17, the device 1700 includes one or more processor(s) 1702 or data processing unit(s) and memory 1704. The device 1700 may further include one or more input/output interface(s) 1706 and one or more network interface(s) 1708. The memory 1704 is an example of computer readable medium or media.

The memory 1704 may store therein a plurality of modules or units including:

a second uplink data transmitting module 1710, configured for the sensing terminal to transmit uplink data to the first gateway through an uplink channel at the first frequency band when a preset trigger event is detected or a preset time is reached, and then for the first gateway to transmit the uplink data to the server;

a third downlink data receiving module 1712, configured to receive downlink data of the second gateway from a downlink channel of which the frequency band is the first frequency band of the second gateway when the sensing terminal is an intra-frequency sensing terminal, wherein the downlink data is data transmitted by the server to the second gateway; and a fourth downlink data receiving module 1714, configured to receive downlink data of the first gateway from a downlink channel of which the frequency band is the second frequency band of the first gateway when the sensing terminal is an inter-frequency sensing terminal, wherein the downlink data is data transmitted by the server to the first gateway.

For example, the wireless network further includes an application terminal, wherein the application terminal is connected with the server, and then the downlink data is data generated by the server according to the uplink data, or the downlink data is data generated by the application terminal according to uplink data in the server.

For example, the third downlink data receiving module 1712 includes:

a second downlink channel establishment request receiving submodule, configured to receive a request for establishing a downlink channel of which the frequency band is the first frequency band from the second gateway;

a second downlink channel establishing submodule, configured to establish a downlink channel of which the frequency band is the first frequency band with the second gateway; and a second downlink data receiving submodule, configured to receive the downlink data through the downlink channel of which the frequency band is the first frequency band.

For example, the device 1700 may further include a gateway configuration module (not shown in FIG. 17) stored in the memory 1704, wherein the gateway configuration module includes:

a first frequency band determining submodule, configured to determine at least one first frequency band from the plurality of sub-bands, wherein the at least one first frequency band is a frequency band used by the first gateway to receive uplink data of the inter-frequency sensing terminal;

a second frequency band determining submodule, configured to determine at least one second frequency band from the plurality of sub-bands, wherein the at least one second frequency band is a frequency band used by the first gateway to receive uplink data of the intra-frequency sensing terminal and used by the second gateway to transmit downlink data to the intra-frequency sensing terminal;

a third frequency band determining submodule, configured to determine at least one third frequency band from the plurality of sub-bands, wherein the at least one third frequency band is a frequency band used by the second gateway to receive uplink data of the inter-frequency sensing terminal;

a fourth frequency band determining submodule, configured to determine at least one fourth frequency band from the plurality of sub-bands, wherein the at least one fourth frequency band is a frequency band used by the second gateway to receive uplink data of the intra-frequency sensing terminal and used by the first gateway to transmit downlink data to the intra-frequency sensing terminal; and a channel dividing submodule, configured to respectively divide the at least one first frequency band, the at least one second frequency band, the at least one third frequency band, and the at least one fourth frequency band into a plurality of channels according to a preset channel division rule.

For example, the first frequency band and the second frequency band are partially overlapped or completely overlapped, and the third frequency band and the fourth frequency band are partially overlapped or completely overlapped.

Figure 18:
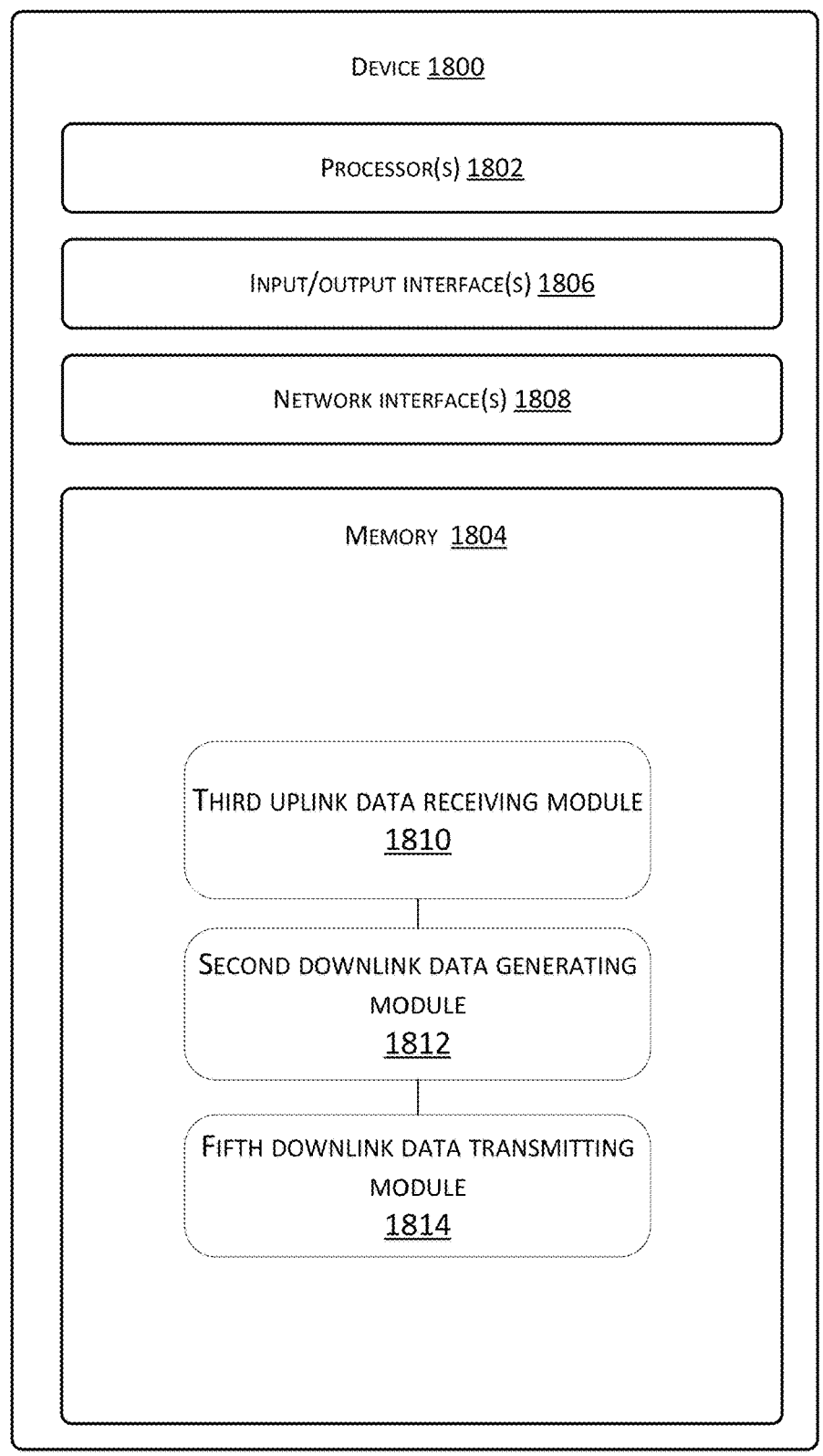
FIG. 18 is a structural block diagram of Example embodiment 7 of a wireless communication device according to the present disclosure.

Referring to FIG. 18, a structural block diagram of Example embodiment 7 of a wireless communication device according to the present disclosure is shown. The device is applied to a wireless network. The wireless network includes an intra-frequency sensing terminal, and a first gateway and a second gateway that are connected with a server, the frequency band of an uplink channel of the first gateway is a first frequency band, the frequency band of a downlink channel of the first gateway is a second frequency band, and the frequency band of a downlink channel of the second gateway is a first frequency band.

As shown in FIG. 18, the device 1800 includes one or more processor(s) 1802 or data processing unit(s) and memory 1804. The device 1800 may further include one or more input/output interface(s) 1806 and one or more network interface(s) 1808. The memory 1804 is an example of computer readable medium or media.

The memory 1804 may store therein a plurality of modules or units including:

a third uplink data receiving module 1810, configured to receive uplink data of the first gateway, wherein the uplink data is data transmitted by the intra-frequency sensing terminal through an uplink channel at the first frequency band;

a second downlink data generating module 1812, configured to generate downlink data according to the uplink data; and a fifth downlink data transmitting module 1814, configured to transmit the downlink data to the second gateway, wherein the second gateway is configured to transmit the downlink data to the intra-frequency sensing terminal through a downlink channel at the first frequency band.

For example, the wireless network further includes an application terminal, wherein the application terminal is connected with the server, and then the downlink data further includes data generated by the application terminal according to uplink data in the server.

For example, the device 1800 may further include a gateway configuration module (not shown in FIG. 18) stored in the memory 1804, wherein the gateway configuration module includes:

a communication frequency band obtaining submodule, configured to obtain a communication frequency band of the wireless network;

a frequency band dividing submodule, configured to divide the communication frequency band into a plurality of sub-bands;

a first frequency band determining submodule, configured to determine at least one first frequency band from the plurality of sub-bands, wherein the at least one first frequency band is a frequency band used by the first gateway to receive uplink data of the inter-frequency sensing terminal;

a second frequency band determining submodule, configured to determine at least one second frequency band from the plurality of sub-bands, wherein the at least one second frequency band is a frequency band used by the first gateway to receive uplink data of the intra-frequency sensing terminal and used by the second gateway to transmit downlink data to the intra-frequency sensing terminal;

a third frequency band determining submodule, configured to determine at least one third frequency band from the plurality of sub-bands, wherein the at least one third frequency band is a frequency band used by the second gateway to receive uplink data of the inter-frequency sensing terminal;

a fourth frequency band determining submodule, configured to determine at least one fourth frequency band from the plurality of sub-bands, wherein the at least one fourth frequency band is a frequency band used by the second gateway to receive uplink data of the intra-frequency sensing terminal and used by the first gateway to transmit downlink data to the intra-frequency sensing terminal; and a channel dividing submodule, configured to respectively divide the at least one first frequency band, the at least one second frequency band, the at least one third frequency band, and the at least one fourth frequency band into a plurality of channels according to a preset channel division rule.

For example, the first frequency band and the second frequency band are partially overlapped or completely overlapped, and the third frequency band and the fourth frequency band are partially overlapped or completely overlapped.

For example, the fifth downlink data transmitting module 1814 includes:

a second gateway determining submodule, configured to determine a second gateway having a communication distance covering the intra-frequency sensing terminal; and a third downlink data transmitting submodule, configured to transmit the downlink data to the second gateway, wherein the second gateway is configured to transmit the downlink data to the intra-frequency sensing terminal through a downlink channel of which the frequency band is the first frequency band.

Figure 19:
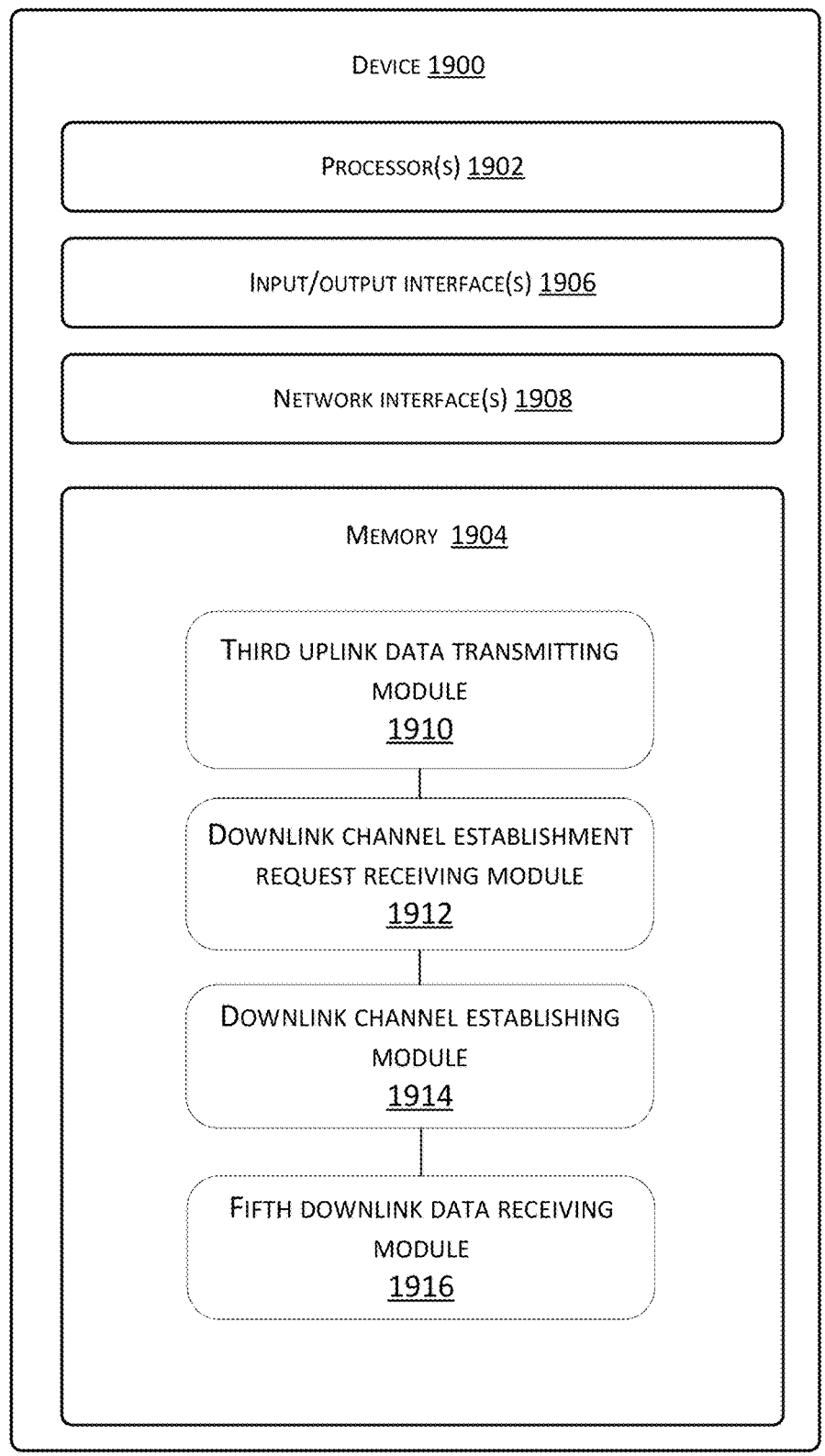
FIG. 19 is a structural block diagram of Example embodiment 8 of a wireless communication device according to the present disclosure.

Referring to FIG. 19, a structural block diagram of Example embodiment 8 of a wireless communication device according to the present disclosure is shown. The device is applied to a wireless network. The wireless network includes an intra-frequency sensing terminal, and a first gateway and a second gateway that are connected with a server, the frequency band of an uplink channel of the first gateway is a first frequency band, the frequency band of a downlink channel of the first gateway is a second frequency band, and the frequency band of a downlink channel of the second gateway is a first frequency band.

As shown in FIG. 19, the device 1900 includes one or more processor(s) 1902 or data processing unit(s) and memory 1904. The device 1900 may further include one or more input/output interface(s) 1906 and one or more network interface(s) 1908. The memory 1904 is an example of computer readable medium or media.

The memory 1904 may store therein a plurality of modules or units including:

a third uplink data transmitting module 1910, configured for the intra-frequency sensing terminal to transmit uplink data to the first gateway through an uplink channel at the first frequency band when a preset trigger event is detected or a preset time is reached, and then for the first gateway to transmit the uplink data to the server;

a downlink channel establishment request receiving module 1912, configured to receive a request for establishing a downlink channel of which the frequency band is the first frequency band from the second gateway;

a downlink channel establishing module 1914, configured to establish a downlink channel of which the frequency band is the first frequency band with the second gateway; and a fifth downlink data receiving module 1916, configured to receive the downlink data through the downlink channel of which the frequency band is the first frequency band.

For example, the wireless network further includes an application terminal, wherein the application terminal is connected with the server, and then the downlink data is data generated by the server according to the uplink data, or the downlink data is data generated by the application terminal according to uplink data in the server.

For example, the device further includes a gateway configuration module, wherein the gateway configuration module includes:

a communication frequency band obtaining submodule, configured to obtain a communication frequency band of the wireless network;

a frequency band dividing submodule, configured to divide the communication frequency band into a plurality of sub-bands;

a first frequency band determining submodule, configured to determine at least one first frequency band from the plurality of sub-bands, wherein the at least one first frequency band is a frequency band used by the first gateway to receive uplink data of the inter-frequency sensing terminal;

a second frequency band determining submodule, configured to determine at least one second frequency band from the plurality of sub-bands, wherein the at least one second frequency band is a frequency band used by the first gateway to receive uplink data of the intra-frequency sensing terminal and used by the second gateway to transmit downlink data to the intra-frequency sensing terminal;

a third frequency band determining submodule, configured to determine at least one third frequency band from the plurality of sub-bands, wherein the at least one third frequency band is a frequency band used by the second gateway to receive uplink data of the inter-frequency sensing terminal;

a fourth frequency band determining submodule, configured to determine at least one fourth frequency band from the plurality of sub-bands, wherein the at least one fourth frequency band is a frequency band used by the second gateway to receive uplink data of the intra-frequency sensing terminal and used by the first gateway to transmit downlink data to the intra-frequency sensing terminal; and a channel dividing submodule, configured to respectively divide the at least one first frequency band, the at least one second frequency band, the at least one third frequency band, and the at least one fourth frequency band into a plurality of channels according to a preset channel division rule.

For example, the first frequency band and the second frequency band are partially overlapped or completely overlapped, and the third frequency band and the fourth frequency band are partially overlapped or completely overlapped.

Figure 20:
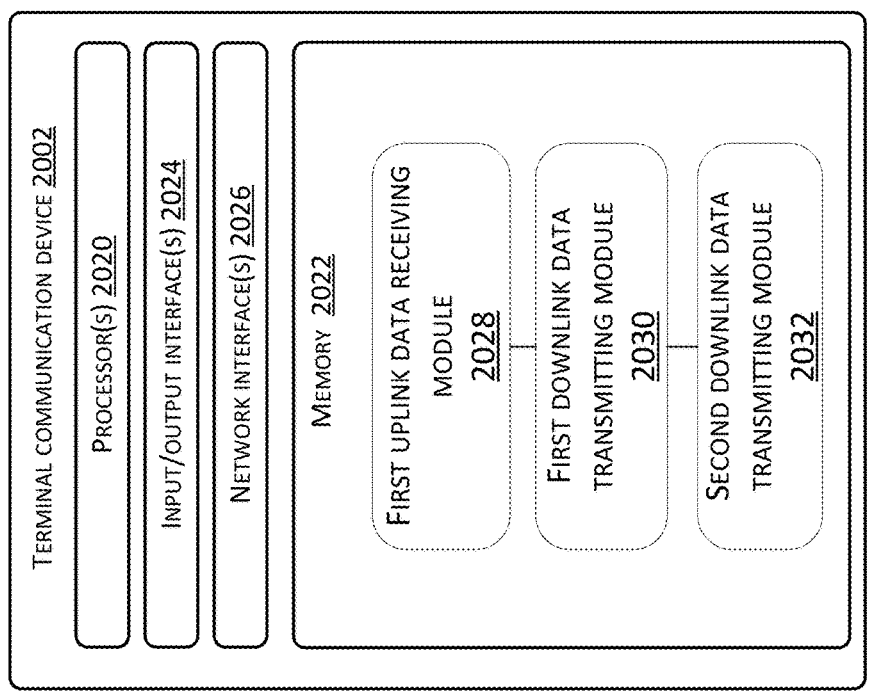
FIG. 20 is a structural block diagram of an example embodiment of a wireless communication system according to the present disclosure.

Referring to FIG. 20, a structural block diagram of an example embodiment of a wireless communication system according to the present disclosure is shown. The wireless communication system includes a terminal communication device 2002 and a node communication device 2004, wherein the terminal communication device 2002 includes a terminal, and the node communication device 2204 includes a first node and a second node, wherein the frequency band of an uplink channel of the first node is identical to the frequency band of a downlink channel of the second node, and the frequency band of the uplink channel of the first node is different from the frequency band of a downlink channel of the first node, The node communication device 2004 includes one or more processor(s) 2006 or data processing unit(s) and memory 2008. The node communication device 2004 may further include one or more input/output interface(s) 2010 and one or more network interface(s) 2012. The memory 2008 is an example of computer readable medium or media.

The memory 2008 may store therein a plurality of modules or units including:

a first uplink data receiving module 2014, configured to receive uplink data from the terminal through the uplink channel of the first node;

a first downlink data transmitting module 2016, configured to transmit downlink data to the terminal through the downlink channel of the second node when the terminal is an intra-frequency terminal; and a second downlink data transmitting module 2018, configured to transmit downlink data to the terminal through the downlink channel of the first node when the terminal is an inter-frequency terminal.

The terminal communication device 2002 includes one or more processor(s) 2020 or data processing unit(s) and memory 2022. The terminal communication device 2002 may further include one or more input/output interface(s) 2024 and one or more network interface(s) 2026. The memory 2022 is an example of computer readable medium or media.

The memory 2022 may store therein a plurality of modules or units including:

a first uplink data transmitting module 2028, configured for the terminal to transmit uplink data to the first node through the uplink channel of the first node when a preset trigger event is detected or a preset time is reached;

a first downlink data receiving module 2030, configured to receive downlink data from the downlink channel of the second node when the terminal is an intra-frequency terminal; and a second downlink data receiving module 2032, configured to receive downlink data from the downlink channel of the first node when the terminal is an inter-frequency terminal.

The example embodiments of the present disclosure provide a wireless communication device, including: one or more processors; and one or more machine-readable media having computer-readable instructions stored thereon, which, when executed by the one or more processors, cause the device to execute one or more methods according to the Example embodiment 1 and/or Example embodiment 2 and/or Example embodiment 3 and/or Example embodiment 4 and/or Example embodiment 5 and/or Example embodiment 6 and/or Example embodiment 7 and/or Example embodiment 8.

The example embodiments of the present disclosure further provide one or more machine-readable media having computer-readable instructions stored thereon, which, when executed by one or more processors, cause a device to execute one or more methods according to the Example embodiment 1 and/or Example embodiment 2 and/or Example embodiment 3 and/or Example embodiment 4 and/or Example embodiment 5 and/or Example embodiment 6 and/or Example embodiment 7 and/or Example embodiment 8.

For the device example embodiments, since they are basically similar to the method example embodiments, they are described in a brief way, and the relevant parts may be referred to the description of the method example embodiments.

The various example embodiments in the present disclosure are described in a progressive manner, and each example embodiment focuses on differences from other example embodiments, and the same and similar parts between the various example embodiments can be referred to each other.

Those skilled in the art should understand that the example embodiments of the present disclosure may be provided as a method, a device, or a computer program product. Accordingly, the example embodiments of the present disclosure may take the form of an entirely hardware example embodiment, an entirely software example embodiment, or an example embodiment combining software and hardware. Moreover, the example embodiments of the present disclosure may take the form of a computer program product implemented on one or more computer usable storage media (including, but not limited to, disk memories, CD-ROMs, optical memories, etc.) comprising computer usable program codes.

The example embodiments of the present disclosure are described with reference to the flowcharts and/or the block diagrams of the methods, terminal apparatus (systems), and computer program products according to the example embodiments of the present disclosure. It should be understood that each process and/or block in the flowcharts and/or block diagrams, and combinations of the processes and/or blocks in the flowcharts and/or the block diagrams, may be implemented by computer program or computer-readable instructions. These computer-readable instructions may be provided to a processor of a general-purpose computer, a special-purpose computer, an embedded processor, or other programmable data processing terminal apparatus to produce a machine such that instructions are executed by the processor of the computer or other programmable data processing terminal apparatus to generate a device for implementing the functions specified in one or more processes in the flowcharts and/or one or more blocks in the block diagrams.

These computer-readable instructions may also be stored in a computer readable memory that may direct a computer or other programmable data processing apparatus to function in a particular manner such that the instructions stored in the computer readable memory produce an article of manufacture including an instruction means which implements functions specified in one or more processes in the flowcharts and/or one or more blocks in the block diagrams.

These computer-readable instructions may also be loaded onto a computer or other programmable data processing terminal apparatus to cause a series of operating steps to be performed on the computer or other programmable apparatus to produce computer-implemented processing, and the instructions executed on a computer or other programmable terminal apparatus provide steps for implementing the functions specified in one or more processes in the flowcharts and/or one or more blocks in the block diagrams.

Although some example embodiments of the present disclosure have been described, those skilled in the art may make other changes and modifications to these example embodiments once they have acquired the basic inventive concept. Therefore, the appended claims are intended to be interpreted as including the example embodiments and all the changes and modifications that fall within the scope of the embodiments of the present disclosure.

At last, it further should be noted that, in this context, relational terms such as "first" and "second" are only used to distinguish an entity or an operation from another entity or operation without necessarily requiring or implying that there is any such actual relationship or sequence among such entities or operations. Moreover, the term "comprising," "including" or any of other variants thereof is intended to cover non-exclusive inclusions such that a process, method, article, or terminal apparatus that includes a series of elements not only includes those elements but also includes other elements that are listed explicitly, or also includes inherent elements of this process, method, item, or terminal apparatus. In the absence of more limitations, an element defined by the sentence "including a/an . . . " does not exclude that the process, method, article or apparatus including the element further has other identical elements.

A wireless communication method and a wireless communication device provided by the present disclosure have been described above in detail. Examples are used herein to describe the principle and implementations of the present disclosure. The above description of the example embodiments is only used to help understand the method of the present disclosure and its core concept. Moreover, for those skilled in the art, based on the concept of the present disclosure, there will be changes in the example embodiments and application scope. In summary, the content of the present disclosure should not be understood as limiting the present disclosure.

The present disclosure may further be understood with clauses as follows.

Clause 1. A wireless communication method applied to a wireless network, the wireless network comprising a terminal, a first node, and a second node, the frequency band of an uplink channel of the first node being identical to the frequency band of a downlink channel of the second node, the frequency band of the uplink channel of the first node being different from the frequency band of a downlink channel of the first node, wherein the method comprises:
receiving uplink data from the terminal through the uplink channel of the first node; and
when the terminal is an intra-frequency terminal, transmitting downlink data to the terminal through the downlink channel of the second node; or
when the terminal is an inter-frequency terminal, transmitting downlink data to the terminal through the downlink channel of the first node.

Clause 2. The method according to clause 1, wherein the downlink data is data generated by the first node according to the uplink data.

Clause 3. The method according to clause 1, wherein the wireless network further comprises an application terminal, and the downlink data is data generated by the application terminal according to uplink data received from the first node.

Clause 4. The method according to clause 1 or 2 or 3, wherein whether the terminal is an intra-frequency terminal or an inter-frequency terminal is determined by the following steps:
obtaining type information of the terminal from the uplink data or according to a terminal identifier reported by the terminal; and
when the type information indicates an intra-frequency terminal, determining that the terminal is an intra-frequency terminal; or
when the type information indicates an inter-frequency terminal, determining that the terminal is an inter-frequency terminal.

Clause 5. The method according to clause 1, wherein the uplink and downlink channels of the first node and the second node are configured as follows:
obtaining a communication frequency band of the wireless network;
dividing the communication frequency band into a plurality of sub-bands;
determining at least one first frequency band from the plurality of sub-bands, wherein the at least one first frequency band is a frequency band used by the first node to receive uplink data of the inter-frequency terminal;
determining at least one second frequency band from the plurality of sub-bands, wherein the at least one second frequency band is a frequency band used by the first node to receive uplink data of the intra-frequency terminal and used by the second node to transmit downlink data to the intra-frequency terminal;
determining at least one third frequency band from the plurality of sub-bands, wherein the at least one third frequency band is a frequency band used by the second node to receive uplink data of the inter-frequency terminal;
determining at least one fourth frequency band from the plurality of sub-bands, wherein the at least one fourth frequency band is a frequency band used by the second node to receive uplink data of the intra-frequency terminal and used by the first node to transmit downlink data to the intra-frequency terminal; and
respectively dividing the at least one first frequency band, the at least one second frequency band, the at least one third frequency band, and the at least one fourth frequency band into a plurality of channels according to a preset channel division rule.

Clause 6. The method according to clause 5, wherein the first frequency band and the second frequency band are partially overlapped or completely overlapped, and the third frequency band and the fourth frequency band are partially overlapped or completely overlapped.

Clause 7. The method according to clause 1, wherein the step of transmitting downlink data to the terminal through the downlink channel of the second node comprises:

determining a second node having a communication distance covering the intra-frequency terminal;

transmitting the downlink data to the second node; and transmitting, by the second node, downlink data to the terminal through a downlink channel.

Clause 8. A wireless communication method applied to a wireless network, the wireless network comprising a terminal, a first node, and a second node, the frequency band of an uplink channel of the first node being identical to the frequency band of a downlink channel of the second node, the frequency band of the uplink channel of the first node being different from the frequency band of a downlink channel of the first node, wherein the method comprises:

when a preset trigger event is detected or a preset time is reached, transmitting, by the terminal, uplink data to the first node through the uplink channel of the first node; and when the terminal is an intra-frequency terminal, receiving downlink data from the downlink channel of the second node; or when the terminal is an inter-frequency terminal, receiving downlink data from the downlink channel of the first node.

Clause 9. The method according to clause 8, wherein the downlink data is data generated by the first node according to the uplink data.

Clause 10. The method according to clause 8, wherein the wireless network further comprises an application terminal, and the downlink data is data generated by the application terminal according to uplink data received from the first node.

Clause 11. The method according to clause 8, wherein when the terminal is an intra-frequency terminal, the step of receiving downlink data from the downlink channel of the second node comprises:

receiving a request for establishing a downlink channel from the second node;

establishing a downlink channel with the second node; and receiving the downlink data through the downlink channel of the second node.

Clause 12. The method according to clause 8 or 9 or 10 or 11, wherein the uplink and downlink channels of the first node and the second node are configured as follows:

obtaining a communication frequency band of the wireless network;

dividing the communication frequency band into a plurality of sub-bands;

determining at least one first frequency band from the plurality of sub-bands, wherein the at least one first frequency band is a frequency band used by the first node to receive uplink data of the inter-frequency terminal;

determining at least one second frequency band from the plurality of sub-bands, wherein the at least one second frequency band is a frequency band used by the first node to receive uplink data of the intra-frequency terminal and used by the second node to transmit downlink data to the intra-frequency terminal;

determining at least one third frequency band from the plurality of sub-bands, wherein the at least one third frequency band is a frequency band used by the second node to receive uplink data of the inter-frequency terminal;

determining at least one fourth frequency band from the plurality of sub-bands, wherein the at least one fourth frequency band is a frequency band used by the second node to receive uplink data of the intra-frequency terminal and used by the first node to transmit downlink data to the intra-frequency terminal; and respectively dividing the at least one first frequency band, the at least one second frequency band, the at least one third frequency band, and the at least one fourth frequency band into a plurality of channels according to a preset channel division rule.

Clause 13. The method according to clause 12, wherein the first frequency band and the second frequency band are partially overlapped or completely overlapped, and the third frequency band and the fourth frequency band are partially overlapped or completely overlapped.

Clause 14. A wireless communication method applied to a wireless network, the wireless network comprising a terminal, a first node, and a second node, the frequency band of an uplink channel of the first node being identical to the frequency band of a downlink channel of the second node, the frequency band of the uplink channel of the first node being different from the frequency band of a downlink channel of the first node, wherein the method comprises:

receiving uplink data from the terminal through the uplink channel of the first node; and when the terminal is an intra-frequency terminal, transmitting downlink data to the terminal through the downlink channel of the second node.

Clause 15. A wireless communication method applied to a wireless network, the wireless network comprising a terminal, a first node, and a second node, the frequency band of an uplink channel of the first node being identical to the frequency band of a downlink channel of the second node, the frequency band of the uplink channel of the first node being different from the frequency band of a downlink channel of the first node, wherein the method comprises:

when a preset trigger event is detected or a preset time is reached, transmitting, by the terminal, uplink data to the first node through the uplink channel of the first node; and when the terminal is an intra-frequency terminal, receiving downlink data from the downlink channel of the second node.

Clause 16. A wireless communication method applied to a wireless network, the wireless network comprising a sensing terminal, and a first gateway and a second gateway that are connected with a server, the frequency band of an uplink channel of the first gateway being a first frequency band, the frequency band of a downlink channel of the first gateway being a second frequency band, the frequency band of a downlink channel of the second gateway being a first frequency band, wherein the method comprises:

receiving uplink data of the first gateway by the server, wherein the uplink data is data transmitted by the sensing terminal through an uplink channel at the first frequency band;

generating downlink data by the server according to the uplink data; and when the sensing terminal is an intra-frequency sensing terminal, transmitting the downlink data to the second gateway by the server, wherein the second gateway is configured to transmit the downlink data to the intra-frequency sensing terminal through a downlink channel at the first frequency band; or when the sensing terminal is an inter-frequency sensing terminal, transmitting the downlink data to the first gateway by the server, wherein the first gateway is configured to transmit the downlink data to the inter-frequency sensing terminal through the downlink channel at the second frequency band.

Clause 17. The method according to clause 16, wherein the wireless network further comprises an application terminal, the application terminal is connected with the server, and then the downlink data further comprises data generated by the application terminal according to the uplink data in the server.

Clause 18. The method according to clause 16, wherein whether the sensing terminal is an intra-frequency sensing terminal or an inter-frequency sensing terminal is determined by the following steps:

obtaining type information of the sensing terminal from the uplink data or according to a terminal identifier reported by the sensing terminal; and when the type information indicates an intra-frequency sensing terminal, determining that the sensing terminal is an intra-frequency sensing terminal; or when the type information indicates an inter-frequency sensing terminal, determining that the sensing terminal is an inter-frequency sensing terminal.

Clause 19. The method according to clause 16 or 17 or 18, wherein the uplink and downlink channels of the first gateway and the second gateway are configured as follows:

obtaining a communication frequency band of the wireless network;

dividing the communication frequency band into a plurality of sub-bands;

determining at least one first frequency band from the plurality of sub-bands, wherein the at least one first frequency band is a frequency band used by the first gateway to receive uplink data of the inter-frequency sensing terminal;

determining at least one second frequency band from the plurality of sub-bands, wherein the at least one second frequency band is a frequency band used by the first gateway to receive uplink data of the intra-frequency sensing terminal and used by the second gateway to transmit downlink data to the intra-frequency sensing terminal;

determining at least one third frequency band from the plurality of sub-bands, wherein the at least one third frequency band is a frequency band used by the second gateway to receive uplink data of the inter-frequency sensing terminal;

determining at least one fourth frequency band from the plurality of sub-bands, wherein the at least one fourth frequency band is a frequency band used by the second gateway to receive uplink data of the intra-frequency sensing terminal and used by the first gateway to transmit downlink data to the intra-frequency sensing terminal; and respectively dividing the at least one first frequency band, the at least one second frequency band, the at least one third frequency band, and the at least one fourth frequency band into a plurality of channels according to a preset channel division rule.

Clause 20. The method according to clause 19, wherein the first frequency band and the second frequency band are partially overlapped or completely overlapped, and the third frequency band and the fourth frequency band are partially overlapped or completely overlapped.

Clause 21. The method according to clause 16, wherein when the sensing terminal is an intra-frequency sensing terminal, the step of transmitting the downlink data to the second gateway by the server comprises:

determining a second gateway having a communication distance covering the intra-frequency sensing terminal; and transmitting the downlink data to the second gateway, wherein the second gateway is configured to transmit the downlink data to the intra-frequency sensing terminal through a downlink channel of which the frequency band is the first frequency band.

Clause 22. A wireless communication method applied to a wireless network, the wireless network comprising a sensing terminal, and a first gateway and a second gateway that are connected with a server, the frequency band of an uplink channel of the first gateway being a first frequency band, the frequency band of a downlink channel of the first gateway being a second frequency band, the frequency band of a downlink channel of the second gateway being a first frequency band, wherein the method comprises:

when a preset trigger event is detected or a preset time is reached, transmitting, by the sensing terminal, uplink data to the first gateway through an uplink channel at the first frequency band; and transmitting the uplink data to the server by the first gateway; and when the sensing terminal is an intra-frequency sensing terminal, receiving downlink data of the second gateway from a downlink channel of which the frequency band is the first frequency band of the second gateway, wherein the downlink data is data transmitted by the server to the second gateway; or when the sensing terminal is an inter-frequency sensing terminal, receiving downlink data of the first gateway from a downlink channel of which the frequency band is the second frequency band of the first gateway, wherein the downlink data is data transmitted by the server to the first gateway.

Clause 23. The method according to clause 22, wherein the wireless network further comprises an application terminal, the application terminal is connected with the server, and then the downlink data is data generated by the server according to the uplink data, or the downlink data is data generated by the application terminal according to the uplink data in the server.

Clause 24. The method according to clause 22, wherein when the sensing terminal is an intra-frequency sensing terminal, the step of receiving downlink data of the second gateway from a downlink channel of which the frequency band is the first frequency band of the second gateway comprises:

receiving a request for establishing a downlink channel of which the frequency band is the first frequency band from the second gateway;

establishing a downlink channel of which the frequency band is the first frequency band with the second gateway; and receiving the downlink data through the downlink channel of which the frequency band is the first frequency band.

Clause 25. The method according to clause 22 or 23 or 24, wherein the uplink and downlink channels of the first gateway and the second gateway are configured as follows:

obtaining a communication frequency band of the wireless network;

dividing the communication frequency band into a plurality of sub-bands;

determining at least one first frequency band from the plurality of sub-bands, wherein the at least one first frequency band is a frequency band used by the first gateway to receive uplink data of the inter-frequency sensing terminal;

determining at least one second frequency band from the plurality of sub-bands, wherein the at least one second frequency band is a frequency band used by the first gateway to receive uplink data of the intra-frequency sensing terminal and used by the second gateway to transmit downlink data to the intra-frequency sensing terminal;

determining at least one third frequency band from the plurality of sub-bands, wherein the at least one third frequency band is a frequency band used by the second gateway to receive uplink data of the inter-frequency sensing terminal;

determining at least one fourth frequency band from the plurality of sub-bands, wherein the at least one fourth frequency band is a frequency band used by the second gateway to receive uplink data of the intra-frequency sensing terminal and used by the first gateway to transmit downlink data to the intra-frequency sensing terminal; and respectively dividing the at least one first frequency band, the at least one second frequency band, the at least one third frequency band, and the at least one fourth frequency band into a plurality of channels according to a preset channel division rule.

Clause 26. The method according to clause 25, wherein the first frequency band and the second frequency band are partially overlapped or completely overlapped, and the third frequency band and the fourth frequency band are partially overlapped or completely overlapped.

Clause 27. A wireless communication method applied to a wireless network, the wireless network comprising an intra-frequency sensing terminal, a first gateway and a second gateway that are connected with a server, and an application terminal, the frequency band of an uplink channel of the first gateway being a first frequency band, the frequency band of a downlink channel of the second gateway being a first frequency band, wherein the method comprises:

receiving uplink data of the first gateway by the server, wherein the uplink data is data transmitted by the intra-frequency sensing terminal through an uplink channel at the first frequency band;

generating downlink data by the server according to the uplink data; and transmitting the downlink data to the second gateway by the server, wherein the second gateway is configured to transmit the downlink data to the intra-frequency sensing terminal through a downlink channel at the first frequency band.

Clause 28. The method according to clause 27, wherein the wireless network further comprises an application terminal, the application terminal is connected with the server, and then the downlink data further comprises data generated by the application terminal according to the uplink data in the server.

Clause 29. The method according to clause 27 or 28, wherein the uplink and downlink channels of the first gateway and the second gateway are configured as follows:

obtaining a communication frequency band of the wireless network;

dividing the communication frequency band into a plurality of sub-bands;

determining at least one first frequency band from the plurality of sub-bands, wherein the at least one first frequency band is a frequency band used by the first gateway to receive uplink data of an inter-frequency sensing terminal;

determining at least one second frequency band from the plurality of sub-bands, wherein the at least one second frequency band is a frequency band used by the first gateway to receive uplink data of the intra-frequency sensing terminal and used by the second gateway to transmit downlink data to the intra-frequency sensing terminal;

determining at least one third frequency band from the plurality of sub-bands, wherein the at least one third frequency band is a frequency band used by the second gateway to receive uplink data of the inter-frequency sensing terminal;

determining at least one fourth frequency band from the plurality of sub-bands, wherein the at least one fourth frequency band is a frequency band used by the second gateway to receive uplink data of the intra-frequency sensing terminal and used by the first gateway to transmit downlink data to the intra-frequency sensing terminal; and respectively dividing the at least one first frequency band, the at least one second frequency band, the at least one third frequency band, and the at least one fourth frequency band into a plurality of channels according to a preset channel division rule.

Clause 30. The method according to clause 29, wherein the first frequency band and the second frequency band are partially overlapped or completely overlapped, and the third frequency band and the fourth frequency band are partially overlapped or completely overlapped.

Clause 31. The method according to clause 27, wherein the step of transmitting the downlink data to the second gateway by the server comprises:

determining a second gateway having a communication distance covering the intra-frequency sensing terminal; and transmitting the downlink data to the second gateway, wherein the second gateway is configured to transmit the downlink data to the intra-frequency sensing terminal through a downlink channel of which the frequency band is the first frequency band.

Clause 32. A wireless communication method applied to a wireless network, the wireless network comprising an intra-frequency sensing terminal, and a first gateway and a second gateway that are connected with a server, the frequency band of an uplink channel of the first gateway being a first frequency band, the frequency band of a downlink channel of the second gateway being a first frequency band, wherein the method comprises:

when a preset trigger event is detected or a preset time is reached, transmitting, by the intra-frequency sensing terminal, uplink data to the first gateway through an uplink channel at the first frequency band; and transmitting the uplink data to the server by the first gateway;

receiving a request for establishing a downlink channel of which the frequency band is the first frequency band from the second gateway;

establishing a downlink channel of which the frequency band is the first frequency band with the second gateway; and receiving the downlink data through the downlink channel of which the frequency band is the first frequency band.

Clause 33. The method according to clause 32, wherein the wireless network further comprises an application terminal, the application terminal is connected with the server, and then the downlink data is data generated by the server according to the uplink data, or the downlink data is data generated by the application terminal according to the uplink data in the server.

Clause 34. The method according to clause 32 or 33, wherein the uplink and downlink channels of the first gateway and the second gateway are configured as follows:

obtaining a communication frequency band of the wireless network;

dividing the communication frequency band into a plurality of sub-bands;

determining at least one first frequency band from the plurality of sub-bands, wherein the at least one first frequency band is a frequency band used by the first gateway to receive uplink data of an inter-frequency sensing terminal;

determining at least one second frequency band from the plurality of sub-bands, wherein the at least one second frequency band is a frequency band used by the first gateway to receive uplink data of the intra-frequency sensing terminal and used by the second gateway to transmit downlink data to the intra-frequency sensing terminal;

determining at least one third frequency band from the plurality of sub-bands, wherein the at least one third frequency band is a frequency band used by the second gateway to receive uplink data of the inter-frequency sensing terminal;

determining at least one fourth frequency band from the plurality of sub-bands, wherein the at least one fourth frequency band is a frequency band used by the second gateway to receive uplink data of the intra-frequency sensing terminal and used by the first gateway to transmit downlink data to the intra-frequency sensing terminal; and respectively dividing the at least one first frequency band, the at least one second frequency band, the at least one third frequency band, and the at least one fourth frequency band into a plurality of channels according to a preset channel division rule.

Clause 35. The method according to clause 34, wherein the first frequency band and the second frequency band are partially overlapped or completely overlapped, and the third frequency band and the fourth frequency band are partially overlapped or completely overlapped.

Clause 36. A wireless communication device applied to a wireless network, the wireless network comprising a terminal, a first node, and a second node, the frequency band of an uplink channel of the first node being identical to the frequency band of a downlink channel of the second node, the frequency band of the uplink channel of the first node being different from the frequency band of a downlink channel of the first node, wherein the device comprises:

a first uplink data receiving module, configured to receive uplink data from the terminal through the uplink channel of the first node;

a first downlink data transmitting module, configured to transmit downlink data to the terminal through the downlink channel of the second node when the terminal is an intra-frequency terminal; and a second downlink data transmitting module, configured to transmit downlink data to the terminal through the downlink channel of the first node when the terminal is an inter-frequency terminal.

Clause 37. The device according to clause 36, wherein the downlink data is data generated by the first node according to the uplink data.

Clause 38. The device according to clause 37, wherein the wireless network further comprises an application terminal, and the downlink data is data generated by the application terminal according to uplink data received from the first node.

Clause 39. The device according to clause 36 or 37 or 38, further comprising:

a first type information obtaining module, configured to obtain type information of the terminal from the uplink data or according to a terminal identifier reported by the terminal;

a first type determining module, configured to determine that the terminal is an intra-frequency terminal when the type information indicates an intra-frequency terminal; and a second type determining module, configured to determine that the terminal is an inter-frequency terminal when the type information indicates an inter-frequency terminal.

Clause 40. The device according to clause 36, further comprising a node configuration module, wherein the node configuration module comprises:

a communication frequency band obtaining submodule, configured to obtain a communication frequency band of the wireless network;

a frequency band dividing submodule, configured to divide the communication frequency band into a plurality of sub-bands;

a first frequency band determining submodule, configured to determine at least one first frequency band from the plurality of sub-bands, wherein the at least one first frequency band is a frequency band used by the first node to receive uplink data of the inter-frequency terminal;

a second frequency band determining submodule, configured to determine at least one second frequency band from the plurality of sub-bands, wherein the at least one second frequency band is a frequency band used by the first node to receive uplink data of the intra-frequency terminal and used by the second node to transmit downlink data to the intra-frequency terminal;

a third frequency band determining submodule, configured to determine at least one third frequency band from the plurality of sub-bands, wherein the at least one third frequency band is a frequency band used by the second node to receive uplink data of the inter-frequency terminal;

a fourth frequency band determining submodule, configured to determine at least one fourth frequency band from the plurality of sub-bands, wherein the at least one fourth frequency band is a frequency band used by the second node to receive uplink data of the intra-frequency terminal and used by the first node to transmit downlink data to the intra-frequency terminal; and a channel dividing submodule, configured to respectively divide the at least one first frequency band, the at least one second frequency band, the at least one third frequency band, and the at least one fourth frequency band into a plurality of channels according to a preset channel division rule.

Clause 41. The device according to clause 40, wherein the first frequency band and the second frequency band are partially overlapped or completely overlapped, and the third frequency band and the fourth frequency band are partially overlapped or completely overlapped.

Clause 42. The device according to clause 36, wherein the first downlink data transmitting module comprises:

a second node determining submodule, configured to determine a second node having a communication distance covering the intra-frequency terminal;

a first downlink data transmitting submodule, configured to transmit the downlink data to the second node; and a second downlink data transmitting submodule, configured for the second node to transmit downlink data to the terminal through a downlink channel.

Clause 43. A wireless communication device applied to a wireless network, the wireless network comprising a terminal, a first node, and a second node, the frequency band of an uplink channel of the first node being identical to the frequency band of a downlink channel of the second node, the frequency band of the uplink channel of the first node being different from the frequency band of a downlink channel of the first node, wherein the device comprises:

a first uplink data transmitting module, configured for the terminal to transmit uplink data to the first node through the uplink channel of the first node when a preset trigger event is detected or a preset time is reached;

a first downlink data receiving module, configured to receive downlink data from the downlink channel of the second node when the terminal is an intra-frequency terminal; and a second downlink data receiving module, configured to receive downlink data from the downlink channel of the first node when the terminal is an inter-frequency terminal.

Clause 44. The device according to clause 43, wherein the downlink data is data generated by the first node according to the uplink data.

Clause 45. The device according to clause 43, wherein the wireless network further comprises an application terminal, and the downlink data is data generated by the application terminal according to uplink data received from the first node.

Clause 46. The device according to clause 43, wherein the first downlink data receiving module comprises:

a first downlink channel establishment request receiving submodule, configured to receive a request for establishing a downlink channel from the second node;

a first downlink channel establishing submodule, configured to establish a downlink channel with the second node; and a first downlink data receiving submodule, configured to receive the downlink data through the downlink channel of the second node.

Clause 47. The device according to clause 43 or 44 or 45 or 46, further comprising a node configuration module, wherein the node configuration module comprises:

a communication frequency band obtaining submodule, configured to obtain a communication frequency band of the wireless network;

a frequency band dividing submodule, configured to divide the communication frequency band into a plurality of sub-bands;

a first frequency band determining submodule, configured to determine at least one first frequency band from the plurality of sub-bands, wherein the at least one first frequency band is a frequency band used by the first node to receive uplink data of the inter-frequency terminal;

a second frequency band determining submodule, configured to determine at least one second frequency band from the plurality of sub-bands, wherein the at least one second frequency band is a frequency band used by the first node to receive uplink data of the intra-frequency terminal and used by the second node to transmit downlink data to the intra-frequency terminal;

a third frequency band determining submodule, configured to determine at least one third frequency band from the plurality of sub-bands, wherein the at least one third frequency band is a frequency band used by the second node to receive uplink data of the inter-frequency terminal;

a fourth frequency band determining submodule, configured to determine at least one fourth frequency band from the plurality of sub-bands, wherein the at least one fourth frequency band is a frequency band used by the second node to receive uplink data of the intra-frequency terminal and used by the first node to transmit downlink data to the intra-frequency terminal; and a channel dividing submodule, configured to respectively divide the at least one first frequency band, the at least one second frequency band, the at least one third frequency band, and the at least one fourth frequency band into a plurality of channels according to a preset channel division rule.

Clause 48. The device according to clause 47, wherein the first frequency band and the second frequency band are partially overlapped or completely overlapped, and the third frequency band and the fourth frequency band are partially overlapped or completely overlapped.

Clause 49. A wireless communication device applied to a wireless network, the wireless network comprising a terminal, a first node, and a second node, the frequency band of an uplink channel of the first node being identical to the frequency band of a downlink channel of the second node, the frequency band of the uplink channel of the first node being different from the frequency band of a downlink channel of the first node, wherein the device comprises:

a first uplink data receiving module, configured to receive uplink data from the terminal through the uplink channel of the first node; and a first downlink data transmitting module, configured to transmit downlink data to the terminal through the downlink channel of the second node when the terminal is an intra-frequency terminal.

Clause 50. A wireless communication device applied to a wireless network, the wireless network comprising a terminal, a first node, and a second node, the frequency band of an uplink channel of the first node being identical to the frequency band of a downlink channel of the second node, the frequency band of the uplink channel of the first node being different from the frequency band of a downlink channel of the first node, wherein the device comprises:

a first uplink data transmitting module, configured for the terminal to transmit uplink data to the first node through the uplink channel of the first node when a preset trigger event is detected or a preset time is reached; and a first downlink data receiving module, configured to receive downlink data from the downlink channel of the second node when the terminal is an intra-frequency terminal.

Clause 51. A wireless communication device applied to a wireless network, the wireless network comprising a sensing terminal, and a first gateway and a second gateway that are connected with a server, the frequency band of an uplink channel of the first gateway being a first frequency band, the frequency band of a downlink channel of the first gateway being a second frequency band, the frequency band of a downlink channel of the second gateway being a first frequency band, wherein the device comprises:

a second uplink data receiving module, configured to receive uplink data of the first gateway, wherein the uplink data is data transmitted by the sensing terminal through an uplink channel at the first frequency band;

a first downlink data generating module, configured to generate the downlink data according to the uplink data;

a third downlink data transmitting module, configured for the server to transmit the downlink data to the second gateway when the sensing terminal is an intra-frequency sensing terminal, wherein the second gateway is configured to transmit the downlink data to the intra-frequency sensing terminal through a downlink channel at the first frequency band; and a fourth downlink data transmitting module, configured for the server to transmit the downlink data to the first gateway when the sensing terminal is an inter-frequency sensing terminal, wherein the first gateway is configured to transmit the downlink data to the inter-frequency sensing terminal through a downlink channel at the second frequency band.

Clause 52. The device according to clause 51, wherein the wireless network further comprises an application terminal, the application terminal is connected with the server, and then the downlink data further comprises data generated by the application terminal according to the uplink data in the server.

Clause 53. The device according to clause 51, further comprising:

a second type information obtaining module, configured to obtain type information of the sensing terminal from the uplink data or according to a terminal identifier reported by the sensing terminal;

a third type determining module, configured to determine that the sensing terminal is an intra-frequency sensing terminal when the type information indicates an intra-frequency sensing terminal; and a fourth type determining module, configured to determine that the sensing terminal is an inter-frequency sensing terminal when the type information indicates an inter-frequency sensing terminal.

Clause 54. The device according to clause 51 or 52 or 53, further comprising a gateway configuration module, wherein the gateway configuration module comprises:

a communication frequency band obtaining submodule, configured to obtain a communication frequency band of the wireless network;

a frequency band dividing submodule, configured to divide the communication frequency band into a plurality of sub-bands;

a first frequency band determining submodule, configured to determine at least one first frequency band from the plurality of sub-bands, wherein the at least one first frequency band is a frequency band used by the first gateway to receive uplink data of the inter-frequency sensing terminal;

a second frequency band determining submodule, configured to determine at least one second frequency band from the plurality of sub-bands, wherein the at least one second frequency band is a frequency band used by the first gateway to receive uplink data of the intra-frequency sensing terminal and used by the second gateway to transmit downlink data to the intra-frequency sensing terminal;

a third frequency band determining submodule, configured to determine at least one third frequency band from the plurality of sub-bands, wherein the at least one third frequency band is a frequency band used by the second gateway to receive uplink data of the inter-frequency sensing terminal;

a fourth frequency band determining submodule, configured to determine at least one fourth frequency band from the plurality of sub-bands, wherein the at least one fourth frequency band is a frequency band used by the second gateway to receive uplink data of the intra-frequency sensing terminal and used by the first gateway to transmit downlink data to the intra-frequency sensing terminal; and a channel dividing submodule, configured to respectively divide the at least one first frequency band, the at least one second frequency band, the at least one third frequency band, and the at least one fourth frequency band into a plurality of channels according to a preset channel division rule.

Clause 55. The device according to clause 54, wherein the first frequency band and the second frequency band are partially overlapped or completely overlapped, and the third frequency band and the fourth frequency band are partially overlapped or completely overlapped.

Clause 56. The device according to clause 51, wherein the first downlink data transmitting module comprises:

a second gateway determining submodule, configured to determine a second gateway having a communication distance covering the intra-frequency sensing terminal; and a third downlink data transmitting submodule, configured to transmit the downlink data to the second gateway, wherein the second gateway is configured to transmit the downlink data to the intra-frequency sensing terminal through a downlink channel of which the frequency band is the first frequency band.

Clause 57. A wireless communication device applied to a wireless network, the wireless network comprising a sensing terminal, and a first gateway and a second gateway that are connected with a server, the frequency band of an uplink channel of the first gateway being a first frequency band, the frequency band of a downlink channel of the first gateway being a second frequency band, the frequency band of a downlink channel of the second gateway being a first frequency band, wherein the device comprises:

a second uplink data transmitting module, configured for the sensing terminal to transmit uplink data to the first gateway through an uplink channel at the first frequency band when a preset trigger event is detected or a preset time is reached, and for the server to transmit the uplink data to the server;

a third downlink data receiving module, configured to receive downlink data of the second gateway from a downlink channel of which the frequency band is the first frequency band of the second gateway when the sensing terminal is an intra-frequency sensing terminal, wherein the downlink data is data transmitted by the server to the second gateway; and a fourth downlink data receiving module, configured to receive downlink data of the first gateway from a downlink channel of which the frequency band is the second frequency band of the first gateway when the sensing terminal is an inter-frequency sensing terminal, wherein the downlink data is data transmitted by the server to the first gateway.

Clause 58. The device according to clause 57, wherein the wireless network further comprises an application terminal, the application terminal is connected with the server, and then the downlink data is data generated by the server according to the uplink data, or the downlink data is data generated by the application terminal according to the uplink data in the server.

Clause 59. The device according to clause 57, wherein the third downlink data receiving module comprises:

a second downlink channel establishment request receiving submodule, configured to receive a request for establishing a downlink channel of which the frequency band is the first frequency band from the second gateway;

a second downlink channel establishing submodule, configured to establish a downlink channel of which the frequency band is the first frequency band with the second gateway; and a second downlink data receiving submodule, configured to receive the downlink data through the downlink channel of which the frequency band is the first frequency band.

Clause 60. The device according to clause 57 or 58 or 59, further comprising a gateway configuration module, wherein the gateway configuration module comprises:

a communication frequency band obtaining submodule, configured to obtain a communication frequency band of the wireless network;

a frequency band dividing submodule, configured to divide the communication frequency band into a plurality of sub-bands;

a first frequency band determining submodule, configured to determine at least one first frequency band from the plurality of sub-bands, wherein the at least one first frequency band is a frequency band used by the first gateway to receive uplink data of the inter-frequency sensing terminal;

a second frequency band determining submodule, configured to determine at least one second frequency band from the plurality of sub-bands, wherein the at least one second frequency band is a frequency band used by the first gateway to receive uplink data of the intra-frequency sensing terminal and used by the second gateway to transmit downlink data to the intra-frequency sensing terminal;

a third frequency band determining submodule, configured to determine at least one third frequency band from the plurality of sub-bands, wherein the at least one third frequency band is a frequency band used by the second gateway to receive uplink data of the inter-frequency sensing terminal;

a fourth frequency band determining submodule, configured to determine at least one fourth frequency band from the plurality of sub-bands, wherein the at least one fourth frequency band is a frequency band used by the second gateway to receive uplink data of the intra-frequency sensing terminal and used by the first gateway to transmit downlink data to the intra-frequency sensing terminal; and a channel dividing submodule, configured to respectively divide the at least one first frequency band, the at least one second frequency band, the at least one third frequency band, and the at least one fourth frequency band into a plurality of channels according to a preset channel division rule.

Clause 61. The device according to clause 60, wherein the first frequency band and the second frequency band are partially overlapped or completely overlapped, and the third frequency band and the fourth frequency band are partially overlapped or completely overlapped.

Clause 62. A wireless communication device applied to a wireless network, the wireless network comprising an intra-frequency sensing terminal, and a first gateway and a second gateway that are connected with a server, the frequency band of an uplink channel of the first gateway being a first frequency band, the frequency band of a downlink channel of the second gateway being a first frequency band, wherein the device comprises:

a third uplink data receiving module, configured to receive uplink data of the first gateway, wherein the uplink data is data transmitted by the intra-frequency sensing terminal through an uplink channel at the first frequency band;

a second downlink data generating module, configured to generate downlink data according to the uplink data; and a fifth downlink data transmitting module, configured to transmit the downlink data to the second gateway, wherein the second gateway is configured to transmit the downlink data to the intra-frequency sensing terminal through a downlink channel at the first frequency band.

Clause 63. The device according to clause 62, wherein the wireless network further comprises an application terminal, the application terminal is connected with the server, and then the downlink data further comprises data generated by the application terminal according to the uplink data in the server.

Clause 64. The device according to clause 62 or 63, further comprising a gateway configuration module, wherein the gateway configuration module comprises:

a communication frequency band obtaining submodule, configured to obtain a communication frequency band of the wireless network;

a frequency band dividing submodule, configured to divide the communication frequency band into a plurality of sub-bands;

a first frequency band determining submodule, configured to determine at least one first frequency band from the plurality of sub-bands, wherein the at least one first frequency band is a frequency band used by the first gateway to receive uplink data of an inter-frequency sensing terminal;

a second frequency band determining submodule, configured to determine at least one second frequency band from the plurality of sub-bands, wherein the at least one second frequency band is a frequency band used by the first gateway to receive uplink data of the intra-frequency sensing terminal and used by the second gateway to transmit downlink data to the intra-frequency sensing terminal;

a third frequency band determining submodule, configured to determine at least one third frequency band from the plurality of sub-bands, wherein the at least one third frequency band is a frequency band used by the second gateway to receive uplink data of the inter-frequency sensing terminal;

a fourth frequency band determining submodule, configured to determine at least one fourth frequency band from the plurality of sub-bands, wherein the at least one fourth frequency band is a frequency band used by the second gateway to receive uplink data of the intra-frequency sensing terminal and used by the first gateway to transmit downlink data to the intra-frequency sensing terminal; and a channel dividing submodule, configured to respectively divide the at least one first frequency band, the at least one second frequency band, the at least one third frequency band, and the at least one fourth frequency band into a plurality of channels according to a preset channel division rule.

Clause 65. The device according to clause 64, wherein the first frequency band and the second frequency band are partially overlapped or completely overlapped, and the third frequency band and the fourth frequency band are partially overlapped or completely overlapped.

Clause 66. The device according to clause 62, wherein the fifth downlink data transmitting module comprises:

a second gateway determining submodule, configured to determine a second gateway having a communication distance covering the intra-frequency sensing terminal; and a third downlink data transmitting submodule, configured to transmit the downlink data to the second gateway, wherein the second gateway is configured to transmit the downlink data to the intra-frequency sensing terminal through a downlink channel of which the frequency band is the first frequency band.

Clause 67. A wireless communication device applied to a wireless network, the wireless network comprising an intra-frequency sensing terminal, a first gateway and a second gateway that are connected with a server, and an application terminal, the frequency band of an uplink channel of the first gateway being a first frequency band, the frequency band of a downlink channel of the second gateway being a first frequency band, wherein the device comprises:

a third uplink data transmitting module, configured for the intra-frequency sensing terminal to transmit uplink data to the first gateway through an uplink channel at the first frequency band when a preset trigger event is detected or a preset time is reached, and then for the first gateway to transmit the uplink data to the server;

a downlink channel establishment request receiving module, configured to receive a request for establishing a downlink channel of which the frequency band is the first frequency band from the second gateway;

a downlink channel establishing module, configured to establish a downlink channel of which the frequency band is the first frequency band with the second gateway; and a fifth downlink data receiving module, configured to receive the downlink data through the downlink channel of which the frequency band is the first frequency band.

Clause 68. The device according to clause 67, wherein the wireless network further comprises an application terminal, the application terminal is connected with the server, and then the downlink data is data generated by the server according to the uplink data, or the downlink data is data generated by the application terminal according to the uplink data in the server.

Clause 69. The device according to clause 67 or 68, further comprising a gateway configuration module, wherein the gateway configuration module comprises:

a communication frequency band obtaining submodule, configured to obtain a communication frequency band of the wireless network;

a frequency band dividing submodule, configured to divide the communication frequency band into a plurality of sub-bands;

a first frequency band determining submodule, configured to determine at least one first frequency band from the plurality of sub-bands, wherein the at least one first frequency band is a frequency band used by the first gateway to receive uplink data of an inter-frequency sensing terminal;

a second frequency band determining submodule, configured to determine at least one second frequency band from the plurality of sub-bands, wherein the at least one second frequency band is a frequency band used by the first gateway to receive uplink data of the intra-frequency sensing terminal and used by the second gateway to transmit downlink data to the intra-frequency sensing terminal;

a third frequency band determining submodule, configured to determine at least one third frequency band from the plurality of sub-bands, wherein the at least one third frequency band is a frequency band used by the second gateway to receive uplink data of the inter-frequency sensing terminal;

a fourth frequency band determining submodule, configured to determine at least one fourth frequency band from the plurality of sub-bands, wherein the at least one fourth frequency band is a frequency band used by the second gateway to receive uplink data of the intra-frequency sensing terminal and used by the first gateway to transmit downlink data to the intra-frequency sensing terminal; and a channel dividing submodule, configured to respectively divide the at least one first frequency band, the at least one second frequency band, the at least one third frequency band, and the at least one fourth frequency band into a plurality of channels according to a preset channel division rule.

Clause 70. The device according to clause 69, wherein the first frequency band and the second frequency band are partially overlapped or completely overlapped, and the third frequency band and the fourth frequency band are partially overlapped or completely overlapped.

Clause 71. A wireless communication system, comprising a terminal communication device and a node communication device, wherein the terminal communication device comprises a terminal, and the node communication device comprises a first node and a second node, wherein the frequency band of an uplink channel of the first node is identical to the frequency band of a downlink channel of the second node, and the frequency band of the uplink channel of the first node is different from the frequency band of a downlink channel of the first node, the node communication device comprises:

a first uplink data receiving module, configured to receive uplink data from the terminal through the uplink channel of the first node;

a first downlink data transmitting module, configured to transmit downlink data to the terminal through the downlink channel of the second node when the terminal is an intra-frequency terminal; and a second downlink data transmitting module, configured to transmit downlink data to the terminal through the downlink channel of the first node when the terminal is an inter-frequency terminal;

the terminal communication device comprises:

a first uplink data transmitting module, configured for the terminal to transmit uplink data to the first node through the uplink channel of the first node when a preset trigger event is detected or a preset time is reached;

a first downlink data receiving module, configured to receive downlink data from the downlink channel of the second node when the terminal is an intra-frequency terminal; and a second downlink data receiving module, configured to receive downlink data from the downlink channel of the first node when the terminal is an inter-frequency terminal.

Clause 72. A wireless communication device, comprising one or more processors; and one or more machine-readable media having instructions stored thereon, which, when executed by the one or more processors, cause the device to execute one or more of the methods according to clauses 1-7 and/or 8-13 and/or 14 and/or 15 and/or 16-21 and/or 22-26 and/or 27-31 and/or 32-35.

Clause 73. One or more machine-readable media having instructions stored thereon, which, when executed by one or more processors, cause a device to execute one or more of the methods according to clauses 1-7 and/or 8-13 and/or 14 and/or 15 and/or 16-21 and/or 22-26 and/or 27-31 and/or 32-35.

What is claimed is:

1. A wireless communication method applied to a wireless network, the wireless network including a terminal, a first node, and a second node, the method comprising:

receiving uplink data from the terminal through an uplink channel of the first node, a frequency band of the uplink channel of the first node being identical to a frequency band of a downlink channel of the second node, the frequency band of the uplink channel of the first node being different from a frequency band of a downlink channel of the first node; and transmitting downlink data to the terminal through the downlink channel of the second node if the terminal is an intra-frequency terminal, or transmitting the downlink data to the terminal through a downlink channel of the first node if the terminal is an inter-frequency terminal, wherein respective uplink and downlink channels of the first node and the second node are configured at least by:

determining at least one first frequency band from a plurality of sub-bands of the wireless network, the at least one first frequency band being a frequency band used by the first node to receive uplink data of inter-frequency terminals; and determining at least one second frequency band from the plurality of sub-bands, the at least one second frequency band being a frequency band used by the first node to receive uplink data of intra-frequency terminals and used by the second node to transmit downlink data to the intra-frequency terminals.

2. The method according to claim 1, wherein the downlink data transmitted to the terminal comprises data generated by the first node according to the uplink data received from the terminal.

3. The method according to claim 1, wherein:
the wireless network further comprises an application terminal; and
the downlink data transmitted to the terminal comprises data generated by the application terminal according to the uplink data received from the terminal through the first node.

4. The method according to claim 1, further comprising:
obtaining type information of the terminal from the uplink data received from the terminal or according to a terminal identifier reported by the terminal; and
in response to determining that the type information indicates the intra-frequency terminal, determining that the terminal is the intra-frequency terminal.

5. The method according to claim 1, further comprising:
obtaining type information of the terminal from the uplink data received from the terminal or according to a terminal identifier reported by the terminal; and
in response to determining that the type information indicates the inter-frequency terminal, determining that the terminal is the inter-frequency terminal.

6. The method according to claim 1, wherein the respective uplink and downlink channels of the first node and the second node are configured further by:
obtaining a communication frequency band of the wireless network; and
dividing the communication frequency band into the plurality of sub-bands.

7. The method according to claim 6, wherein the respective uplink and downlink channels of the first node and the second node are configured further by:
determining at least one third frequency band from the plurality of sub-bands, the at least one third frequency band being a frequency band used by the second node to receive the uplink data of the inter-frequency terminals.

8. The method according to claim 7, wherein the respective uplink and downlink channels of the first node and the second node are configured further by:
determining at least one fourth frequency band from the plurality of sub-bands, the at least one fourth frequency band being a frequency band used by the second node to receive the uplink data of the intra-frequency terminals and used by the first node to transmit the downlink data to the intra-frequency terminals.

9. The method according to claim 8, wherein the respective uplink and downlink channels of the first node and the second node are configured further by:
respectively dividing the at least one first frequency band, the at least one second frequency band, the at least one third frequency band, and the at least one fourth frequency band into a plurality of channels according to a preset channel division rule.

10. The method according to claim 9, wherein:
the first frequency band and the second frequency band are partially overlapped or completely overlapped; and
the third frequency band and the fourth frequency band are partially overlapped or completely overlapped.

11. The method according to claim 1, wherein the second node has a communication distance covering the intra-frequency terminal.

12. A terminal comprising:
one or more processors; and
one or more memories storing computer-readable instructions that, executable by the one or more processors, cause the one or more processors to perform acts comprising:
determining that a preset trigger event is detected or a preset time is reached;
transmitting uplink data to a first node through an uplink channel of a first node, a frequency band of the uplink channel of the first node being identical to a frequency band of a downlink channel of a second node, the frequency band of the uplink channel of the first node being different from a frequency band of a downlink channel of the first node; and
receiving downlink data from the downlink channel of the second node if the terminal is an intra-frequency terminal, or receiving downlink data from the downlink channel of the first node if the terminal is an inter-frequency terminal, wherein respective uplink and downlink channels of the first node and the second node are configured at least by:
determining at least one first frequency band from a plurality of sub-bands of a wireless network, the at least one first frequency band being a frequency band used by the first node to receive uplink data of inter-frequency terminals; and
determining at least one second frequency band from the plurality of sub-bands, the at least one second frequency band being a frequency band used by the first node to receive uplink data of intra-frequency terminals and used by the second node to transmit downlink data to the intra-frequency terminals.

13. The terminal according to claim 12, wherein the downlink data transmitted to the terminal comprises data generated by the first node according to the uplink data received from the terminal.

14. The terminal according to claim 12, wherein the downlink data transmitted to the terminal comprises data generated by an application terminal according to the uplink data received from the terminal through the first node.

15. The terminal according to claim 12, wherein the receiving the downlink data from the downlink channel of the second node includes:
receiving a request for establishing the downlink channel from the second node;
establishing the downlink channel with the second node; and
receiving the downlink data through the downlink channel of the second node.

16. The terminal according to claim 12, wherein the respective uplink and downlink channels of the first node and the second node are configured further by:
obtaining a communication frequency band of a wireless network; and
dividing the communication frequency band into the plurality of sub-bands.

17. The terminal according to claim 16, the respective uplink and downlink channels of the first node and the second node are configured further by:
- determining at least one third frequency band from the plurality of sub-bands, the at least one third frequency band being a frequency band used by the second node to receive the uplink data of the inter-frequency terminals; and
- determining at least one fourth frequency band from the plurality of sub-bands, the at least one fourth frequency band being a frequency band used by the second node to receive the uplink data of the intra-frequency terminals and used by the first node to transmit the downlink data to the intra-frequency terminals.

18. The terminal according to claim 17, wherein the respective uplink and downlink channels of the first node and the second node are configured further by:
- respectively dividing the at least one first frequency band, the at least one second frequency band, the at least one third frequency band, and the at least one fourth frequency band into a plurality of channels according to a preset channel division rule.

19. The terminal according to claim 18, wherein:
- the first frequency band and the second frequency band are partially overlapped or completely overlapped; and
- the third frequency band and the fourth frequency band are partially overlapped or completely overlapped.

20. One or more non-transitory computer-readable storage media storing computer-readable instructions that, executable by one or more processors, cause the one or more processors to perform acts comprising:
- receiving uplink data from a terminal through an uplink channel of a first node, a frequency band of the uplink channel of the first node being identical to a frequency band of a downlink channel of a second node, the frequency band of the uplink channel of the first node being different from a frequency band of a downlink channel of the first node; and
- transmitting downlink data to the terminal through the downlink channel of the second node, wherein respective uplink and downlink channels of the first node and the second node are configured at least by:
  - determining at least one first frequency band from a plurality of sub-bands of a wireless network, the at least one first frequency band being a frequency band used by the first node to receive uplink data of inter-frequency terminals; and
  - determining at least one second frequency band from the plurality of sub-bands, the at least one second frequency band being a frequency band used by the first node to receive uplink data of intra-frequency terminals and used by the second node to transmit downlink data to the intra-frequency terminals.

* * * * *